(12) United States Patent
Dudzinski et al.

(10) Patent No.: US 11,337,127 B2
(45) Date of Patent: May 17, 2022

(54) HANDOVER ANALYSIS FOR A MOVING VEHICLE

(71) Applicant: AIRSPAN IP HOLDCO LLC, Boca Raton, FL (US)

(72) Inventors: Krzysztof Dudzinski, Berkshire (GB); Andrew Logothetis, Buckinghamshire (GB); Marlon Peter Persaud, Buckinghamshire (GB); Ashvtosh Goel, Berkshire (GB); Venkateswarlu Katepalli, Berkshire (GB)

(73) Assignee: AIRSPAN IP HOLDCO LLC, Boca Raton, FL (US)

(*) Notice: Subject to any disclaimer, the term of this patent is extended or adjusted under 35 U.S.C. 154(b) by 40 days.

(21) Appl. No.: 16/814,563

(22) Filed: Mar. 10, 2020

(65) Prior Publication Data

US 2020/0296649 A1    Sep. 17, 2020

(30) Foreign Application Priority Data

Mar. 11, 2019  (GB) ...................................... 1903217
Apr. 12, 2019  (GB) ...................................... 1905222
Jul. 18, 2019  (GB) ...................................... 1910318

(51) Int. Cl.
*H04W 36/08*    (2009.01)
*H04W 4/029*    (2018.01)
(Continued)

(52) U.S. Cl.
CPC .............. *H04W 36/08* (2013.01); *H04B 7/01* (2013.01); *H04B 7/18506* (2013.01);
(Continued)

(58) Field of Classification Search
CPC ..... H04W 4/029; H04W 36/08; H04W 36/32; H04W 4/02; H04W 84/06; H04W 16/28;
(Continued)

(56) References Cited

U.S. PATENT DOCUMENTS 5,703,595 A   12/1997  Tayloe et al.
8,547,277 B1  10/2013  Mitchell
(Continued)

FOREIGN PATENT DOCUMENTS

CN   107306428 B   2/2020
EP      2214328 A2  8/2010
(Continued)

OTHER PUBLICATIONS

EP 20160448.5—EP Extended Search Report dated Jul. 17, 2020, 7 pages.
(Continued)

*Primary Examiner* — Kwasi Karikari
(74) *Attorney, Agent, or Firm* — Andrew L. Dunlap; Haynes Beffel & Wolfeld LLP

(57)    ABSTRACT

A method for performing a handover analysis is provided. The method can include obtaining base station location information for a plurality of base stations that provide a wireless network for communication with a moving vehicle, obtaining position and velocity information for the moving vehicle, and generating at least one handover metric computed from the position and velocity information and the base station location information, for use in determining a target base station to be used when performing a handover procedure to transition communication with the moving vehicle from the current base station to the target base station. This enables a variety of handover metrics to be generated that take into account the deployment of the wireless network, which can be useful in systems such as Air to Ground (ATG) systems where the moving vehicles have a relatively high velocity, and the base stations may be relatively far apart.

20 Claims, 33 Drawing Sheets

(51) Int. Cl.
*H04W 4/40* (2018.01)
*H04W 36/00* (2009.01)
*H04W 48/16* (2009.01)
*H04W 64/00* (2009.01)
*H04B 7/01* (2006.01)
*H04B 7/185* (2006.01)
*H04W 36/32* (2009.01)
*H04W 74/08* (2009.01)
*H04W 92/20* (2009.01)

(52) U.S. Cl.
CPC .............. *H04W 4/029* (2018.02); *H04W 4/40* (2018.02); *H04W 36/0022* (2013.01); *H04W 36/0055* (2013.01); *H04W 36/32* (2013.01); *H04W 48/16* (2013.01); *H04W 64/003* (2013.01); *H04W 64/006* (2013.01); *H04W 74/0833* (2013.01); *H04W 92/20* (2013.01)

(58) Field of Classification Search
CPC ................. H04W 4/40; H04W 64/003; H04W 56/0045; H04W 64/006; H04W 72/0453; H04W 72/085; H04W 36/0022; H04W 36/0055; H04W 88/08; H04W 92/045; H04W 24/02; H04W 36/00; H04W 36/00835; H04W 36/0085; H04W 48/20; H04W 4/027; H04W 52/242; H04W 52/282; H04W 52/285; H04W 72/042; H04W 76/10; H04W 76/15
See application file for complete search history.

(56) References Cited

U.S. PATENT DOCUMENTS

| | | |
|---|---|---|
| 8,599,956 B1 | 12/2013 | Mitchell |
| 2006/0239238 A1* | 10/2006 | Fernandez-Corbaton ................... H04W 52/325 370/342 |
| 2007/0021121 A1 | 1/2007 | Lane et al. |
| 2007/0021122 A1 | 1/2007 | Lane et al. |
| 2007/0161347 A1 | 7/2007 | Ma et al. |
| 2013/0143503 A1 | 6/2013 | Li et al. |
| 2014/0094217 A1 | 4/2014 | Stafford |
| 2015/0319668 A1 | 11/2015 | Guo |
| 2016/0173162 A1 | 6/2016 | Lundstedt et al. |
| 2017/0127332 A1* | 5/2017 | Axmon ................. H04W 16/28 |
| 2018/0084562 A1 | 3/2018 | Ramamurthi et al. |
| 2018/0206133 A1 | 7/2018 | Venkatraman et al. |
| 2018/0338222 A1* | 11/2018 | Manepalli ............. H04W 4/027 |
| 2019/0028172 A1 | 1/2019 | Hudson et al. |
| 2019/0028950 A1* | 1/2019 | Triolo ................. H04B 17/3913 |
| 2019/0037468 A1 | 1/2019 | Bongaarts et al. |

FOREIGN PATENT DOCUMENTS

| | | |
|---|---|---|
| EP | 2323216 A1 | 5/2011 |
| EP | 3387861 A1 | 10/2018 |
| WO | 2006105316 A2 | 10/2006 |
| WO | 2006105316 A3 | 12/2006 |
| WO | 2014044450 A1 | 3/2014 |
| WO | 2017/097997 A1 | 6/2017 |
| WO | 2018078004 A1 | 5/2018 |

OTHER PUBLICATIONS

GB 1910318.3—GB Search Report dated Sep. 17, 2020, 3 pages.
EP 20158047.9—Extended Search Report dated Aug. 4, 2020, 9 pages.
GB 1903217.6—Search Report dated Sep. 5, 2019, 3 pages.
U.S. Appl. No. 16/814,553—Office Action dated May 11, 2021, 13 pages.
EP 20160484.0—Extended Search Report dated Jul. 21, 2020, 7 pages.
"Using air-to-ground LTE for in-flight ultra-broadband," Alcatel-Lucent, Strategic White Paper, 12 pages, May 2015.
GB 1903217.6—Search Report dated Feb. 3, 2020, 2 pages.
U.S. Appl. No. 16/814,558—Office Action dated Jul. 8, 2021, 23 pages.
GB 1910318.3—Search Report dated Jan. 10, 2020, 2 pages.

* cited by examiner

GS = Ground Station  Dx = Downlink Subframe
AS = Air Station     Sx = Special Subframe
Tx = Transmit        Ux = Uplink Subframe
Rx = Receive         RACH = Random Access Channel System operation up to 108km Problem Statement #1 – RACH Detection Window 108km. AS > 108km HANDOVER
    RESULT = $a_1 Rx_0 + a_2 Rx_1 + \ldots$
FOR $BS_X$ $Rx_n$ = NORMALISED HANDOVER METRIC n FOR $BS_X$ $a_1, a_2,$ etc. ARE PREDETERMINED WEIGHTS

FIG. 31

HANDOVER ANALYSIS FOR A MOVING VEHICLE

BACKGROUND

The present technique relates to the field of wireless communications.

It is known to provide air-to-ground (ATG) communication systems for communication between moving aircraft and a network of ground stations. Such systems can, for example, be used to provide a Wi-Fi hotspot within the aircraft in order to provide connectivity to passengers in the aircraft. With increasing demands for higher capacity, there is a desire to support modern telecommunications Standards such as 4G (LTE) in ATG systems. However, this presents a number of technical issues.

In particular, the aircraft will typically be moving at high speed, and the ground stations can be placed a relatively long distance apart, and these factors can give rise to a number of issues when seeking to support modern telecommunications Standards such as 4G (LTE). One issue that can arise is performance of a handover procedure to transition the aircraft's communication from one ground station to another ground station. The standard metrics used in 4G wireless technologies for evaluating the decision to trigger the handover procedure are typically limited to radio signal strength metrics like RSRP (Reference Signal Received Power) and RSRQ (Reference Signal Received Quality). However, in ATG systems it has been found that reliance on such metrics can lead to sub-optimal handover decisions being taken, and accordingly it would be desirable to provide an improved mechanism for performing a handover analysis in such systems.

SUMMARY

In accordance with one example arrangement, there is provided an apparatus comprising: base station location identifying circuitry to obtain base station location information for a plurality of base stations that provide a wireless network for communication with a moving vehicle; moving vehicle tracking circuitry to obtain position and velocity information for the moving vehicle; and handover metrics computation circuitry to generate at least one handover metric computed from the position and velocity information for the moving vehicle and the base station location information, for use in determining a target base station in said plurality to be used when performing a handover procedure to transition communication with the moving vehicle from a current base station in said plurality to the target base station.

In accordance with a further example arrangement, there is provided a method of performing a handover analysis, comprising: obtaining base station location information for a plurality of base stations that provide a wireless network for communication with a moving vehicle; obtaining position and velocity information for the moving vehicle; and employing handover metrics computation circuitry to generate at least one handover metric computed from the position and velocity information for the moving vehicle and the base station location information, for use in determining a target base station in said plurality to be used when performing a handover procedure to transition communication with the moving vehicle from a current base station in said plurality to the target base station.

In accordance with a still further example arrangement, there is provided an apparatus comprising: base station location identifying means for obtaining base station location information for a plurality of base stations that provide a wireless network for communication with a moving vehicle; moving vehicle tracking means for obtaining position and velocity information for the moving vehicle; and handover metrics computation means for generating at least one handover metric computed from the position and velocity information for the moving vehicle and the base station location information, for use in determining a target base station in said plurality to be used when performing a handover procedure to transition communication with the moving vehicle from a current base station in said plurality to the target base station.

BRIEF DESCRIPTION OF THE DRAWINGS

The present technique will be described further, by way of illustration only, with reference to examples thereof as illustrated in the accompanying drawings, in which:

FIG. 31 identifies how a handover result for a particular base station may be computed by using the generated handover metrics, in accordance with one example implementation.

DESCRIPTION OF EXAMPLES

Figure 1:
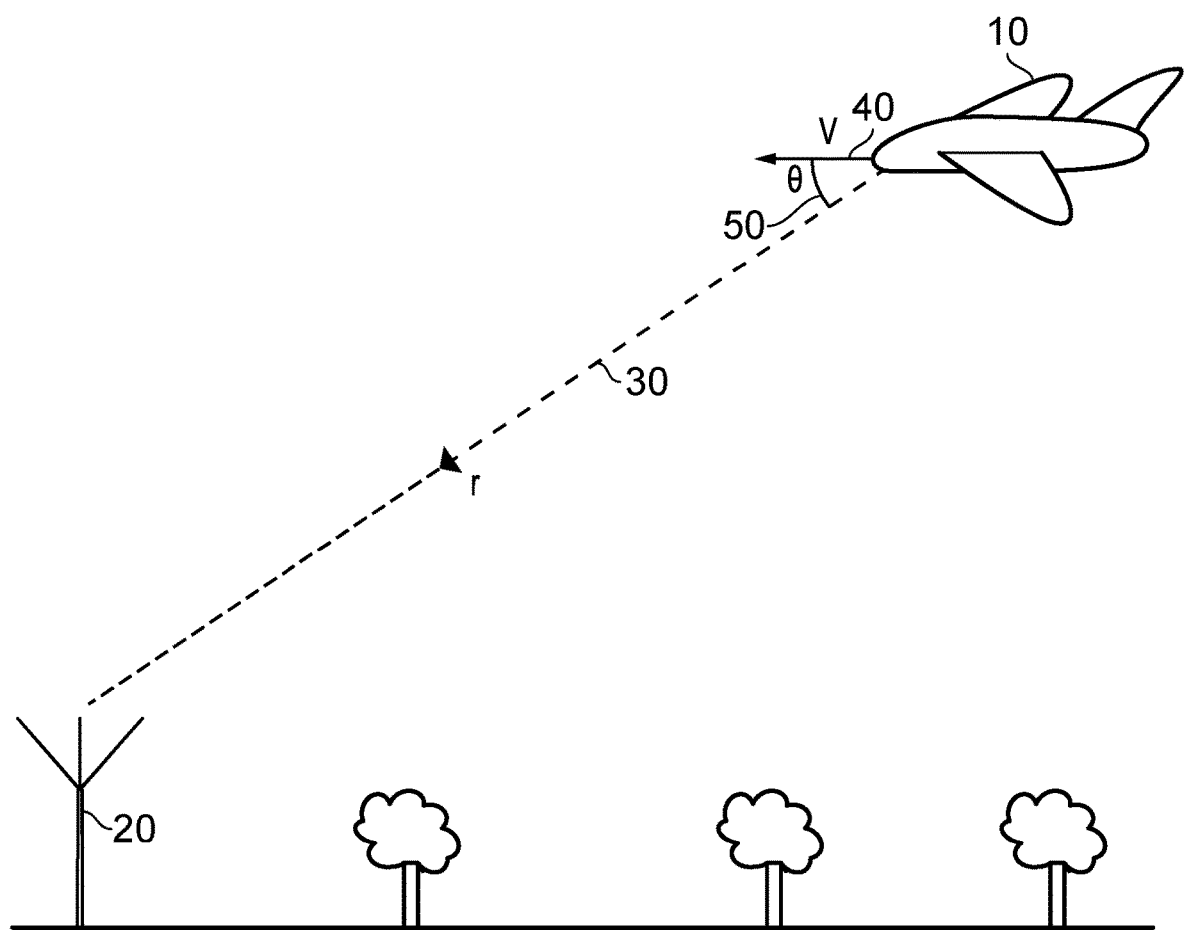
FIG. 1 is a diagram schematically illustrating an air-to-ground (ATG) communication between an aircraft and a ground station.

In accordance with the techniques described herein an apparatus is provided that comprises base station location identifying circuitry to obtain base station location information for a plurality of base stations that provide a wireless network for communication with a moving vehicle, and moving vehicle tracking circuitry to obtain position and velocity information for the moving vehicle. In a typical implementation, the base stations will be static, and accordingly their location information will be fixed. In such implementations, the base station location identifying circuitry may be arranged to have access to a database storing the location information for the various base stations. With regard to the moving vehicle, there are a number of ways in which the position and velocity information may be provided to the moving vehicle tracking circuitry. For example, this information may be obtained via reporting information provided to the moving vehicle tracking circuitry by the moving vehicle, or alternatively the moving vehicle tracking circuitry may have access to an existing tracking facility for the moving vehicle. For example, in implementations where the moving vehicle is an aircraft, then flight tracking systems already exist that can be accessed to provide the position and velocity information for the aircraft.

The apparatus further comprises handover metrics computation circuitry to generate at least one handover metric computed from the position and velocity information for the moving vehicle and the base station location information, for use in determining a target base station in said plurality to be used when performing a handover procedure to transition communication with the moving vehicle from a current base station in said plurality to the target base station.

By obtaining base station location information for the base stations, and current position and velocity information for the moving vehicle, the handover metrics computation circuitry is able to generate one or more handover metrics that can take into account the separation between the moving vehicle and the various base stations, and also take into account factors that may arise from the relatively high speed of the moving vehicle, with those generated metrics then being taken into account when determining a suitable target base station to transition communication with the moving vehicle to during a handover procedure.

The above described apparatus can be located at a variety of locations within the system. For example, the apparatus could be provided within the moving vehicle, in order to generate handover metrics specific to that moving vehicle. However, due to the nature of the information used in computing the above described handover metrics, in one example implementation the apparatus can be provided as a centralised handover analysis system to perform the generation of handover metrics for any moving vehicles connected to the wireless network. The handover metrics described herein can be computed without needing to receive any signal quality measurements from the moving vehicles, and the generated handover metrics can be used to enhance the algorithms used to evaluate the decision to trigger a handover from one base station to another base station.

In one example implementation, the handover metrics computation circuitry is arranged to generate the at least one handover metric for each of a plurality of candidate target base stations. The candidate target base stations can be chosen in a variety of ways. For example, they may typically be determined with reference to the current base station (i.e. the base station that the moving vehicle is currently connected to), and hence for instance a network neighbourhood may be identified based on the current base station, for example to identify a plurality of candidate target base stations within a certain range of the current base station. If desired, the choice of candidate target base stations can also be influenced by other factors. For example, the direction of travel and/or bearing of the moving vehicle can be used in order to identify the track that the moving vehicle is taking across the arrangement of base stations used to provide the wireless network and/or the orientation of the moving vehicle's antennas, and to thus potentially eliminate some of the base stations in the network neighbourhood based on that information.

As mentioned earlier, a number of technical issues can arise when seeking to support modern telecommunications Standards such as 4G (LTE) in systems such as ATG systems. One particular issue that arises is interference between carrier signals due to the impact of the Doppler effect on the frequencies of signals transmitted between the base station (also referred to herein as the ground terminal) and the moving vehicle (for example an aircraft). This is particularly significant in modern telecommunications Standards such a 4G, due to the high frequency of signals that are transmitted according to these Standards—coupled with the high speeds with which moving vehicles such as modern aeroplanes travel, this means that the Doppler effect can be significant in ATG systems, since the Doppler effect is dependent on both the velocity of the vehicle and the frequency of the signal.

While it may be possible to mitigate some of the problems caused by the Doppler effect by choosing modulation schemes for the signals that are more resilient to interference, such schemes typically result in reduced throughput, which has the unwanted effect of lowering the capacity of communication in the system. As described herein techniques can be adopted to seek to overcome some of the issues related to the Doppler effect, without significantly reducing the capacity.

Considering the handover metrics computed by the handover metrics computation circuitry of the apparatus described herein, then at least one handover metric may comprise at least one Doppler effect metric indicative of the impact the Doppler effect will have on transmitted signals between the moving vehicle and a candidate target base station. The handover metrics computation circuitry may then be arranged to compute, for each of the plurality of candidate target base stations, said at least one Doppler effect metric for that candidate target base station. Such Doppler effect metrics can then be taken into account when making a handover determination, for example to seek to increase a probability of selecting, as the target base station, a candidate target base station less affected by the Doppler effect.

The Doppler effect metric determined by the handover metrics computation circuitry can take a variety of forms. In one example implementation, the at least one Doppler effect metric is an indication of relative speed between the moving vehicle and the candidate target base station. In particular, as the relative speed increases between the moving vehicle and the candidate target base station, the Doppler effect will become more pronounced.

There are a number of ways in which the relative speed can be computed by the handover metrics computation circuitry, but in one example arrangement the handover metrics computation circuitry is arranged to compute the indication of relative speed between the moving vehicle and the candidate target base station by computing, based on current position information for the moving vehicle and location information for the candidate target base station, a separation vector extending between the moving vehicle and the candidate target base station, and then computing a component of the velocity of the moving vehicle along that separation vector. In one example implementation, the computed relative speed may have a positive or a negative value, hence identifying whether the moving vehicle is moving closer to the candidate target base station or moving further away from the candidate target base station. Whilst this signed relative speed could be used as the Doppler effect metric, in one example implementation it is the magnitude of the relative speed that is used as the Doppler effect metric, and hence the sign can be ignored.

The handover metrics computation circuitry can generate one or more Doppler effect metrics for each candidate target base station. As another example of a Doppler effect metric that can be generated, the handover metrics computation circuitry may generate an indication of a speed of change of the Doppler effect on transmitted signals between the moving vehicle and the candidate target base station. The more rapidly the Doppler effect is changing, then the more rapidly the compensation applied to the communications to try and eliminate the Doppler effect may need to be adjusted, and it may hence become more challenging to seek to eliminate the Doppler effect when the Doppler effect is changing rapidly. Hence it can be useful to provide an indication of the speed of change of the Doppler effect, so that for example preference can be given to selecting a target base station exhibiting a lower speed of change of the Doppler effect.

In one example implementation, the handover metrics computation circuitry is arranged to compute the indication of a speed of change of the Doppler effect on transmitted signals between the moving vehicle and the candidate target base station by computing a change in relative speed between the moving vehicle and the candidate target base station.

Another issue that can arise in systems such as ATG systems, due to the relatively large distance between the base stations, is that timing advances may be required in respect of certain signals communicated by the moving vehicle to the connected base station in order to ensure that those communications are received at the base station at an expected timing. In particular the delay in transmission caused by the separation distance between the moving vehicle and the base station may need to be taken into account when computing the timing of transmission of certain signals.

However, the antenna system in the moving vehicle may be arranged so that it can only transmit or receive at any point in time. Accordingly, it cannot simultaneously receive downlink communications from the base station to the moving vehicle whilst also transmitting uplink signals from the moving vehicle to the base station. A number of sub-frames may be allocated for transmission of uplink signals, but as the timing advance required increases, one or more of the uplink sub-frames may no longer be able to be used, and this can affect uplink capacity. In one example implementation, the handover metrics computation circuitry seeks to take this issue into account by generating an appropriate handover metric. In particular, the at least one handover metric may comprise an uplink capacity metric indicative of a number of sub-frames available for allocation for uplink communication from the moving vehicle to the candidate target base station, and the handover metrics computation circuitry may be arranged to compute, for each of the plurality of candidate target base stations, the uplink capacity metric for that candidate target base station.

In one example arrangement, the number of sub-frames available for allocation for uplink communication from the moving vehicle to the candidate target base station is dependent on a separation distance between the moving vehicle and the candidate target base station. The handover metrics computation circuitry may then be arranged to compute the uplink capacity metric for each candidate target base station by computing, based on current position information for the moving vehicle and location information for the candidate target base station, a separation distance between the moving vehicle and the candidate target base station, and determining the uplink capacity metric in dependence on the computed separation distance.

Whilst the uplink capacity metric may be determined based solely on the number of sub-frames available for allocation for uplink communication, if desired additional information can also be incorporated into the determination of the uplink capacity metric. For example, in one implementation the handover metrics computation circuitry may be arranged to receive capacity reports from the candidate target base stations about uplink capacity utilisation, and to determine the uplink capacity metric in dependence on both the computed separation distance and the capacity report received from the candidate target base station. The capacity reports can provide information about the uplink capacity utilisation in a variety of ways. For example, they may identify unused uplink capacity, i.e. spare uplink capacity. This information could be combined with the information indicative of the number of sub-frames available for uplink communication, for example to produce an effective uplink capacity metric normalised to the same capacity units, e.g. resource blocks, where a resource block is the smallest allocable portion of the communication frame.

By generating an uplink capacity metric as discussed above, this can then be used to increase a probability of selecting, as the target base station, the candidate target base station having the most uplink capacity.

In addition to, or as an alternative to, the above described handover metrics, one or more further handover metrics can also be computed by the handover metrics computation circuitry. For example, the moving vehicle tracking circuitry may further be arranged to obtain a bearing indication for the moving vehicle, and the handover metrics computation circuitry may be provided with antenna information for the moving vehicle. The antenna information can take a variety of forms, but may for example identify the layout of antennas and the beam patterns being used by those antennas within the moving vehicle. In combination with the bearing information, the geographic coverage of the beam patterns used by the moving vehicle can be determined. The handover metrics computation circuitry may then be arranged to compute, as at least one of the handover metrics, an antenna gain metric. In particular, the handover metrics computation circuitry may be arranged to compute, for each of the plurality of candidate target base stations, the antenna gain metric based on the antenna information, the bearing of the moving vehicle and a separation vector extending between the moving vehicle and the candidate target base station, where the separation vector is computed from current position information for the moving vehicle and location information for the candidate target base station.

The production of such a metric can be very useful, as for example it may be the case that a base station that is relatively close to the moving vehicle is not in fact a good candidate target base station, due to there being a poor antenna gain metric for that base station.

By generating an antenna gain metric in the manner discussed above, this enables an estimation of signal receive power to be produced without needing to receive any measurement reports from the moving vehicle itself, and hence enables an estimate of signal quality to be obtained without for example receiving the earlier discussed RSRP measurement.

In one example implementation, the handover metrics computation circuitry not only generates the at least one handover metric for each of the plurality of candidate target base stations but also generates the at least one handover metric for the current base station. This hence enables an evaluation as to whether a handover from the current base station is in fact appropriate, or whether for the time being communication should be maintained with the current base station.

In one example arrangement the apparatus further comprises handover decision circuitry to select, based on the handover metrics generated by the handover metrics computation circuitry, which one of the plurality of candidate target base stations is to be used as the target base station to which communication with the moving vehicle is to be transitioned from the current base station. Further, as discussed earlier, with the provision of equivalent handover metrics for the current base station, the handover decision circuitry can also determine whether to transition communication with the moving vehicle from the current base station to one of the plurality of candidate target base stations, or instead maintain communication with the current base station.

In one example implementation, the handover metrics generated by the handover metrics computation circuitry are subjected to a normalisation and weighting operation prior to being used by the handover decision circuitry. By normalising the handover metrics, the different handover metrics can be represented on the same scale, and then weighting can be used to attribute greater importance to some handover metrics than others, thus enabling configurability as to the influence the various handover metrics have on the handover decision made by the handover decision circuitry.

In one example implementation, there may be a configurable range of valid values for the various handover metrics, and if any particular handover metric falls outside of that configurable range, this may indicate that the associated candidate target base station is not a good candidate target base station to consider when making the handover decision. Accordingly, in one example implementation, the handover metrics computation circuitry may be arranged to perform a filtering operation using the generated handover metrics in order to determine whether to eliminate any of the plurality of candidate target base stations from consideration by the handover decision circuitry. Hence purely by way of example, if a very poor antenna gain is associated with a particular candidate target base station, it may be decided to eliminate that candidate target base station from the group of candidate target base stations considered by the handover decision circuitry. The handover decision circuitry would then only consider the handover metrics generated for the remaining candidate target base stations.

In a typical 4G (LTE) system, the currently connected base station would control the handover process, based for example on the RSRP and RSRQ measurements received from the moving vehicle. Whilst in accordance with the techniques described herein the base station could still be involved in the handover decision process, for example by taking into account the handover metrics computed by the handover metrics computation circuitry, in one example implementation a forced handover process is instead implemented. In particular, in one example arrangement, the handover decision circuitry is arranged to issue a forced handover signal to the current base station, identifying the target base station, in order to initiate performance of a handover procedure to transition communication with the moving vehicle from the current base station to the target base station. Hence, in such an arrangement, the handover decision circuitry can issue a handover request signal to the currently connected base station, in order to cause that currently connected base station to initiate performance of a handover procedure to transition communication to the identified target base station. This can provide an efficient mechanism for controlling handover using the metrics generated by the handover metrics computation circuitry.

Particular examples will now be described with reference to the Figures.

The moving vehicles for which the techniques described herein can be utilised can take a variety of forms. For instance, the techniques could be applied in respect of trains, where the ground terminals may be spread out along the track. However, for the purposes of the examples discussed herein, it will be assumed that the moving vehicle is an aircraft, such as the airplane 10 shown in FIG. 1. As shown in FIG. 1, the airplane 10 is able to communicate with a ground terminal 20 (which may also be referred to herein as a ground station). A network of ground terminals will be provided, enabling the aircraft 10 to connect to different ground terminals during a flight in order to seek to maintain a communication link that can be used to provide connectivity to passengers in the aircraft. As shown in FIG. 1, the aircraft 10 is assumed to be travelling at a velocity 40, and has a relative separation 30 between it and the ground terminal that it is connected to. This relative separation can be specified as a vector, as can the velocity 40, and there will be an angular separation between the velocity vector and the relative separation vector, namely the angle 50 shown in FIG. 1.

Figure 2:
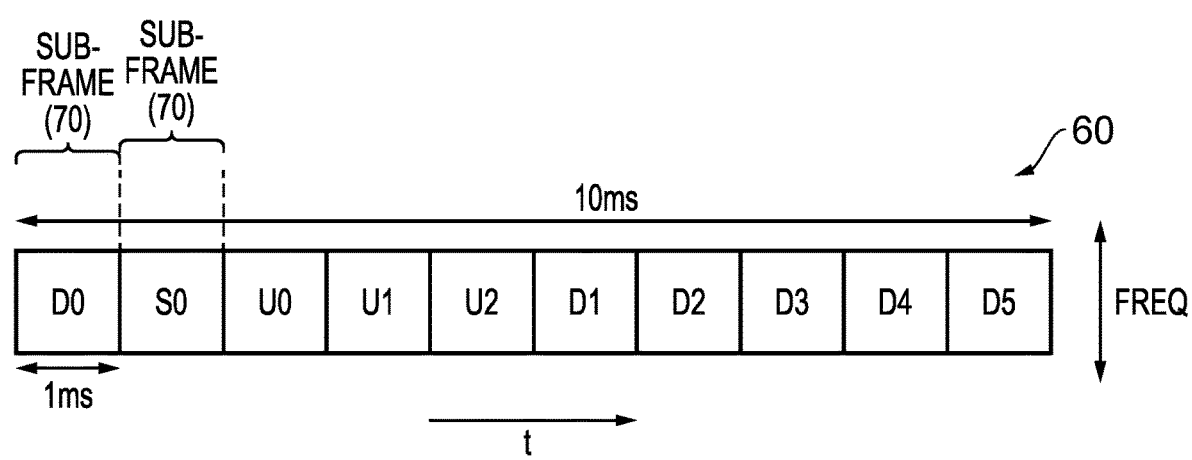
FIG. 2 schematically illustrates the format of a communication frame used in one example implementation.

Communication between the aircraft 10 and a ground station 20 with which a communication link is established can take place within communication frames. An example communication frame that may be used is illustrated in FIG. 2. Here, the communication frame 60 is defined in both the frequency and time domains. In particular, in the time domain, the frame can be considered as consisting of a plurality of sub-frames 70. In one particular example, a communication frame 60 is 10 milliseconds (ms) long, and there are ten sub-frames in the communication frame, where each sub-frame has a duration of 1 ms. Each sub-frame 70 comprises a number of resource blocks (the resource blocks not being shown separately in FIG. 2), a resource block being the smallest allocable portion of the communication frame.

A sub-frame may be allocated for downlink communication (also referred to herein as forward link communication) from a ground terminal 20 to the aircraft 10, or can be allocated for uplink communication (also referred to herein as reverse link communication) from the aircraft 10 to the ground terminal 20. In FIG. 2, sub-frames allocated for downlink communication are prefixed with the letter "D" and sub-frames allocated for uplink communication are prefixed with the letter "U". As also shown in FIG. 2, one or more sub-frames may be allocated as special sub-frames (prefixed by the letter "S"). These can be used as a gap sub-frame to provide some separation between downlink communication and uplink communication. However, it is possible that not the entirety of the special sub-frame is left as a gap. In particular, each sub-frame can be considered as consisting of a plurality of symbols, in one particular example there being 14 symbols within each sub-frame. Hence, one or more of the symbols may be allocated for downlink communication and one or more of the symbols may be allocated for uplink communication, with the remaining symbols being left free. In one specific implementation of the communication frame format shown in FIG. 2, the first three symbols within the special sub-frame S0 can be used for downlink communication, and the final symbol may be used for uplink communication. This leaves 10 symbols free, which in one embodiment equates to a 0.712 ms gap.

Figure 3:
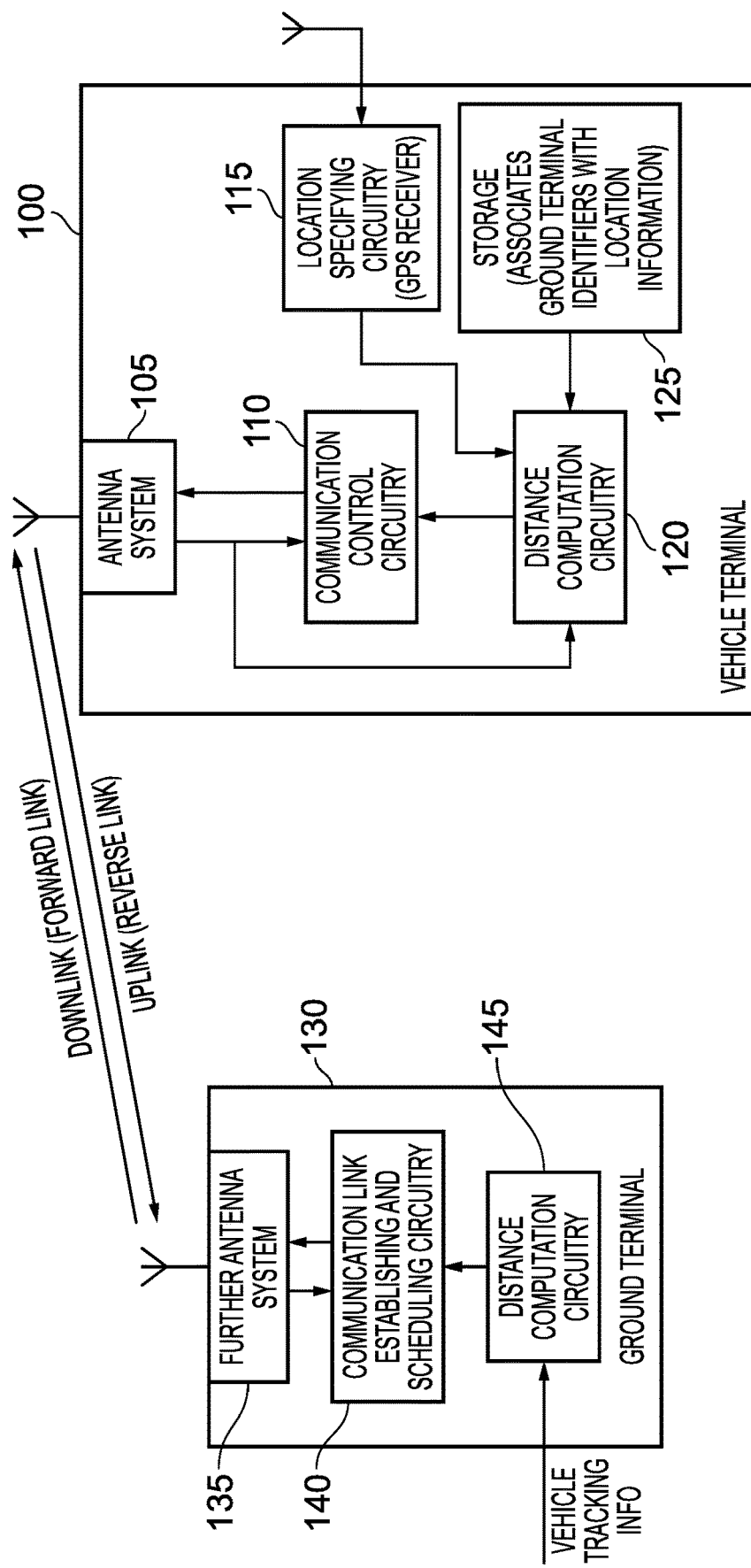
FIG. 3 is a block diagram illustrating components provided within a vehicle terminal and a ground terminal in accordance with one example arrangement.

FIG. 3 is a block diagram illustrating more details of the components provided within a vehicle terminal 100 and a ground terminal 130. The vehicle terminal 100 may for example be provided within the aircraft 10 shown in FIG. 1, whereas the ground terminal 130 may form the ground station 20 shown in FIG. 1.

The vehicle terminal 100 has an antenna system 105 used to communicate wirelessly with the ground terminal 130. The antenna system 105 may include all of the electronics used to convert between baseband and RF signals for both data to be transmitted from the vehicle terminal's antenna and for data received by the vehicle terminal's antenna. Communication control circuitry 110 is provided for controlling the operation of the antenna system 105. To assist the communication control circuitry 110 in performing the control operations to be described in more detail herein, the communication control circuitry 110 has access to distance computation circuitry 120 that can be used to determine the separation between the vehicle terminal 100 and the ground terminal 130. In some example implementations, that separation is expressed as a vector identifying the relative separation between the two antenna systems, whilst in other implementations that separation may be expressed as an absolute separation distance (i.e. a scalar term rather than a vector term).

The distance computation circuitry 120 may have access to location specifying circuitry 115 that can provide information identifying the current location of the vehicle terminal 100. The location specifying circuitry can take a variety of forms, but in one example implementation is a GPS receiver.

The distance computation circuitry 120 can be arranged to operate in a variety of ways, but in one example implementation extracts information from a downlink communication in order to seek to identify the location of the ground terminal 130. That information could in principle directly identify the coordinates of the ground terminal, but in one example implementation that information is an identifier of the ground terminal, and the distance computation circuitry uses that identifier in order to obtain the coordinates of the ground terminal.

In particular, as shown in FIG. 3, in one example implementation the vehicle terminal 100 has a storage device 125 providing a correlation between ground terminal identifiers and associated location information. Accordingly, a lookup operation can be performed within the storage using the identifier information extracted from the downlink signal, in order to obtain the location information of the ground terminal. Using that information, and the location information from the GPS receiver 115, the distance computation circuitry 120 can then calculate the separation between the vehicle terminal and the ground terminal.

As shown in FIG. 3, the ground terminal will include a further antenna system 135, which is controlled by communication link establishing and scheduling circuitry 140. The functionality performed by the communication link establishing and scheduling circuitry 140 will be discussed in more detail later. However, in one implementation that component has access to distance computation circuitry 145 that can compute the separation between the ground terminal 130 and the vehicle terminal 100. As with the earlier-discussed distance computation circuitry 120, the distance computation circuitry may produce that separation as a vector quantity, or as a scalar quantity dependent on implementation. In one example implementation, the distance computation circuitry will know the coordinate information of the ground terminal 130, which it will be appreciated is fixed, and will obtain vehicle tracking information indicative of the current location of the vehicle terminal 100. This vehicle tracking information can be obtained in a variety of ways. However, considering the example of an aircraft 10 shown in FIG. 1, it will be appreciated that there are available resources that track in real time the coordinates of aircrafts, and that information can be obtained in order to provide the distance computation circuitry 145 with the required vehicle tracking information for the vehicle terminal 100.

The separation between the ground terminal 130 and the vehicle terminal 100 determined by the distance computation circuitry 120 is calculated as a vector value, indicating both a magnitude (distance) and direction (angle). In one example implementation, analysis circuitry performs a Doppler adjustment process to determine an adjustment to be made to the transmission frequency of the uplink (reverse link) signal, based on the vector separation determined by the distance computation circuitry. The analysis circuitry therefore encompasses the distance computation circuitry 120 and at least some of the functionality of the communication control circuitry 110. The transmitted frequency ($f_t$) of the transmitted signal (uplink signal) is determined such that the observed frequency of the uplink signal when it is received by the further antenna system 135 equals a predetermined uplink frequency ($f_{UL}$); this is the frequency at which the ground terminal 130 expects to receive the uplink signal, corrected (by the Doppler adjustment process) to account for the Doppler effect in both the received and transmitted signals. The Doppler adjustment process is described in more detail with reference to the examples given below.

Figure 4:
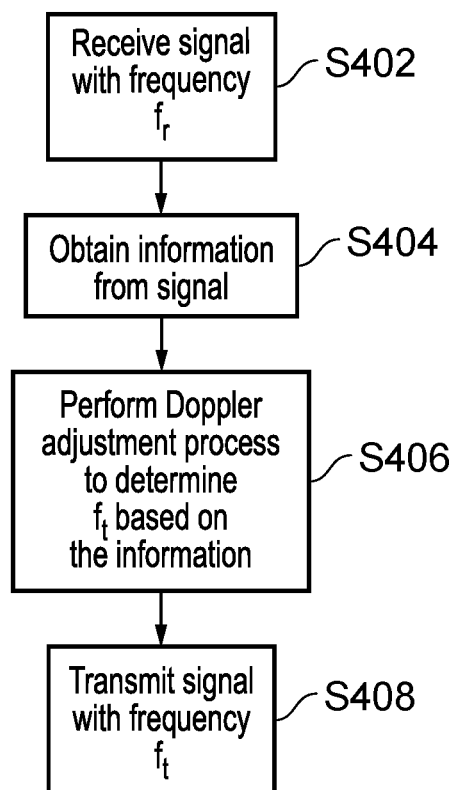
FIG. 4 is a flow diagram illustrating a process performed by the vehicle terminal to determine the transmission frequency ($f_t$) of a transmitted signal.

FIG. 4 is a flow diagram illustrating a method of operation of the vehicle terminal 100. In a first step S402, a received signal (the downlink/forward link signal) is received at the antenna of the antenna system 105, the received signal having a received frequency ($f_r$). At least one item of information—for example, information with which the distance computation circuitry 120 can determine the vector separation between the antenna system 105 of the vehicle terminal 100 and the further antenna system 135 of the ground terminal 130—is obtained at step S404 from the received signal by the distance computation circuitry 120. The information is then used in a Doppler adjustment process S406, to determine the transmitted frequency ($f_t$) with which the uplink signal is to be transmitted, taking into account any frequency shifts due to the Doppler effect.

Once the Doppler adjustment process S406 has been performed, then at step S408 the antenna system 105 can transmit, at the transmitted frequency ($f_t$), the uplink signal to the further antenna system 135.

Figure 5:
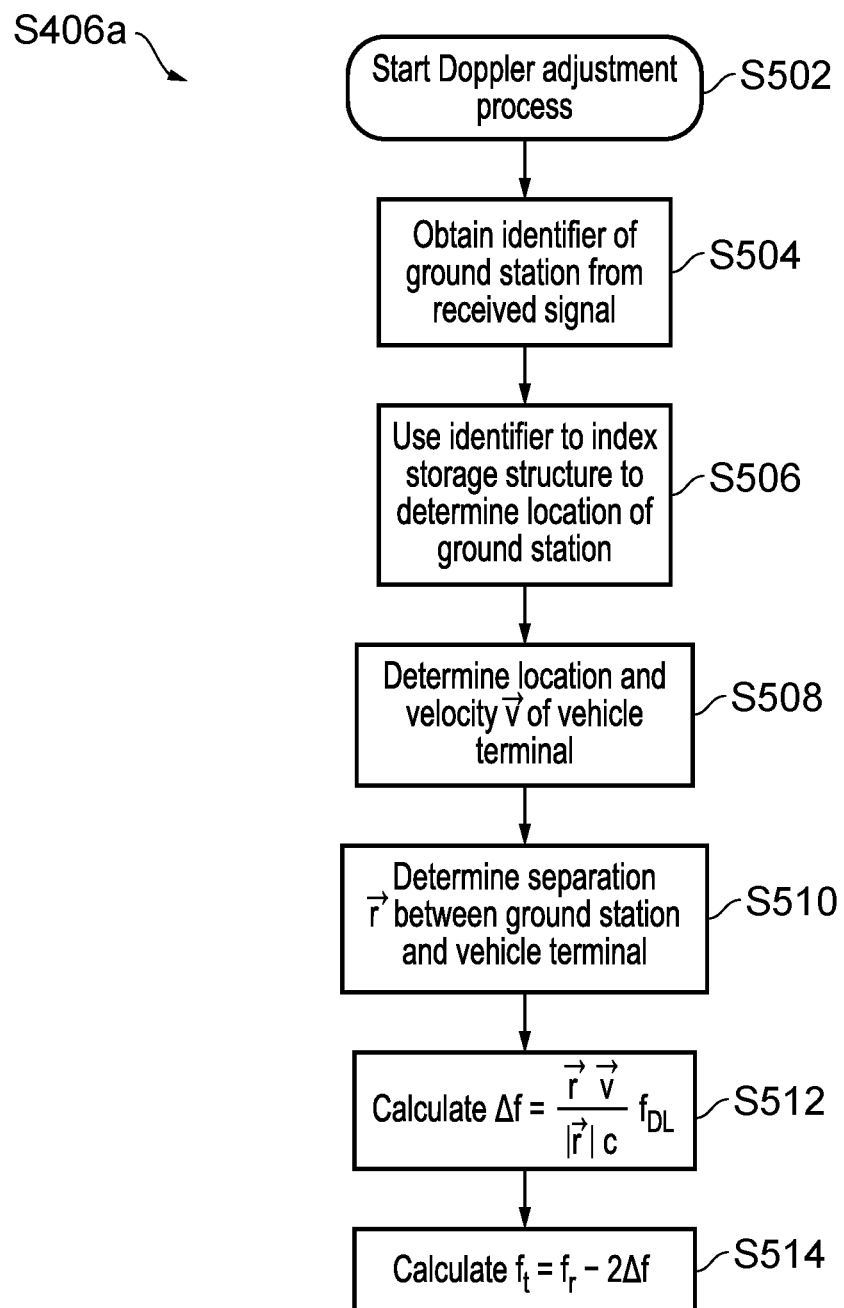
FIG. 5 is a flow diagram showing an example of a Doppler adjustment process performed by the vehicle terminal to determine the transmission frequency ($f_t$) of the transmitted signal.

FIG. 5 is a flow diagram showing an example of the Doppler adjustment process S406a referred to in FIG. 4. This particular example refers to the case where the information extracted from the received signal is an identifier of the ground terminal 130.

The Doppler adjustment process of this example starts at a step S502. At step S504 the distance computation circuitry 120 obtains, from the received downlink signal, an identifier of the ground terminal 135. Using this identifier, the computation circuitry 120 can then index the storage structure 125 in order to determine at step S506 the location of the ground station. The location of the vehicle terminal, along with its velocity, are also determined at step S508. At least the location can be determined by the location specifying circuitry 115, but in instances where the location specifying circuitry 115 is a GPS receiver it will be appreciated that the velocity information can also be determined from the output of the GPS receiver. Using the locations of the ground terminal 130 and the vehicle terminal 100, the vector displacement (separation) between the two terminals can be determined at step S510 by the distance computation circuitry 120, and thus an adjustment value ($\Delta f$) representative of the change in frequency of the received signal due to the Doppler effect can be calculated at step S512. This calculation is performed by the analysis circuitry according to the Doppler formula:

$$\Delta f = \frac{r \cdot v}{|r|c} f_{DL}$$

where r is the vector separation between the ground terminal 130 and the vehicle terminal 100, v is the velocity of the vehicle terminal 100, c is the speed of light and $f_{DL}$ is the predetermined downlink frequency (the frequency at which the ground terminal 130 transmits the downlink signal).

This adjustment value ($\Delta f$) is then used to calculate the transmitted frequency ($f_t$) with which the uplink signal is to be transmitted, in accordance with the following formula:

$$f_t = f_r - 2\Delta f$$

where $f_r$ is the received frequency of the downlink signal. The above calculations assume that a time division duplex (TDD) scheme is employed, in which the predetermined uplink frequency and the predetermined downlink frequency (the frequencies of the uplink and downlink signals at the ground terminal) are the same. The received frequency of the downlink signal is $f_r = f_{DL} + \Delta f$, and that received frequency is used as the default frequency for transmission from the vehicle terminal 100. Hence the frequency of the transmitted signal needs to be adjusted by $-2\Delta f$ in order to compensate for the Doppler effect in both the received and transmitted signals, such that the frequency of the uplink signal as observed by the ground terminal is $f_{UL} = f_{DL}$.

However, the above approach can also be generalised to a frequency division duplex (FDD) scheme where the predetermined uplink and downlink frequencies differ, as discussed below with reference to FIG. 9, and the adjustment required to the default transmission frequency in that case is the same.

While the example described with reference to FIG. 5 assumes that an identifier of the ground station 130 is obtained from the downlink signal, it is also possible for the downlink signal itself to specify the location (e.g. the coordinates) of the ground terminal 130. In this case, steps S504 and S506 in FIG. 5 would be replaced with a single step of obtaining, from the received signal, the location of the ground terminal 130.

Furthermore, in some examples it may also be possible to calculate the Doppler adjustment $\Delta f$ without knowing the magnitude of the distance (r) between the two terminals, provided that at least the angle θ between the vehicle's velocity and a line connecting the two terminals is known. This is because the dot product between r and v can be calculated as $|r|*|v|*\cos\theta$, so that $|r|$ cancels out in the Doppler formula. The angle θ could be calculated in any of a number of ways; for example, the angle of arrival (AoA) of the incoming downlink signal could be determined using a phase array, to determine the angle relative to the vehicle's heading.

Figure 6:
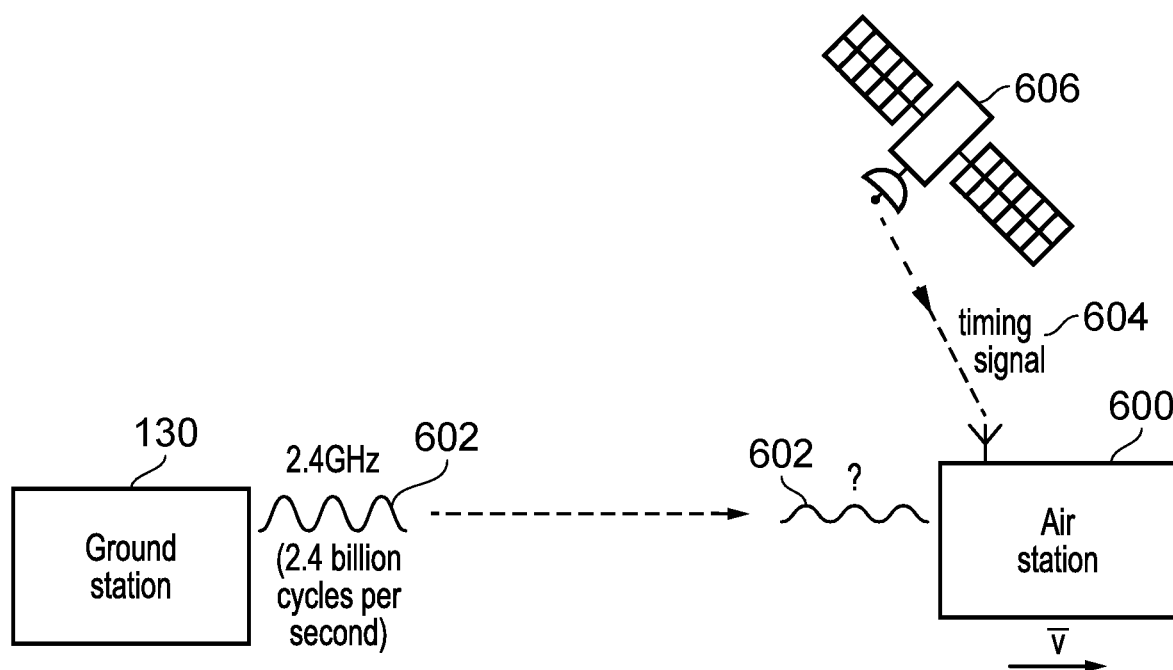
FIG. 6 schematically shows an example of how the Doppler effect affects signals from the ground station, and how the received signal can be used to determine the transmission frequency ($f_t$) of the transmitted signal.

The examples described so far involve calculating, with distance computation circuitry 120, the vector separation between the ground terminal 130 and the vehicle terminal 100. However, other examples instead perform the Doppler adjustment process using information about the received signal itself, rather than information about the ground terminal 130 (such as its location). One such example is demonstrated schematically in FIG. 6. A ground station 130 and an air station 600 (an example of the vehicle terminal 100 shown in FIG. 3) are shown in FIG. 6. The ground station 130 transmits a downlink signal 602 at a frequency (the predetermined downlink frequency $f_{DL}$) of 2.4 GHz (2.4 billion cycles per second). This signal is received a short time later at the air station 600, which is moving away from the ground station 130 with a given velocity (v). Due to the Doppler effect, the frequency of the signal as observed by the air station 600 is lower than 2.4 GHz (or higher if the air station 600 is moving towards the ground station 100), meaning that the number of cycles per second has reduced. In this example, the frequency ($f_r$) of the downlink signal 602 as observed by the air station 600 can be compared with the expected value of the frequency (2.4 GHz) to determine an adjustment ($\Delta f$) to be applied to the transmitted signal (not shown).

The air station 600 also receives a timing signal 604 from a GPS satellite 606, which provides accurate timing information. This timing information can then be used by the air station 600 (more particularly, by the analysis circuitry in the air station 600) to accurately count the number of cycles per second in the received signal 602, to determine how the frequency has changed. This information can then be used by the analysis circuitry to determine the transmitted frequency ($f_t$) of the transmitted signal. Thus, FIG. 6 is an example of the use of information relating to the received signal itself in performing a Doppler adjustment process.

While the arrangement shown in FIG. 6 calculates the received frequency ($f_r$) of the downlink signal as the information relating to the received signal, there are other examples of information about the received signal that could be used instead, for example the number of communication frames 60 received at the air station 600 per second (which can be compared to the expected value of 100 per second), the number of OFDM (Orthogonal Frequency Division Multiplexing) symbols received per second, or the number of primary synchronisation signals (PSSs) counted per second. In fact, any property of the received signal that is affected by the Doppler effect (so any property related to the frequency of the signal) can be used.

Figure 7:
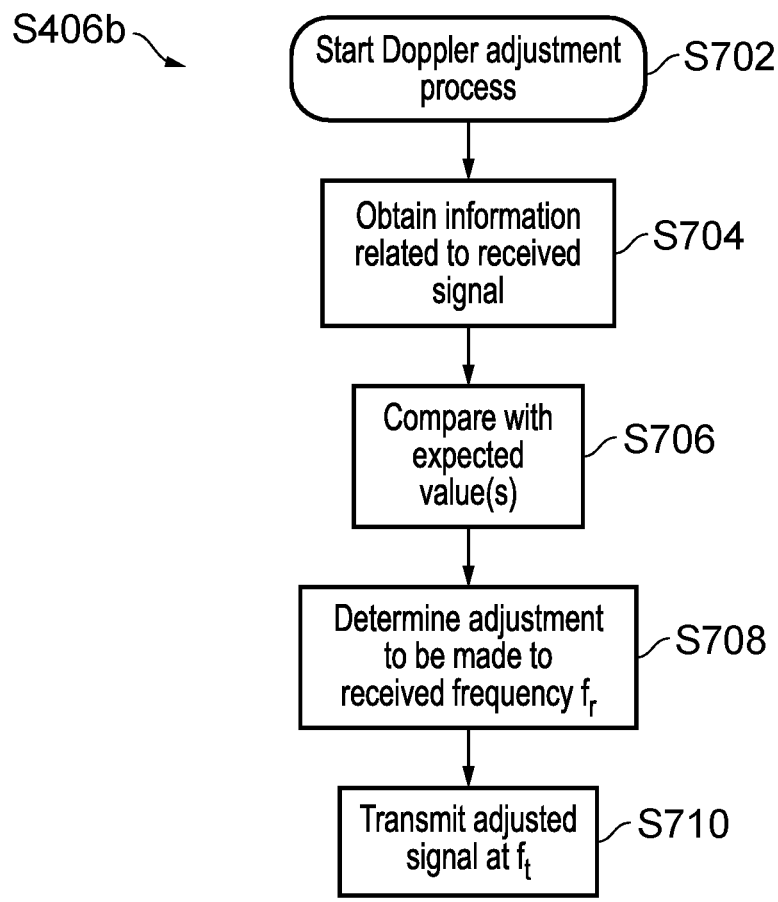
FIG. 7 is a flow diagram showing another example of a Doppler adjustment process performed by the vehicle terminal to determine the transmission frequency ($f_t$) of the transmitted signal.

FIG. 7 is a flow diagram illustrating another example of the Doppler adjustment process S406b applied in FIG. 4, this time using information relating to the received signal, rather than information about the ground terminal 130. In the following example, it is assumed that a TDD scheme is employed, and that the predetermined uplink frequency and predetermined downlink frequency are, therefore, the same.

In FIG. 7, the process begins at a first step S702, before passing to a step S704 of obtaining, from the received signal, information relating to the received signal itself. As mentioned above, this could include the received frequency ($f_r$) of the received signal, or any other property of the received signal impacted by the Doppler effect.

The obtained information is compared at step S706 with one or more expected values, allowing an indication of the Doppler effect on the received signal to be determined, and thus an adjusted transmission frequency ($f_t$) to be determined at step S708. Then, the antenna system 105 transmits the adjusted transmitted signal with transmission frequency ($f_t$).

Figure 8:
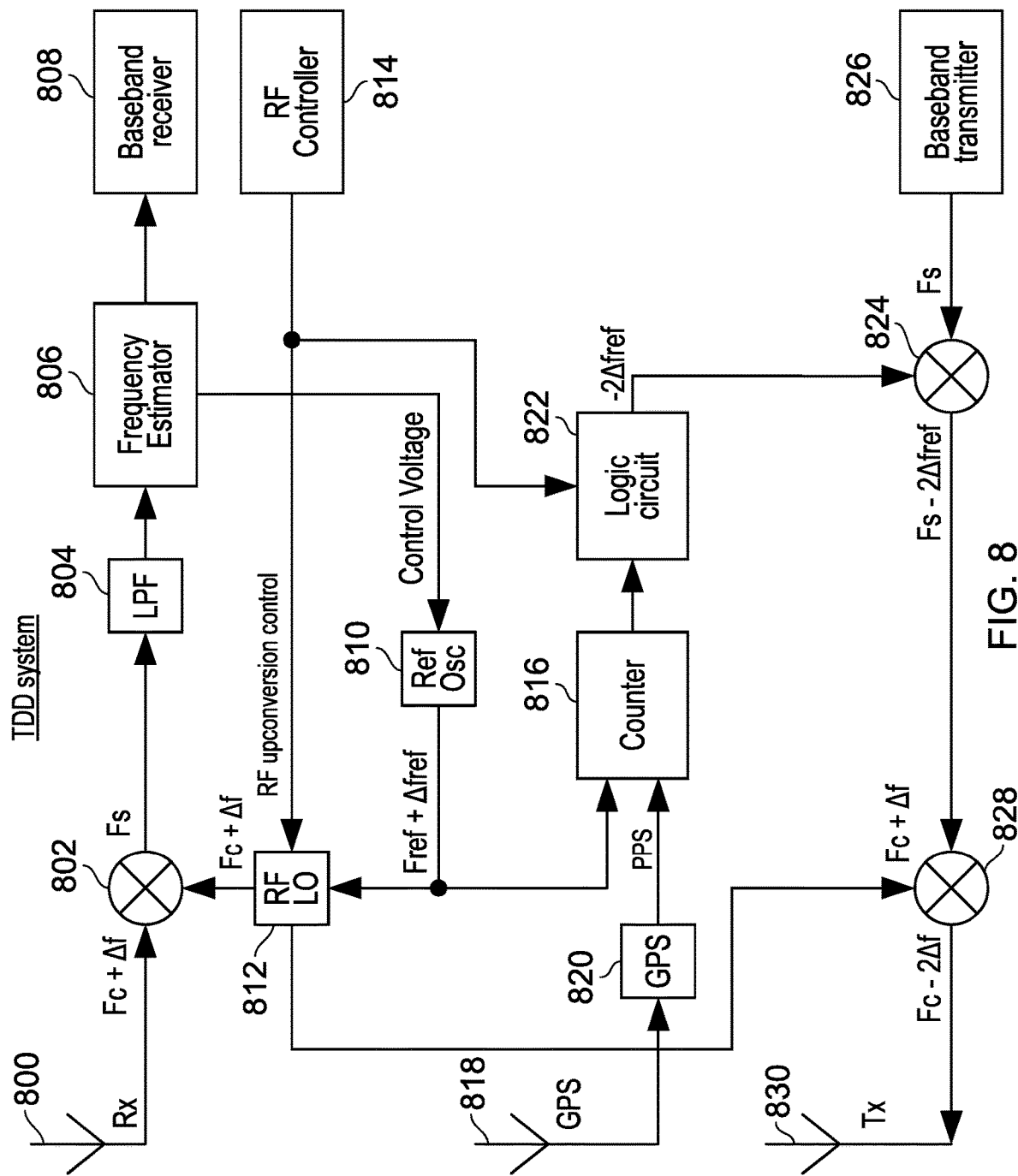
FIGS. 8 and 9 schematically show examples of components in the vehicle terminal, used in the process of determining the transmission frequency ($f_t$) of the transmitted signal.
Figure 9:
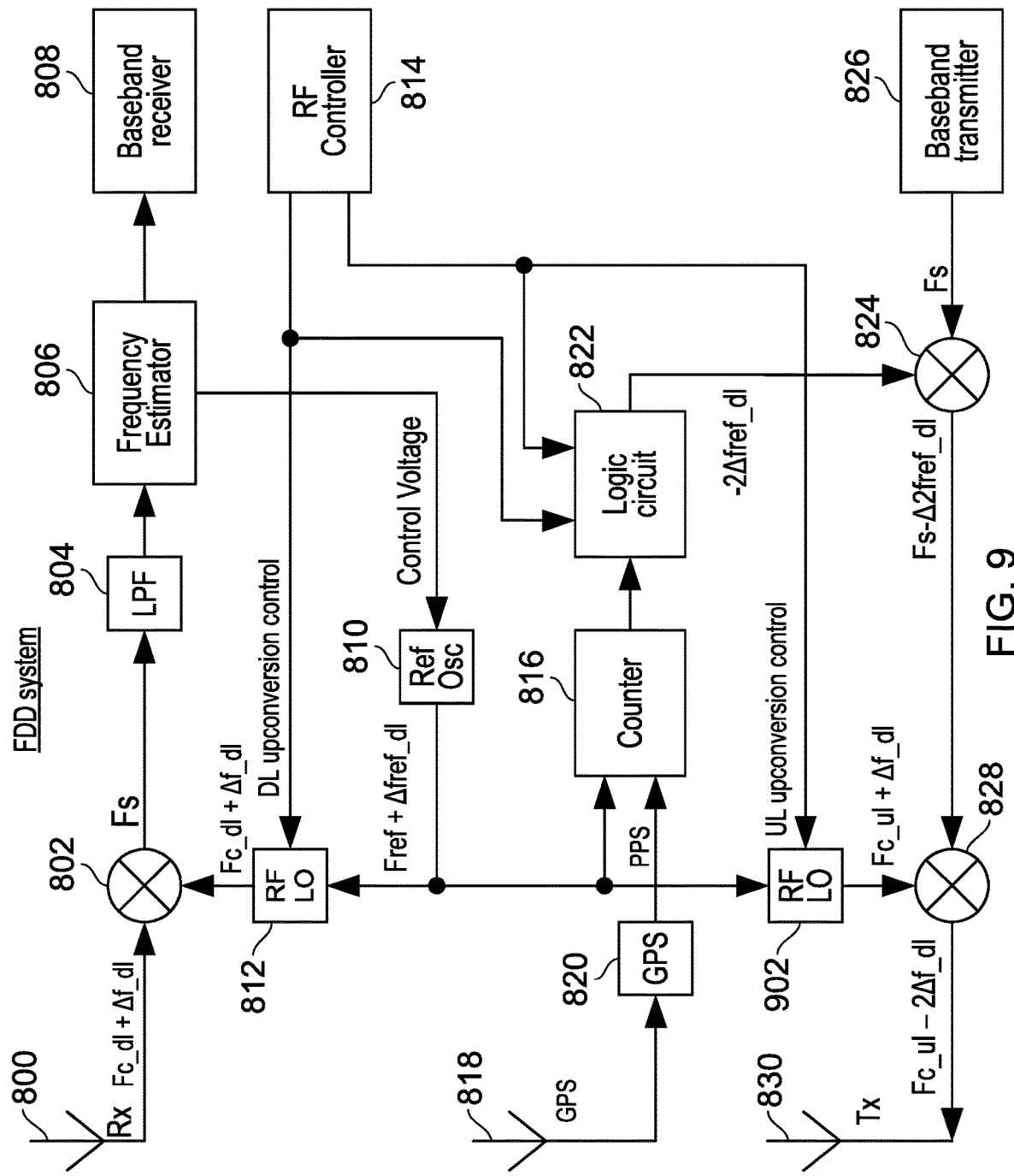

FIGS. 8 and 9 show in more detail some of the elements that may be present in the antenna system 105 and communication control circuitry 110 of the vehicle terminal 100, in accordance with the example described with reference to FIG. 7; in particular, FIGS. 8 and 9 describe components to be used in a system in which an indication of the received frequency ($f_r$) of the received signal is used to perform the Doppler adjustment process. FIG. 8 shows elements present in a vehicle terminal 100 to be used in a time division duplex (TDD) scheme, in which the predetermined uplink frequency and predetermined downlink frequency are the same while FIG. 9 shows an alternative arrangement to be used in a frequency division duplex (FDD) scheme, in which the predetermined uplink frequency and predetermined downlink frequency may be different. As noted above, the predetermined downlink frequency is the frequency with which the ground terminal transmits the downlink signal, and the predetermined uplink frequency is the frequency at which the ground terminal expects to receive the uplink signal.

In FIG. 8, the received signal Rx is received at an antenna 800, the received signal having a frequency equal to the carrier frequency ($f_c$) (the downlink frequency) adjusted according to the Doppler effect ($f_c+\Delta f$). The received signal is fed into a frequency mixer 802, the output of which is fed into a low pass filter (LPF) 804. The frequency estimator 806 estimates the frequency of the received signal based on the output of the LPF 804, and supplies the signal to a baseband receiver 808. The frequency estimator 806 also supplies a control voltage to a reference oscillator 810, to cause the reference oscillator 810 to then output a reference signal at a frequency ($F_{ref}+\Delta F_{ref}$). The reference signal is fed into a local oscillator 812, which multiplies the reference frequency by an upscaling factor α and outputs the resulting signal—corresponding to an estimation of the frequency of the received signal—back into the frequency mixer 802. The upscaling factor α is determined based on an RF upconversion control signal received at the local oscillator 812 from an RF controller 814. Thus, the above process implements a feedback loop, and the frequency estimated by the frequency estimator 806 is more accurate with every pass.

The signal output by the reference oscillator 810 is also fed into a counter 816. A timing signal, received at a GPS antenna 818 and processed by a GPS element 820 is also fed into the counter 816. The timing signal provides one pulse per second (PPS), and hence, using the timing signal, the counter 816 can count the number of cycles per second in the reference signal output by the reference oscillator 810.

The counter 816 feeds into a logic circuit 822, controlled by the RF controller 814, which determines a downscaled adjustment value ($2\Delta f_{ref}$). The downscaled adjustment value ($2\Delta f_{ref}$) and the output of a baseband transmitter 826 (having a frequency of $F_s$) are then fed into a second frequency mixer 824.

The second frequency mixer 824 then outputs a signal ($F_s-2\Delta f_{ref}$) to a third frequency mixer 828. The third frequency mixer 828 also receives an input from the local oscillator 812 (i.e. a signal representing the received frequency), and outputs a signal with frequency $F_c-2\Delta f$, which is the adjusted transmitted frequency described in earlier figures. This signal can then be transmitted as the uplink signal by an antenna 830.

The arrangement shown in FIG. 9 is almost identical to that shown in FIG. 8, with one main difference: the arrangement in FIG. 9 also includes a second local oscillator 902, which receives signals from the reference oscillator 810 and the RF controller 814. This allows for the signal fed into the third frequency mixer 828 ($F_{c\_ul}+\Delta f_{\_dl}$) to take into account the difference in frequency between the uplink and downlink signals in an FDD system.

It should be noted that the frequency of the transmitted signal is adjusted by a value of $2\Delta f$, regardless of whether or not the downlink frequency $f_{DL}$ and the uplink frequency $f_{UL}$ are the same. This can be shown as follows:

The Doppler frequency on the Forward Link (FL) is given by:

$$\Delta f^{FL} = \frac{r \cdot v}{|r|c} f_c^{FL}$$

where $f_c^{FL}$ denotes the centre frequency on the forward link (downlink), c is the speed of light, v is the velocity vector and r is the relative distance to the base station. The (·) symbol denotes the dot product operator, wherein r·v= $(r_x, r_y, r_z) \cdot (v_x, v_y, v_z) = r_x v_x + r_y v_y + r_z v_z$.

The Doppler frequency on the Reverse Link (RL), assuming that the carrier frequency is $f_c^{RL}$, is given by:

$$\Delta f^{RL} = \frac{r \cdot v}{|r|c} f_c^{RL}$$

The reference oscillator will therefore converge to:

$$f^{REF} = (f_c^{FL} + \Delta f^{FL})/\alpha^{FL} = \left(1 + \frac{r \cdot v}{|r|c}\right) f_c^{FL}/\alpha^{FL}$$

where $a^{FL}$ denotes the upscaling (multiplicative) factor for the forward link. For example, if $f^{REF}=40$ MHz, the $a^{FL}=60$ to ensure the centre frequency will be at 2.4 GHz.

The received frequency at the base station (ground terminal) will be multiple of the reference frequency ($f^{REF} a^{RL}$), adjusted by the Doppler effect. That is $$f^{RX-BS} = \left(1 + \frac{r \cdot v}{|r|c}\right) f^{REF} \alpha^{RL} =$$
$$\left(1 + \frac{r \cdot v}{|r|c}\right)\left(1 + \frac{r \cdot v}{|r|c}\right) f_c^{FL} \frac{\alpha^{RL}}{\alpha^{FL}}$$
$$= \left(1 + 2\frac{r \cdot v}{|r|c} + \left(\frac{r \cdot v}{|r|c}\right)^2\right) f_c^{FL} \frac{\alpha^{RL}}{\alpha^{FL}} \approx$$
$$\left(1 + 2\frac{r \cdot v}{|r|c}\right) f_c^{FL} \frac{\alpha^{RL}}{\alpha^{FL}}$$

$$\left(\frac{r \cdot v}{|r|c}\right)^2 \approx 0$$

since $v^2 \ll c^2$. To prove this assumption, assuming 1000 km/h at 2.4 GHz, $$\left(\frac{r \cdot v}{|r|c}\right)^2 f_c = 0.002 \text{ Hz}.$$

This is an insignificant contribution and can be ignored.

In TDD (time division duplex), $a^{FL}=a^{RL}$ and $f_c^{FL}=f_c^{RL}=f_c$, which implies that $\Delta f^{FL}=\Delta f^{RL}=\Delta f$, and thus $f^{RX-BS}=f_c+2\Delta f$.

Note that in FDD (frequency division duplex) (or TDD), $$f_c^{RL} = f_c^{FL} \frac{\alpha^{RL}}{\alpha^{FL}},$$

thus $$f^{RX-BS} = \left(1 + 2\frac{r \cdot v}{|r|c}\right) f_c^{RL} = f_c^{RL} + 2\Delta f^{RL}$$

Therefore, just like in the TDD case we need to compensate the transmission by $2\Delta f^{RL}$.

As shown through the above examples, the present technique allows the frequency of a signal transmitted by a wireless communication system installed in a fast-moving vehicle to be adjusted to compensate for the Doppler effect. This reduces interference effects at a ground terminal (base station), and allows higher frequency signals (such as those used in modern telecommunications Standards) to be used. It also allows the system to be used in vehicles of increasing speeds. Thus, modern telecommunications Standards such as 4G (LTE) can be implemented in ATG systems, even as the speeds with which modern aeroplanes travel are ever-increasing.

One of the functions performed by the communication control circuitry 110 is to perform a sign-on procedure to seek to establish a communication link with the ground terminal 130. During that sign-on procedure, the communication control circuitry 110 will issue a connection setup signal for receipt by the further antenna system 135 within an identified timing window. The vehicle terminal 100 will firstly receive an initial signal from the ground terminal 130 advising of the availability for the connection setup signal to be issued, and providing information regarding the identified timing window. The timing window will typically occupy one or more sub-frames, and the connection setup signal will have a duration less than the identified timing window, but will need to be received in its entirety within that timing window in order for a connection to successfully be established.

In accordance with the techniques described herein, it is assumed that communications are taking place in accordance with the 4G (LTE) Standard, and such a connection setup signal may be referred to as a RACH (random access channel) signal that is issued in a random access channel during an uplink communication from the moving vehicle to the ground terminal. Different RACH configurations may be supported, for example associated with different sized RACH signals and associated different sized timing windows.

Figure 10A:
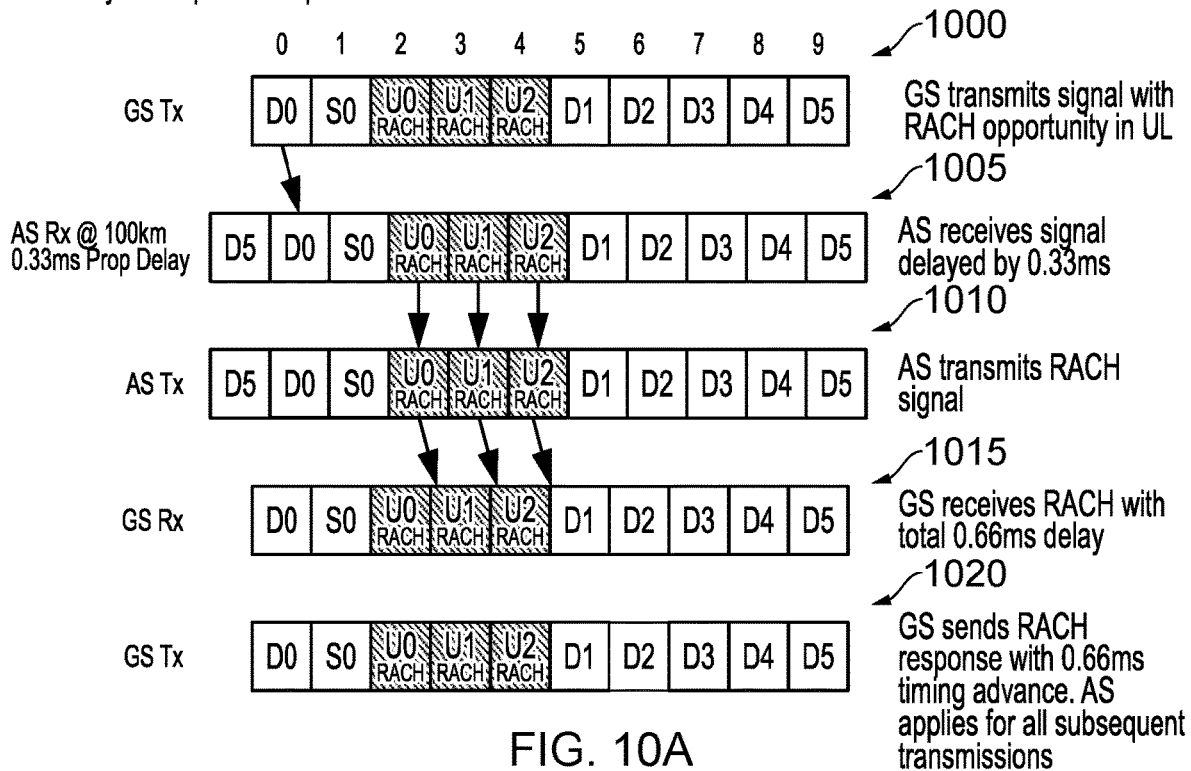
FIG. 10A illustrates how a connection setup signal (a RACH signal) can be successfully communicated from a vehicle terminal to a ground terminal using the communication frame of FIG. 2 provided the vehicle terminal is no more than 108 km from the ground terminal.

FIG. 10A illustrates an example form of RACH configuration that could be used when adopting the communication frame format of FIG. 2, and in situations where the separation between the aircraft 10 and the ground terminal 20 does not exceed 108 km. Here the timing window occupies three sub-frames. As indicated by the communication frame 1000, it is assumed that the ground station 20 transmits a signal identifying that there is a RACH opportunity that the aircraft can utilise in an uplink communication back to the ground terminal 20. As shown by the line 1005 in FIG. 10A, the receipt of the communication frame at the aircraft 10 is delayed by approximately 0.33 ms, due to the separation between the aircraft and the ground terminal (in this case it being assumed that there is essentially the maximum separation that can be supported using this RACH format). As shown by the line 1010, it is assumed that the aircraft 10 then transmits the RACH signal, in this case the RACH signal being propagated across all three of the uplink communication sub-frames.

It will be appreciated that that uplink transmission will also be delayed by the same propagation delay, and hence will be received by the ground terminal 20 at approximately 0.66 ms delay (as indicated by the line 1015), due to the round trip delay between the ground terminal and the aircraft. However, the timing control at the ground terminal is fixed, and hence it will assume the timing of the sub-frames is aligned with the initial timing shown by the entry 1000. Hence, it will interpret the received information on that basis.

In this case it is assumed that the RACH signal is received entirely within the RACH timing window, and based on the relative offset of that RACH signal, the ground station 20 can identify that the total propagation delay is 0.66 ms. Accordingly, in a subsequent communication frame 1020 where the ground station provides a response to identify that a successful communication link has been established, that response signal from the ground station will identify that the aircraft should advance its timing for subsequent uplink communication by 0.66 ms. As a result, this will ensure that the subsequent uplink communication is aligned with the sub-frame timing boundaries as implemented by the ground terminal 20.

Figure 10B:
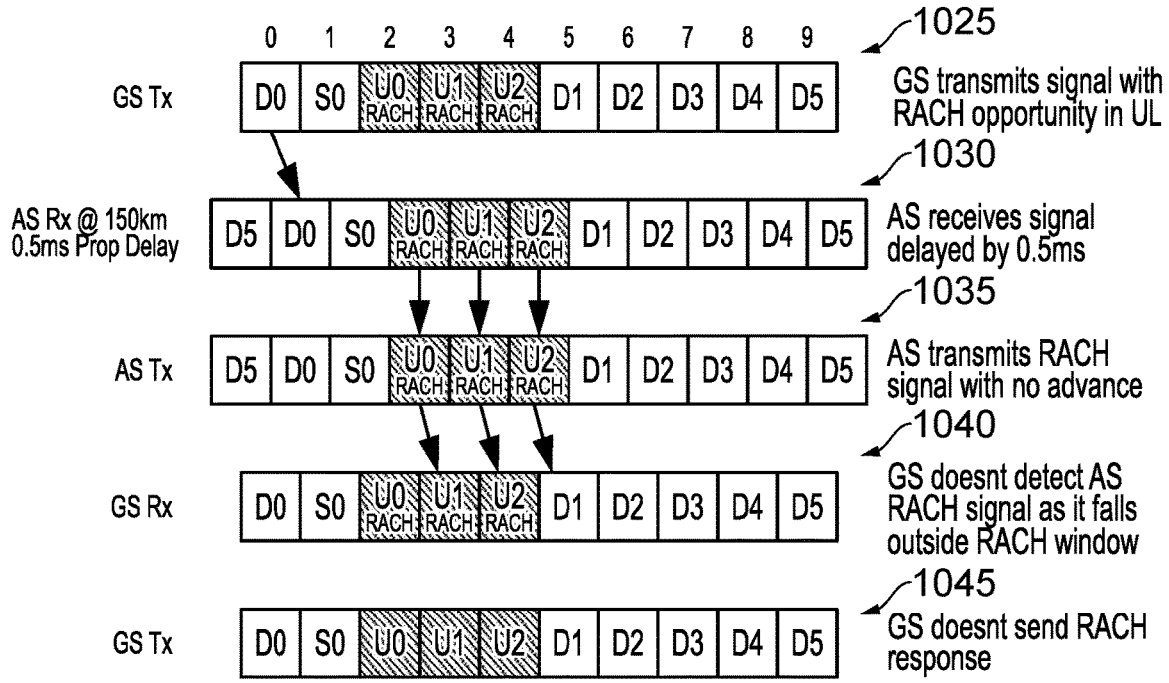
FIG. 10B illustrates how when the distance between the vehicle terminal and the ground terminal exceeds 108 km the connection setup signal will not be successfully received by the ground terminal when adopting the scheme of FIG. 10A.

FIG. 10B illustrates the use of the same example RACH configuration, but in a situation where the separation exceeds the maximum separation distance of 108 km. In this specific example, it is assumed that the separation is 150 km resulting in a 0.5 ms propagation delay from the ground terminal 20 to the aircraft 10. As shown by the line 1025, the ground terminal 20 emits the same initial signal as discussed earlier with reference to the line 1000 of FIG. 10A, and hence identifies a RACH opportunity. However, as shown by the line 1030, the communication frame is received after a 0.5 ms propagation delay. Again, as indicated by the line 1035, the aircraft terminal transmits the RACH signal within the uplink sub-frames, but again the communication is delayed by another 0.5 ms on its transit to the ground terminal. Hence, there has been an overall delay of 1 ms, and this results in the RACH signal not falling within the RACH timing window, when using the timing adopted by the ground station 20, as indicated by the line 1040. Accordingly, as indicated by line 1045, the RACH signal has not been successfully received, and the ground station 20 will not send a response to the aircraft, as a result of which a communication link will not be established.

In accordance with the techniques described herein, this problem is addressed by enabling the vehicle terminal to assess the separation between it and the ground terminal with which it is seeking to establish a communication, and to apply an initial timing advance relative to the default time indicated for the RACH signal, when issuing that RACH signal to the ground terminal. This can be used to ensure that the RACH signal is received within the specified timing window, hence enabling a successful communication link to be established. This process is discussed in more detail with reference to the flow diagram of FIG. 11.

Figure 11:
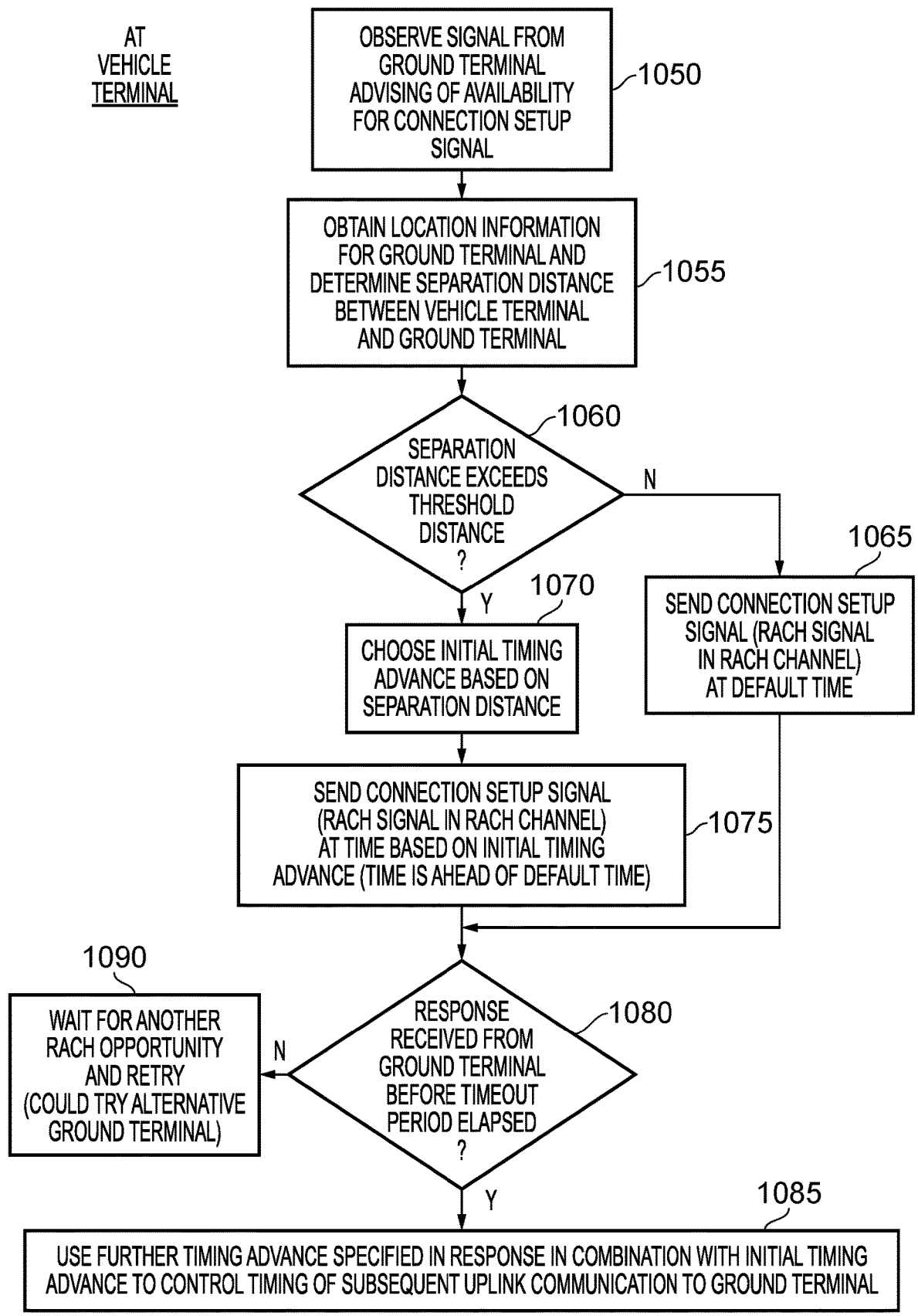
FIG. 11 is a flow diagram illustrating a process performed by the vehicle terminal in accordance with one example implementation, in order to ensure that the connection setup signal is successfully received by the ground terminal within an identified timing window even when the distance exceeds a setup threshold distance.

As shown in FIG. 11, at step 1050 the vehicle terminal 100 observes a signal from the ground terminal 130 advising of the availability for the issuance of a connection setup signal (a RACH signal). This information received by the vehicle terminal 100 also provides information about the default timing for issuing the RACH signal, the format of the RACH signal, and the format of the timing window.

At step 1055, the distance computation circuitry 120 obtains the location information for the ground terminal, and determines a separation distance between the vehicle terminal and the ground terminal. As discussed earlier, the distance computation circuitry 120 may refer to the storage 125 in order to obtain the coordinates of the ground terminal, based on that ground terminal's identifier included within the communication from the ground terminal, and can obtain information about the location of the vehicle terminal from the GPS receiver 115, hence enabling the separation distance to be determined.

At step 1060, it is determined whether the separation distance exceeds a setup threshold distance. If it does not, then the process proceeds to step 1065, where the connection setup signal is sent in the standard manner at the default timing, as per the process discussed for example earlier with reference to FIG. 10A. The setup threshold distance will depend on the RACH configuration used, i.e. the format of the RACH signal, and the size of the timing window, and the setup threshold distance will be determined not to have been exceeded if the separation distance is such that the RACH signal will be successfully received by the ground station if merely transmitted at the default timing specified by the signal received at step 1050.

However, if at step 1060 it is determined that the separation distance exceeds the setup threshold distance, then at step 1070 an initial timing advance is chosen based on that separation distance. There are a number of ways in which that initial timing advance can be determined, and one approach will be discussed later with reference to FIG. 14.

Once the initial timing advance has been determined at step 1070 then at step 1075 the RACH signal is sent in the RACH channel at a timing based on the initial timing advance. In particular, the default time is adjusted by the initial timing advance so that the RACH signal is issued ahead of the default time.

Due to the way in which the timing advance is chosen at step 1070, it will hence be ensured that the RACH signal will be received within the RACH timing window by the ground station 130 even though the separation distance exceeds the setup threshold distance.

Following either step 1065 or step 1075, the process proceeds to step 1080, where the vehicle terminal 100 waits to see if a response is received from the ground terminal before a timeout period has elapsed. In particular, even though the RACH signal will have been received within the required timing window, it is not guaranteed that the ground terminal will choose to establish a communication link with the vehicle terminal. For example, it may be that the vehicle terminal is contending with a number of other vehicle terminals to establish a communication link, and the ground terminal may choose to establish a communication link with one or more of those other vehicle terminals instead of the current vehicle terminal. For instance, certain vehicle terminals may be given priority over others, and hence it may be that the vehicle terminal being considered in FIG. 11 does not obtain a communication link at that time.

If the ground terminal chooses not to establish a communication link, it will not send a response back to the vehicle terminal, and accordingly if such a response is not received within a certain timeout period, the process proceeds to step 1090 where the vehicle terminal will wait to retry establishing a communication link.

It may be that at step 1090 the vehicle terminal waits for another RACH opportunity to be identified by the same ground terminal, and then retries establishing a communication link with that ground terminal. It could at that time take certain steps to increase the likelihood of it being allocated a communication link, such as for example increasing the power of the transmission so as to indicate to the ground terminal that a better quality communication link could be established. For example, in one implementation, the vehicle terminal estimates path loss and computes an initial RACH power for detection, selects a preamble from an available set of preambles and transmits it. If that RACH request is not successful, the vehicle terminal may autonomously choose another random preamble and increase its power for the next RACH opportunity. This can continue until the vehicle terminal's maximum transmit power has been reached.

However, the vehicle terminal is not limited to retrying to make a connection with the same ground terminal, and if it receives an initial signal from another ground terminal providing a connection setup opportunity, it could then seek to repeat the process of FIG. 11 in order to establish a link with that ground terminal.

If at step 1080 it is determined that a RACH response is received from the ground terminal, hence identifying that the ground terminal has accepted the establishment of a communication link with the vehicle terminal, then the communication control circuitry 110 within the vehicle terminal 100 will analyse the response in order to determine how to control subsequent communication with the ground terminal. In particular, a further timing advance may be specified in the response which should be used in combination with the initial (coarse) timing advance chosen at step 1070 to control the timing of subsequent uplink communication to the ground terminal. In addition, the response will typically provide information about which sub-frames are allocated to the vehicle terminal for downlink and uplink communications, so that the vehicle terminal can receive downlink communications destined for it as issued by the ground terminal 130, but can also issue its uplink communications within an appropriate sub-frame, using the cumulative timing advance determined at step 1085 so as to ensure that those uplink communications are received at the appropriate timing by the ground terminal 130.

It should be noted that while the information in the RACH response is used to provide a fine timing advance that can be combined with the coarse timing advance to determine the actual timing advance to be used for a subsequent uplink communication, as time progresses after the communication link has been established the distance between the aircraft and the ground terminal will change. This change can be compensated for using standard techniques provided by the 4G (LTE) Standard to make fine timing adjustments during the duration of the communications link.

Figure 12A:
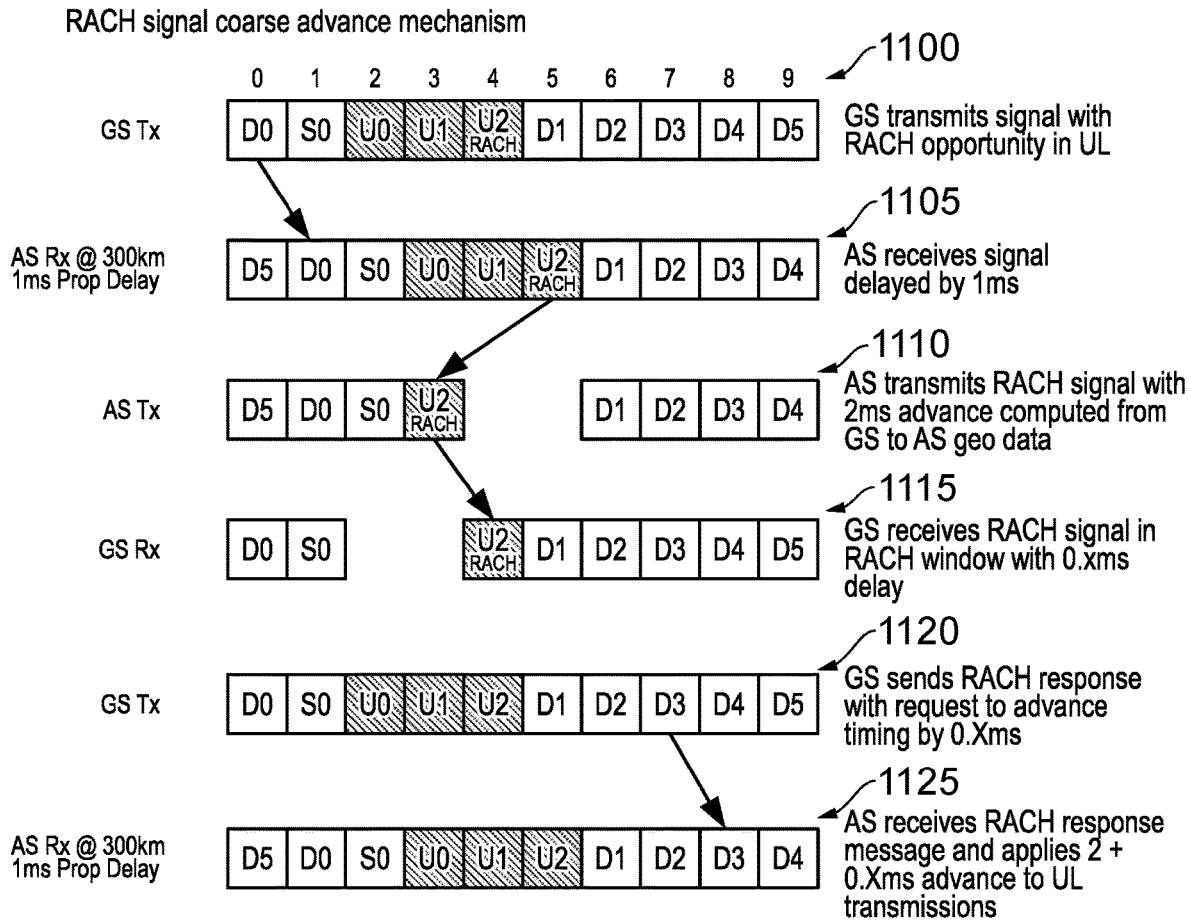
FIGS. 12A and 12B illustrate how the approach described in FIG. 11 ensures correct reception of the connection setup signal, and enables the provision of a suitable response from the ground terminal that allows a correct timing advance to be applied for future uplink communication to the ground terminal.

FIG. 12A illustrates how the process of FIG. 11 is applied for a particular implementation of the RACH signal and RACH timing window. In this example, it assumed that the RACH timing window is specified as coinciding with the third uplink communication sub-frame (U2), and that the RACH signal as transmitted will need to land entirely within that sub-frame in order for a successful communication to be established. As indicated by the line 1100, the ground station transmits a signal identifying the RACH opportunity that can be used within the uplink path. As indicated by the line 1105, due to the separation between the ground terminal 130 and the vehicle terminal 100, which in this case is assumed to be the maximum allowable distance of 300 km, the vehicle terminal 100 receives the communication frame delayed by 1 ms, and hence the communication frame is offset by a sub-frame width.

As indicated by the line 1110, because the separation distance exceeds the setup threshold distance at step 1060, an initial timing advance is chosen at step 1070 based on the separation distance, and in this case that initial timing advance will be chosen to be 2 ms. A full 2 ms advance can be applied without risk of violating a receive/transmit timing constraint, since even when the RACH signal is advanced by 2 ms, the vehicle terminal is not seeking to transmit that RACH signal at a time when it should be configured for receiving downlink communication, as is evident by the line 1110.

As indicated by the line 1115, that RACH signal will then actually be received with a 1 ms delay relative to its transmission time, which then realigns the RACH signal with the RACH timing window. Accordingly, the connection setup signal (the RACH signal) will be received, and accordingly a communication link can be established.

Assuming the ground terminal determines that a communication link is to be established with the vehicle terminal, then it will transmit a communication frame 1120 as a RACH response, which will be received with a 1 ms delay, as indicated by the line 1125. This can specify a fine timing advance if needed, which can be applied in combination with the coarse timing advance applied by the vehicle terminal to control subsequent uplink communications. The RACH response will also typically provide an indication of which sub-frames are allocated to the vehicle terminal for subsequent downlink and uplink communications.

Figure 12B:
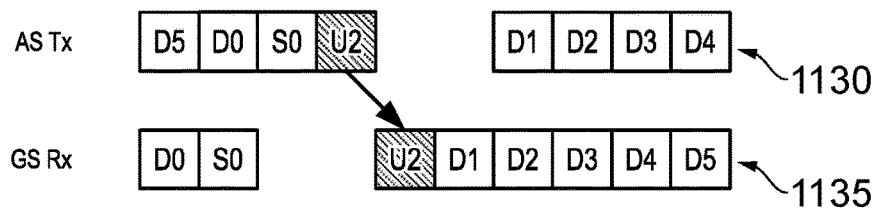

As indicated in FIG. 12B, it is assumed in this instance that the vehicle terminal is allocated as its uplink sub-frame the sub-frame U2, and will accordingly perform an uplink transmission at a timing indicated by the line 1130 for its subsequent uplink communications. As indicated by the line 1135 in FIG. 12B, due to the timing advance applied, this will ensure that the uplink communication is actually received at the correct timing by the ground terminal 130.

It should be noted that whilst in FIG. 12A it is assumed that the RACH configuration specifies that the RACH timing window is associated with the U2 sub-frame, as discussed earlier different RACH configurations can be used. For example, a RACH configuration may be used where the timing window is associated with both the U1 and the U2 sub-frames, with a longer RACH signal being issued, but with the requirement that a RACH signal lands in its entirety within the U1 and U2 sub-frames as per the timing adopted by the ground terminal 130. In another example, the RACH configuration may specify the use of all three uplink sub-frames as the RACH timing window, again with a longer RACH signal, but again with the requirement that that RACH signal lands entirely within the timing window as per the timing adopted by the ground terminal 130. The choice of RACH configuration will affect the setup threshold distance that is assessed at step 1060 of FIG. 11, and may affect the initial timing advance that is then chosen at step 1070 in situations where the distance exceeds the setup threshold distance.

For instance, whilst in the example of FIG. 12A the initial timing advance chosen based on the separation distance does not have to be constrained to take into account the requirement not to violate a receive/transmit timing constraint, with other RACH configurations the initial timing advance chosen may need to be constrained so as to ensure that the receive/transmit timing constraint is not violated. For example, it will be appreciated that if the RACH timing window occupies both the U1 and the U2 sub-frames, and a 2 ms advance was applied as per the example shown in FIG. 12A based on a separation distance of 300 km, this means that the transmission of the RACH signal will overlap with the S0 sub-frame. However, the receive/transmit timing constraint would then be violated if such an advance resulted in the need to transmit an uplink signal whilst the antenna system 105 should still be configured for downlink communication. In addition to the fact that it takes a finite time to perform the switch, as mentioned earlier it is also possible that some of the first symbols within the S0 sub-frame may be used for downlink communication, and accordingly in that instance it may not be appropriate to fully advance the initial timing by the timing that would be determined based purely on the propagation delay. Instead, it may be necessary to choose a slightly smaller coarse timing advance to avoid violating the receive/transmit timing constraint, whilst ensuring that that timing advance is sufficient to cause the RACH signal to be received within the RACH timing window. The further timing advance determined by the ground terminal will then compensate for the initial timing advance, so that cumulatively the initial and further timing advances will provide the required timing advance for subsequent uplink communication.

Figure 13:
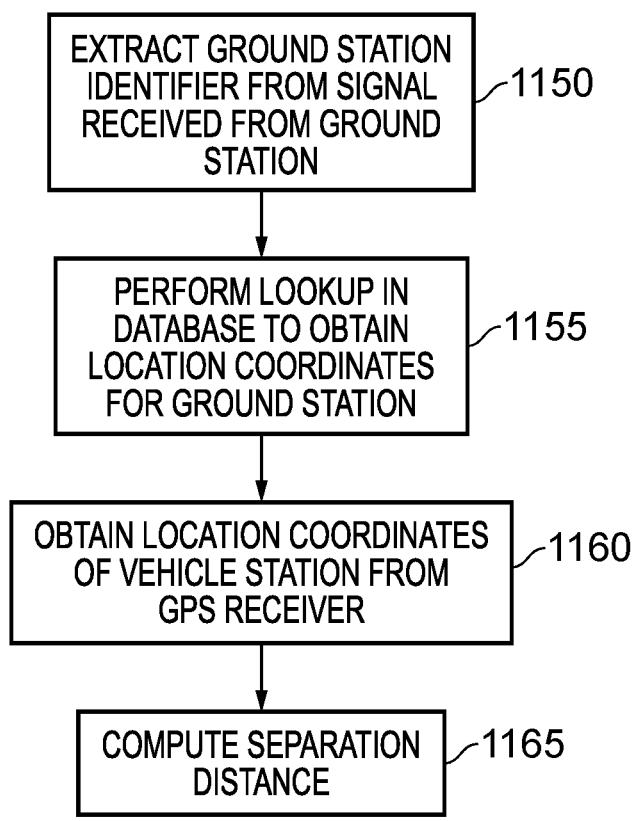
FIG. 13 is a flow diagram illustrating how step 1055 of FIG. 11 may be performed in accordance with one example implementation.

FIG. 13 is a flow diagram illustrating one way in which step 1055 of FIG. 11 may be performed. In this example, it is assumed that the initial communication from the ground station includes a ground station identifier. At step 1150, the distance computation circuitry 120 extracts that ground station identifier from the received signal, and then at step 1155 performs a lookup in the database provided within the storage 125 in order to obtain the location coordinates for the ground station.

At step 1160, the distance computation circuitry 120 then obtains location coordinates of the vehicle terminal 100 from the GPS receiver 115, and thereafter at step 1165 computes the separation distance between the ground terminal and the vehicle terminal.

Whilst the approach of FIG. 13 can be used in one example implementation, in an alternative implementation it may be that the initial signal from the ground terminal directly provided the coordinates of the ground terminal, and accordingly those coordinates could be extracted from the received signal at step 1150, and no lookup in the database would be required (hence step 1155 becoming redundant).

Figure 14:
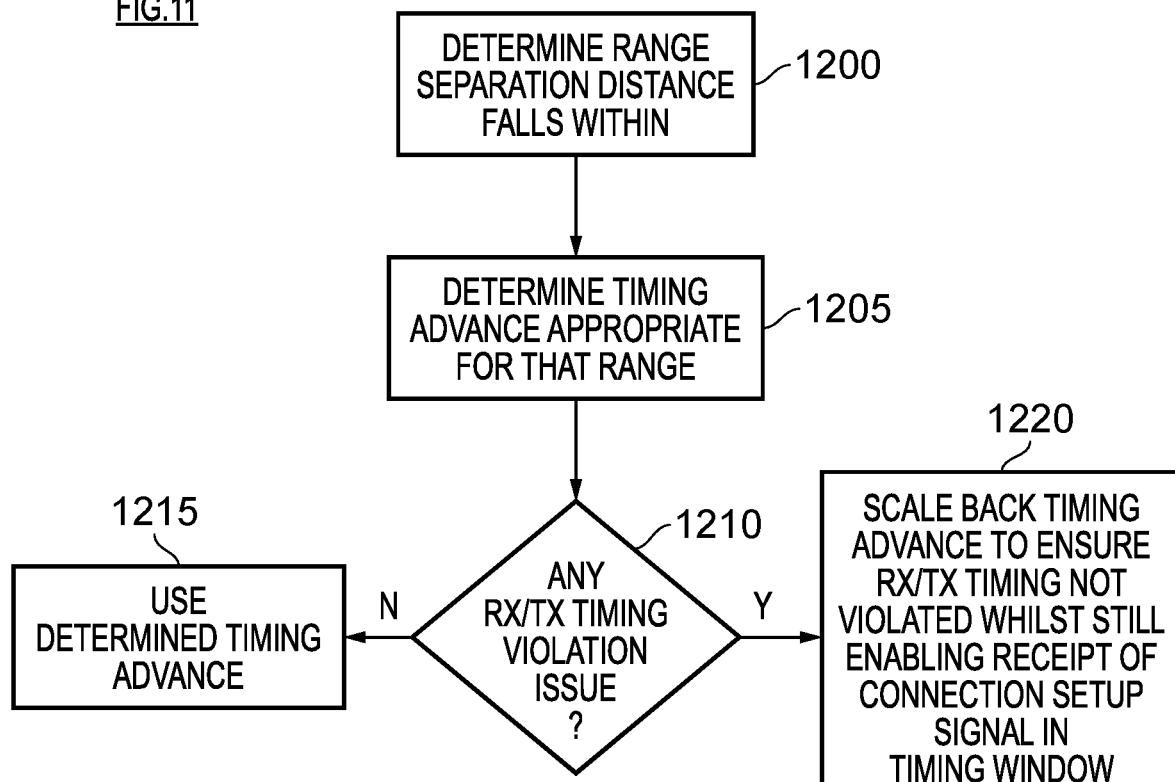
FIG. 14 is a flow diagram illustrating how step 1070 of FIG. 11 may be performed in one example implementation.

FIG. 14 is a flow diagram illustrating how step 1070 of FIG. 11 may be performed in one example implementation. At step 1200, it is determined which range of separation distances the separation distance falls within. Then, at step 1205 a timing advance appropriate for that range is determined. For instance, it could be that a lookup table is used that provides suitable coarse timing advances to be used for each of a number of different ranges. That lookup table could provide timing advances applicable for a number of different RACH configurations (i.e. for different formats of RACH signal and RACH timing window), with the lookup operation obtaining the timing advance appropriate for the determined range and RACH configuration.

However, in some implementations it may be determined that a lookup table approach based on ranges is not required, and instead the separation distance may be determined on the fly. In particular, an initial timing advance can be determined by dividing the separation distance by the speed of light.

As shown in FIG. 14, the process then proceeds to step 1210, where it is determined whether there is any receive/transmit timing violation issue. As discussed earlier, this may depend on the RACH configuration used and the separation distance in question. In particular, for RACH configurations that use multiple sub-frames, it may be the case that when the separation distance exceeds a certain amount, then there could be a receive/transmit timing violation issue if the timing advance determined at step 1205 was used "as is".

If it is determined that there is not any receive/transmit timing violation issue, then the process proceeds to step 1215 where the determined timing advance evaluated at step 1205 is used.

However, if it is determined that there is a receive/transmit timing violation issue, then at step 1220 the timing advance can be scaled back to ensure that the receive/transmit timing constraint is not violated, whilst still enabling receipt of the connection setup signal within the timing window.

In instances where the timing advance is encoded within a lookup table based on ranges of separation distance, then as mentioned earlier in one example implementation that lookup table will provide timing advance information for each of a number of different possible RACH configurations, and the prospect of violating receive/transmit timing constraints can be taken into account when populating the lookup table, so that in effect the evaluation at step 1210 is taken into account when initially populating the lookup table. In that event it will merely be sufficient to determine the range that the separation distance falls within and then obtain the appropriate timing advance to use from the lookup table at step 1205. Hence, in that case steps 1210, 1215 and 1210 would not be needed.

In one example implementation, when determining the appropriate timing advance to use, the aim is to try and land the connection setup signal within the middle of the specified timing window. By such an approach, this can allow for any inaccuracy in the timing advance applied, to ensure not only that the entire connection setup signal is received before the end of the timing window, but also that no portion of that connection setup signal is received before the start of the timing window.

It should be noted that the above coarse timing advance scheme can be applied to a wide variety of different communication schemes, for instance both TDD (time division duplex) and FDD (frequency division duplex) schemes. When employing an FDD scheme, the above-mentioned receive/transmit timing constraint issue may not apply as the antenna system can transmit and receive simultaneously, and hence steps 1210 and 1220 of FIG. 14 will not be employed.

Figure 15:
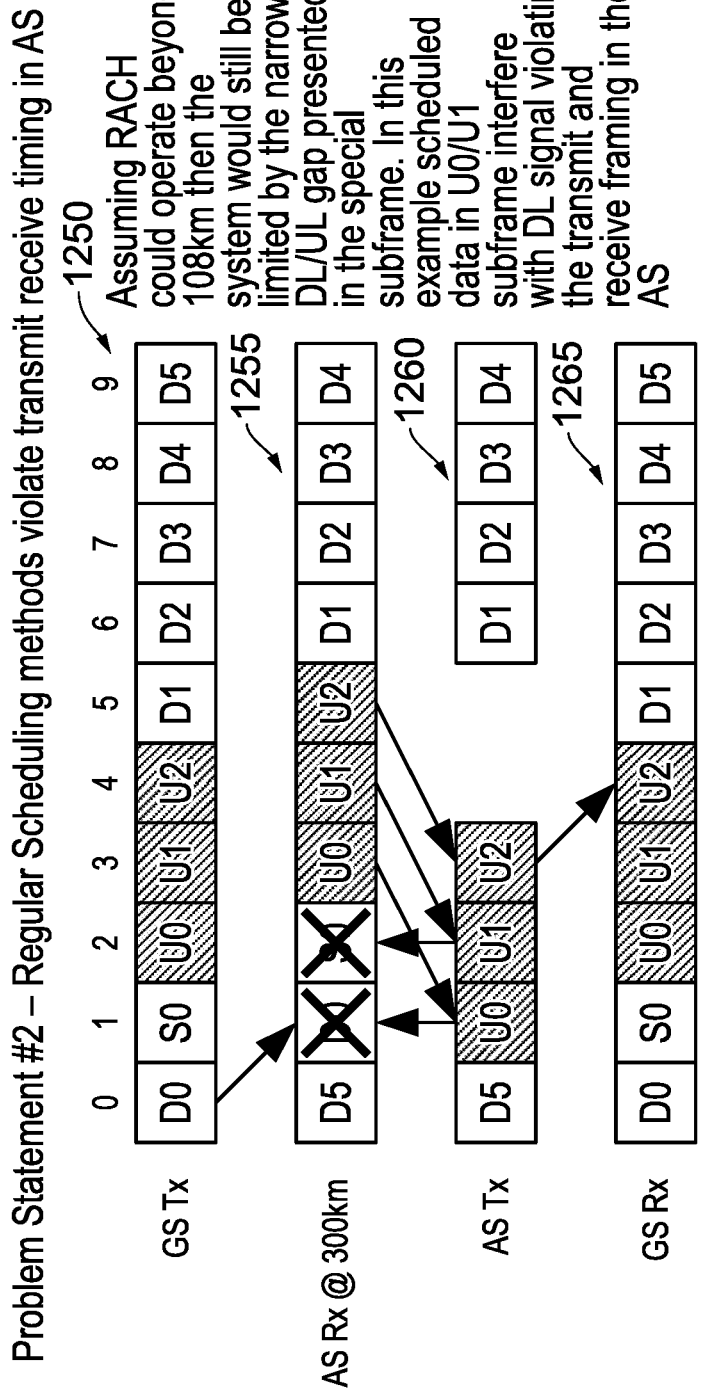
FIG. 15 is a diagram schematically illustrating a scheduling issue that can arise when the vehicle terminal is separated from the ground terminal by a distance exceeding a scheduling threshold distance.

Using the above described techniques, it is possible to establish a communication link with the ground terminal, even in situations where the separation distance between the aircraft 10 and the ground terminal 20 exceeds that supported using the standard RACH mechanism. However, as illustrated schematically in FIG. 15, a further problem that can arise is ensuring that in the subsequent uplink communications from the aircraft to the ground station 10 (using the cumulative timing advance obtained by combining the initial timing advance chosen by the vehicle terminal 100 with the fine timing advance specified in the RACH response), the earlier-mentioned receive/transmit timing constraint is not violated. In particular, as shown in FIG. 15, the communication frame format provides multiple sub-frames that can in principle be used for uplink communication, namely the sub-frames U0, U1 and U2 shown in the communication frame 1250. However, as indicated by the combination of the lines 1255 and 1260, if the scheduling circuitry 140 within the ground terminal 130 chooses to allocate resource blocks to the aircraft 10 within either the U0 or the U1 sub-frames, then if the aircraft separation distance from the ground terminal exceeds a scheduling threshold distance (in this example the scheduling threshold distance being 100 km), then the receive/transmit timing constraint would be violated.

In the example of FIG. 15, it is assumed that the separation distance between the aircraft 10 and the ground terminal 20 is 300 km, and hence from the earlier discussed FIG. 12A it will be understood that a timing advance of approximately 2 ms may be specified. However, this would overlap the sub-frames U0 and U1 with the downlink sub-frame D0 and the special sub-frame S0, and as discussed earlier the special sub-frame S0 may include some symbols transmitting downlink information. At any point in time, the antenna system 105 can only be configured for downlink communication or uplink communication, so this would violate the receive/transmit timing constraint, even though, as indicated by the line 1265, that timing advance would correctly align the uplink communications so that they are received in the relevant sub-frames U0, U1, U2 as per the timing employed by the ground terminal 130.

Figure 16A:
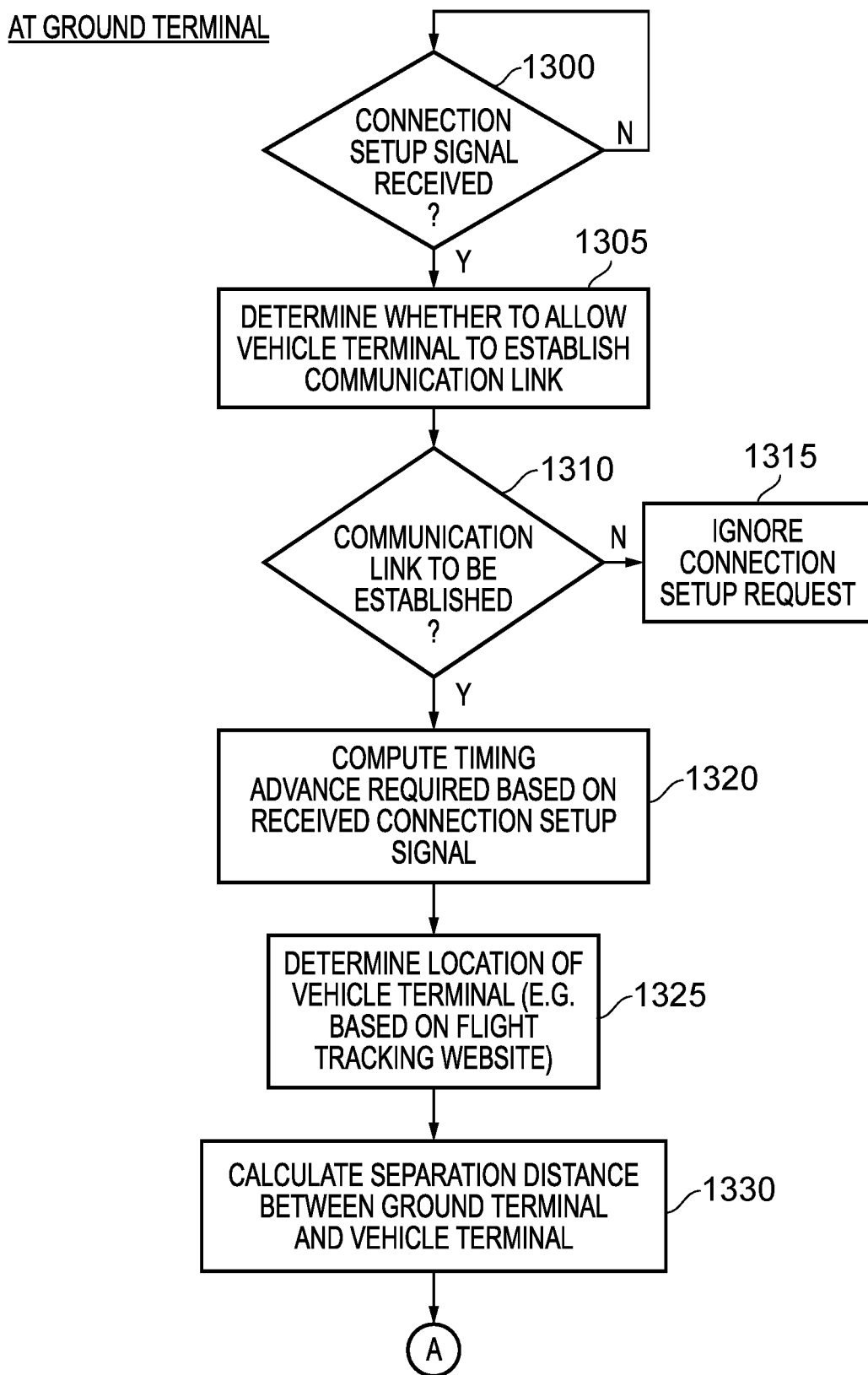
FIGS. 16A and 16B are a flow diagram illustrating a process performed by the ground terminal in order to resolve the scheduling issue illustrated in FIG. 15, in accordance with one example arrangement.
Figure 16B:
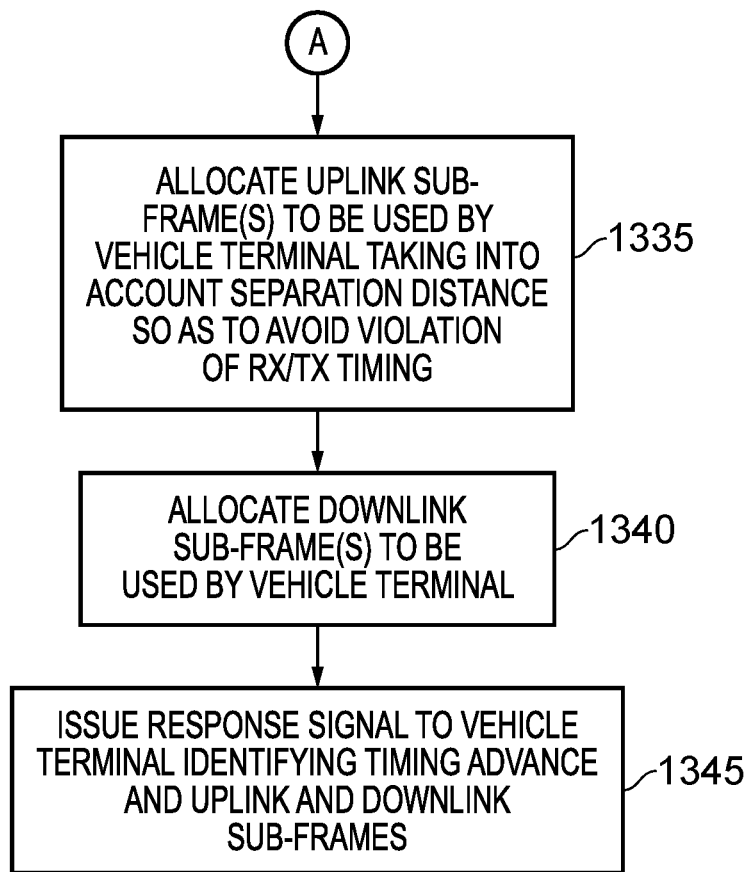

FIGS. 16A and 16B provide a flow diagram illustrating steps that can be performed by the ground terminal when determining how to schedule sub-frames to the vehicle terminal, in order to resolve the issue illustrated in FIG. 15. At step 1300, the ground terminal will await receipt of a connection setup signal, i.e. the earlier discussed RACH signal, from the vehicle terminal. Then, at step 1305 the ground terminal determines whether to allow the vehicle terminal 100 to establish a communication link with it. As discussed earlier, a number of criteria can be assessed here. For example, the quality of the communication link can be assessed, and factors such as other vehicle terminals that are seeking to establish a communication link can be considered when deciding whether to accept the establishment of a communication link with the vehicle terminal 100.

At step 1310, it is then concluded whether a communication link is to be established or not, and if not then at step 1315 the connection setup request is merely ignored. As will be apparent from the earlier discussed FIG. 11, this will result in no response being received by the vehicle terminal within a specified timeout period, and accordingly the vehicle terminal will proceed to step 1090 in order to seek to establish a communication link at a future time, either with that ground terminal 130, or with another ground terminal.

Assuming it is decided at step 1310 that a communication link is to be established, then at step 1320 the communication link establishing and scheduling circuitry 140 computes a timing advance required based on the received connection setup signal. In particular, based on the placement of the received RACH signal within the RACH timing window, a timing advance can be computed, this being the fine timing advance discussed earlier. At this stage, the computation performed by the communication link establishing and scheduling circuitry 140 does not need to take account of the actual separation distance between the aircraft and the ground terminal, since as discussed earlier that fine timing advance will be combined with any coarse timing advance initially chosen by the aircraft when sending the RACH signal, in order to determine the full timing advance to be used for subsequent uplink communication.

However, as discussed earlier care needs to be taken when scheduling uplink sub-frames for the aircraft to ensure that the receive/transmit timing constraint is not violated, and to assist in this process the ground terminal 130 does need to determine the separation between the vehicle terminal 100 and the ground terminal.

Accordingly, at step 1325 the ground terminal is arranged to determine the location of the vehicle terminal. In particular, the distance computation circuitry 145 discussed earlier in FIG. 3 can access information in order to determine the current position of the aircraft 10. There are a number of ways in which the vehicle location information can be obtained, but in one example a flight tracking website may be accessed in order to obtain current coordinate information. Thereafter, at step 1330 the separation distance between the ground terminal and the vehicle can be determined. In particular, the location of the ground terminal 130 will be fixed, and accordingly can be used when computing the separation distance.

Then, at step 1335, one or more uplink sub-frames are allocated for use by the vehicle terminal taking into account the separation distance, so as to avoid violation of the receive/transmit timing constraint. In particular, in one example arrangement there may be multiple sub-frames that can be allocated for uplink communication, such as the three sub-frames U0, U1, U2 discussed earlier. Which of those sub-frames is used when allocating uplink resource for the aircraft 10 can take account of the separation distance. This will be discussed in more detail later by way of example with reference to FIGS. 17A to 17C. However, from the earlier-discussed FIG. 15, it will be appreciated that in the particular example chosen in FIG. 15 the scheduling circuitry could avoid allocating resource blocks within the sub-frames U0 and U1, so that the aircraft is only allocated resource blocks within the sub-frame U2, such that when the timing advance is applied the receive/transmit timing constraint will not be violated.

As indicated at step 1340, downlink sub-frames are also allocated to be used by the vehicle terminal for downlink communication from the ground station to the aircraft.

Once the uplink and downlink sub-frames have been allocated, then the response signal can be issued to the vehicle terminal at step 1345 identifying both the timing advance determined earlier at step 1320, and the uplink and downlink sub-frames that are to be used for subsequent communication with the aircraft.

Figure 17A:
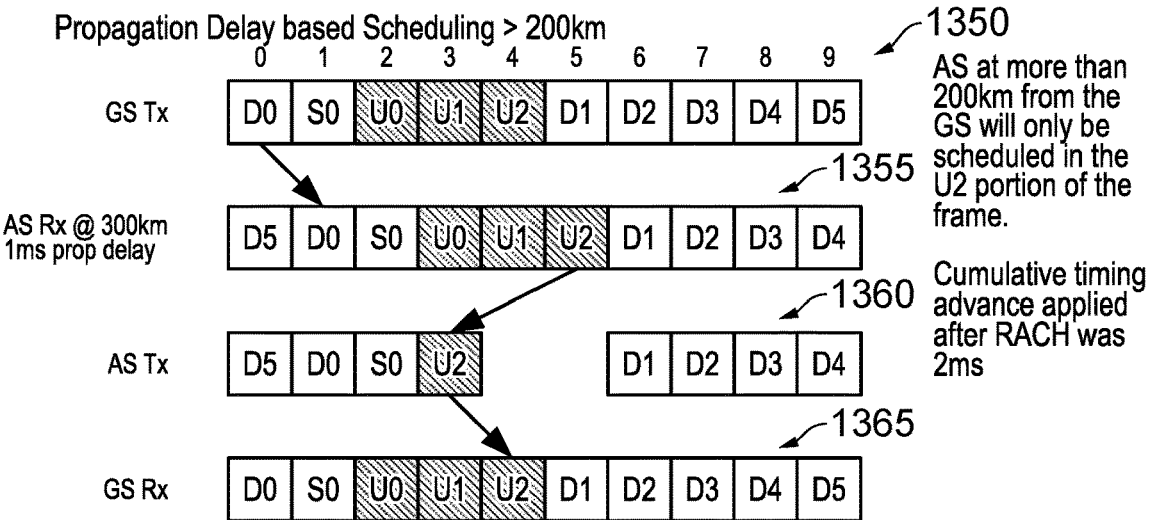
FIGS. 17A to 17C illustrate how the process of FIGS. 16A and 16B may be applied for various separation distances between the vehicle terminal and the ground terminal, in accordance with one example arrangement.
Figure 17B:
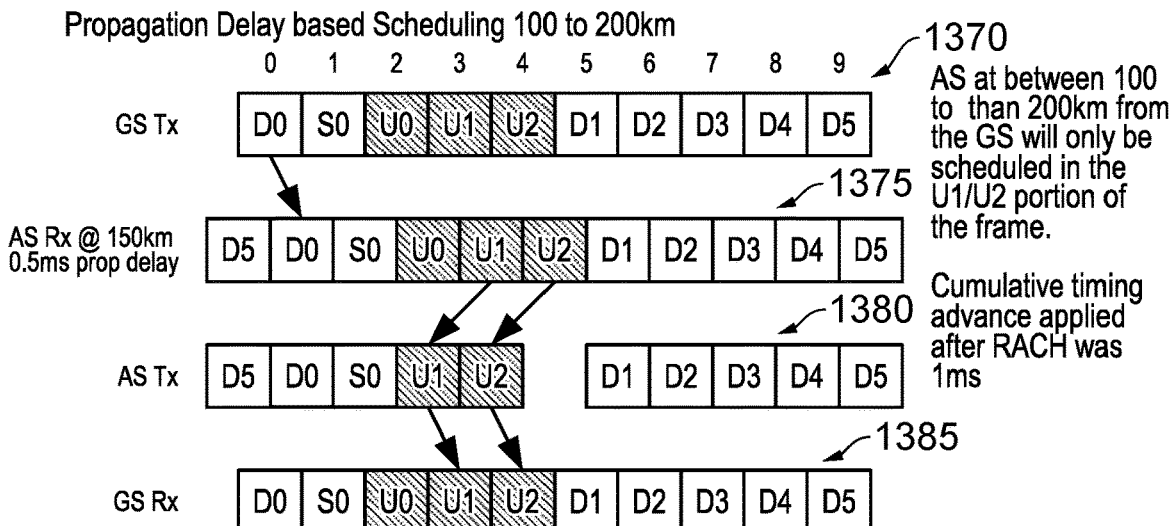
Figure 17C:
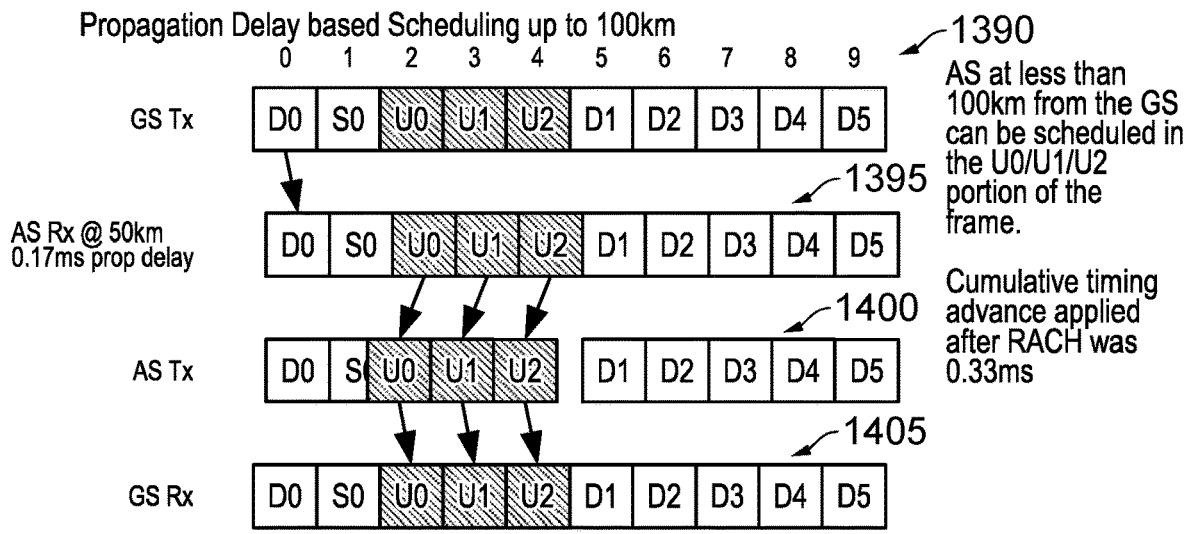

FIGS. 17A to 17C illustrate how uplink resource can be scheduled, assuming the communication frame format is as discussed earlier in FIG. 2, and accordingly there are three sub-frames that can in principle be used for uplink communication. As indicated in FIG. 17A, where it is determined that the aircraft 10 is at 300 km from the relevant ground terminal 20, the propagation delay is 1 ms, and accordingly the communication frame 1350 as transmitted by the ground terminal is received as shown by the line 1355, such that the communication is one sub-frame out relative to the transmission timing. In this example, it is assumed that the scheduling circuitry determines at step 1335 to allocate the U2 sub-frame to the vehicle terminal for use in uplink communication. As a result, as indicated by the line 1360, when the cumulative timing advance of 2 ms is applied, the downlink/uplink timing constraint is not violated. Hence, the uplink communication can be performed using this timing advance, and will ensure that it is correctly received by the ground terminal in the U2 sub-frame, as indicated by the line 1365. The approach shown in FIG. 17A can be used wherever the separation distance exceeds 200 km, provided the separation distance does not exceed 300 km.

FIG. 17B illustrates a scheduling approach that can be used when the separation distance is between 100 and 200 km. Again, the communication frame 1370 is transmitted from the ground terminal 20, and in this specific example it is assumed that the separation is 150 km, and hence the delay in receiving the communication frame is 0.5 ms as shown by the line 1375. In this scenario, the cumulative timing advance that will applied after the RACH sign-up process has been completed will be 1 ms. As a result, it is possible to accommodate uplink allocations in either or both of sub-frames U1 and U2 without violating the downlink/uplink timing constraint, as indicated by the line 1380. As shown by the line 1385, uplink communications in either of those two sub-frames will then be correctly received by the ground terminal 20.

FIG. 17C illustrates a scheduling scheme that can be used when the separation distance is less than 100 km. The communication frame 1390 is transmitted from the ground terminal, and in this instance it is assumed that the separation delay is 0.17 ms, this assuming the separation distance is 50 km. In this instance, any of the three uplink sub-frames U0, U1 or U2 can be allocated for uplink communication, since the cumulative timing advance after the RACH process has been performed will be 0.33 ms.

As shown by the line 1400, if the sub-frame U0 is used, this will cause some overlap of the U0 sub-frame transmission timing with the S0 frame. However, the extent of overlap still leaves some gap, and in particular does not overlap with any symbols within the S0 sub-frame that will be used for downlink communication, and accordingly the receive/transmit timing constraint is not violated. Further, as shown by the line 1405, any uplink communication of the three sub-frames U0, U1 or U2 will be correctly received by the ground terminal with the appropriate timing.

It is anticipated that the traffic between an aircraft and a connected ground terminal will be heavily downlink centric, for example to support the earlier-mentioned Wi-Fi connectivity for passengers within the aircraft. As will be apparent from the earlier-discussed frame format of FIG. 2, when using that frame format three sub-frames are reserved for uplink communication. This is required to allow for effective scheduling of uplink communications for aircrafts up to 300 km away from the ground terminal. However, in one example implementation the base station may be provided with the flexibility to alter the communication frame format under certain conditions, in order to allow for a larger proportion of the communication frame to be used for downlink traffic when possible.

Figure 18:
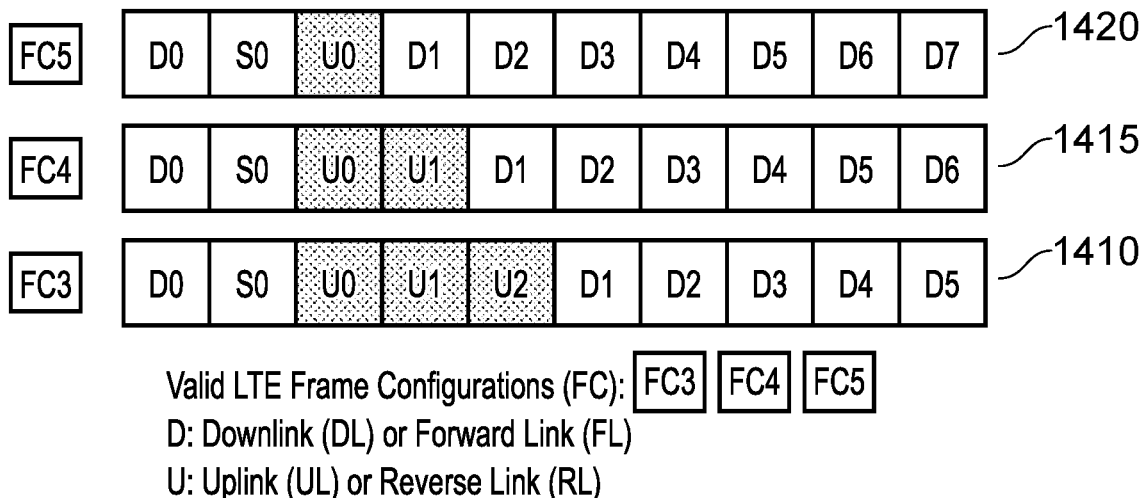
FIG. 18 illustrates multiple communication frame formats that can be supported in one example implementation.

FIG. 18 illustrates three example communication frame formats that may be used, each of which are supported LTE TDD (Time Division Duplex) frames. The frame format FC3 1410 is the format discussed earlier with reference to FIG. 2. The format FC4 1415 has one less uplink sub-frame and one more downlink sub-frame. Further, the frame format FC5 1420 has only a single uplink sub-frame, and an additional downlink sub-frame relative to the frame format FC4.

From the earlier scheduling examples illustrated with reference to FIGS. 17A to 17C, it will be appreciated that it is only when the separation distance exceeds 200 km (referred to in FIG. 18 as long range (LR)) that there is a need to schedule uplink communication in the last of the three uplink sub-frames, and hence the requirement to use communication frame FC3. When the distance is between 100 and 200 km (referred to in FIG. 18 as medium range (MR)), then uplink communication can be scheduled in the second uplink sub-frame, and hence it would still be possible to schedule uplink communications even if the communication frame format FC4 was used. Similarly, it will also be appreciated that if the communication frame format FC4 is used, uplink communication with aircraft up to 100 km away (referred to in FIG. 18 as short range (SR)) can also be accommodated when using the communication frame format FC4.

Finally, it will be appreciated that if the aircraft is less than 100 km away, then the communication frame format FC5 could be used, since uplink communication can be scheduled in the first uplink sub-frame (which happens to be the only uplink sub-frame in the frame format FC5).

Figure 19:
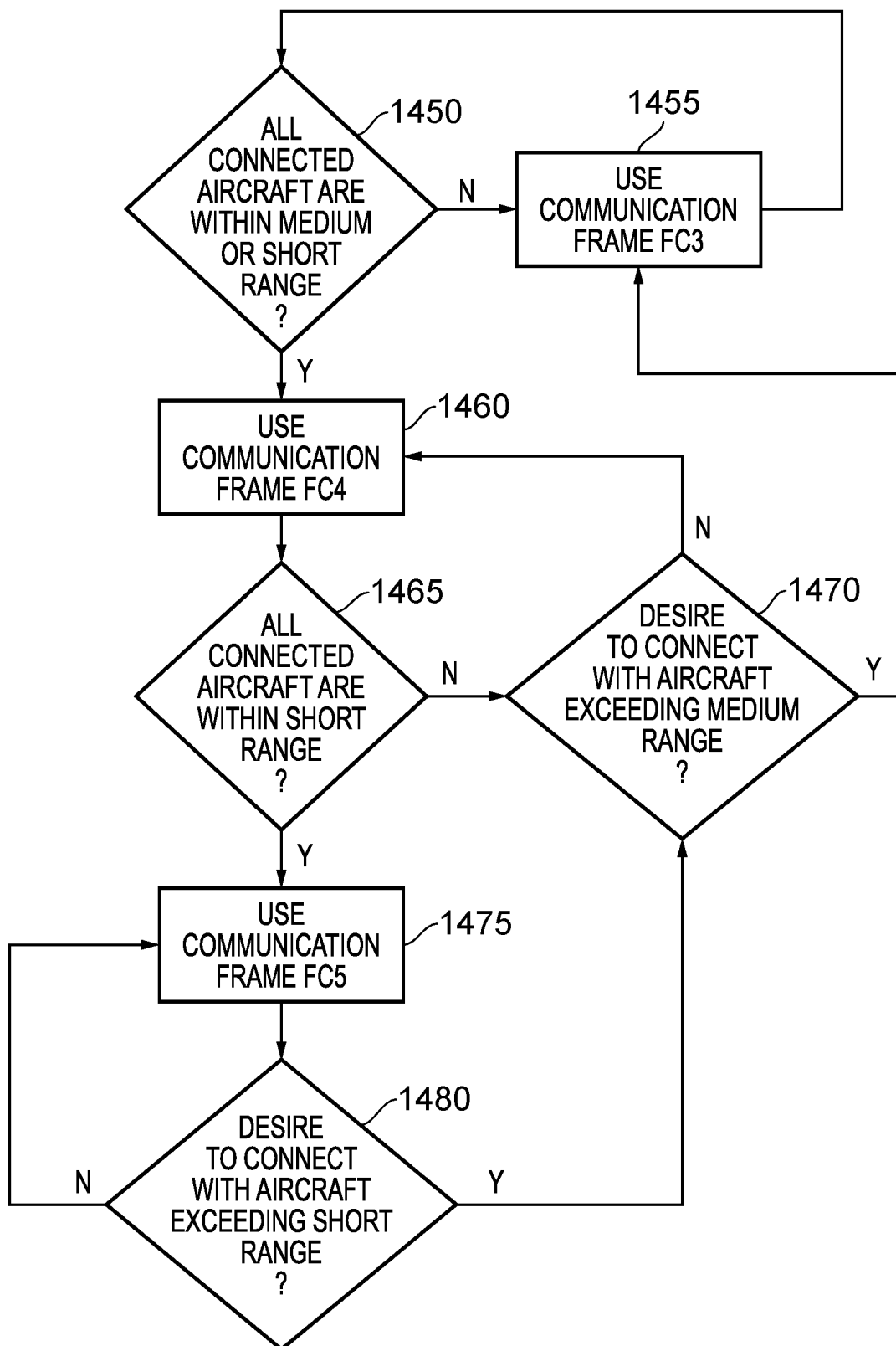
FIG. 19 is a flow diagram illustrating how the ground terminal in one example implementation can switch between the communication frame formats of FIG. 18 as separation distances permit, in order to seek to increase the proportion of the communication frame available for downlink communications.

FIG. 19 is a flow diagram illustrating how the ground terminal could make use of the three communication frame formats shown in FIG. 18 in order to facilitate a higher downlink capacity when the location of the connected aircrafts permits. At step 1450, it is determined whether all of the aircraft connected to that ground station are within the medium or short ranges. If not, then the communication frame FC3 is used at step 1455, and the process returns to step 1450.

However, if all of the connected aircraft are within the medium or short range, then the process can proceed to step 1460 where the aircraft terminal can switch to using communication frame FC4. A broadcast signal can be sent from the ground terminal to all of the connected aircraft terminals to advise them of the change in the communication frame. Once step 1460 has been implemented, it will be appreciated that there is an additional downlink sub-frame available when compared with the communication frame FC3.

Following step 1460, it can be determined at step 1465 whether all connected aircraft are within the short range. If not, it is then determined at step 1470 whether there is a desire to connect with an aircraft exceeding the medium range. For example, the ground terminal may receive a RACH signal from an aircraft within the long range seeking to establish a connection, and the ground terminal may decide that it wishes to service that request. Alternatively, it may be known that one of the already connected aircraft is about to leave the medium range into the long range, and it may be desirable to maintain connection with that aircraft. If it is determined at step 1470 that there is desire to connect with an aircraft exceeding the medium range, then the process proceeds to step 1455 where a switch is made to using the communication frame FC3. Again, a broadcast signal can be sent from the ground station to identify this change in the communication frame.

However, if at step 1470 it is determined that there is no desire to connect with an aircraft exceeding the medium range, then the process can merely return to step 1460.

If at step 1465 it is determined that all of the connected aircraft are within the short range, then the process can proceed to step 1475 where the communication frame FC5 can be used. Again, a broadcast signal can be sent from the ground terminal to advise of the change in the communication frame format.

Following step 1475, it can be determined at step 1480 whether there is a desire to connect with an aircraft exceeding the short range. If not, the process merely returns to step 1475 where the communication frame format FC5 continues to be used. However, if at step 1480 it is determined that there is a desire to connect with an aircraft exceeding the short range, then the process proceeds to step 1470 where the earlier-discussed analysis is performed.

Accordingly, by such an approach, it can be seen that the ground terminal can make use of multiple communication frame formats so as to seek to maximum the downlink capacity available, taking into account the separation between that ground terminal and the relevant aircraft. This can further improve capacity within the network.

In one example implementation where lookup tables are used to determine initial timing advances to be applied for RACH signals, those lookup tables can be updated as necessary dependent on the communication frame format currently being employed by the ground terminal.

Figure 20:
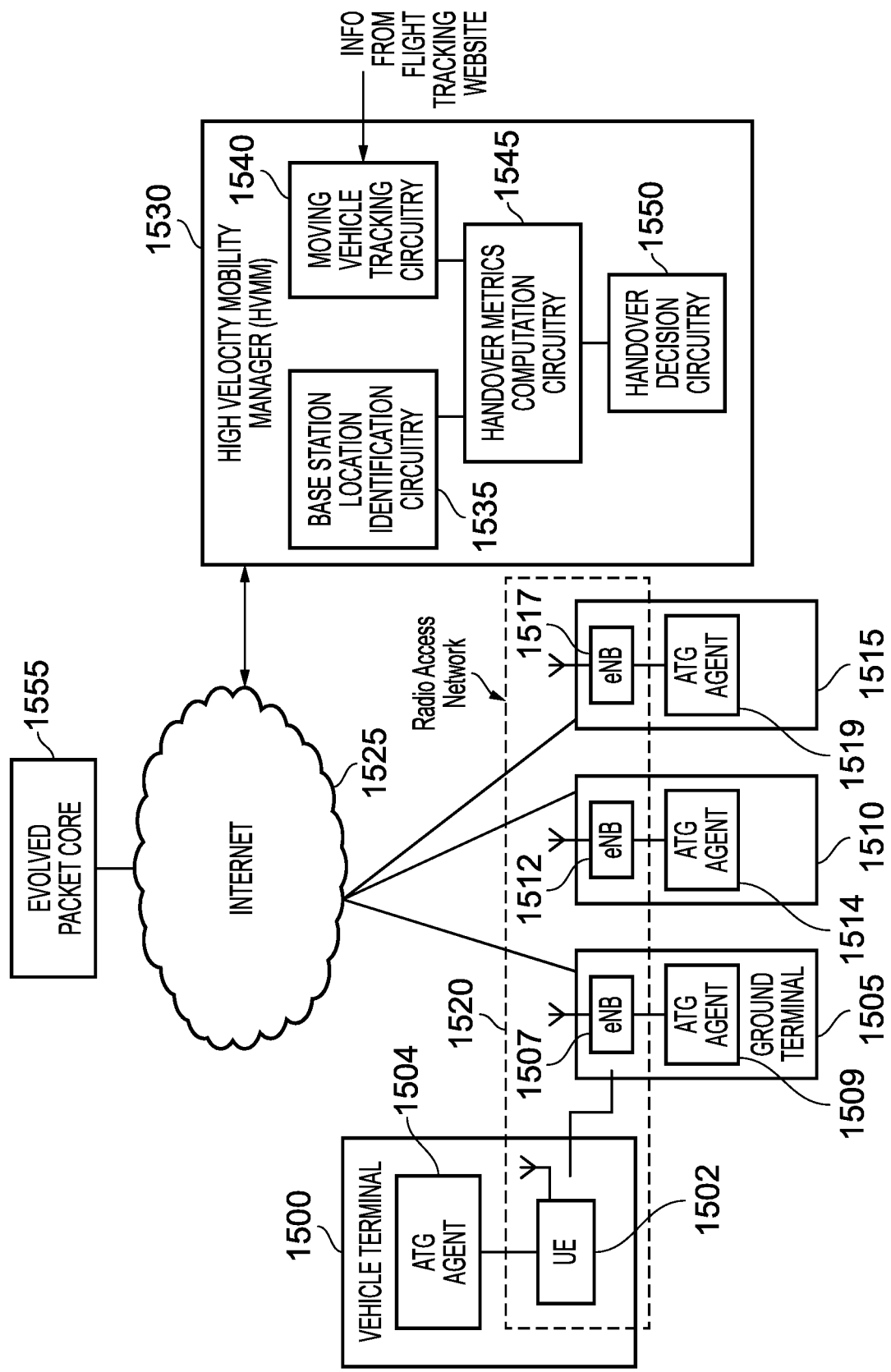
FIG. 20 is a block diagram schematically illustrating the use of a high velocity mobility manager within an ATG system in accordance with one example implementation.

FIG. 20 is a block diagram illustrating the use of a high velocity mobility manager (HVMM) 1530 to perform a handover analysis process used to control the handover decisions made within a radio access network 1520. It is assumed in this example that the radio access network 1520 is a wireless network conforming to the 4G (LTE) telecommunications Standard. An evolved packet core 1555 is used in the standard manner to implement a framework for providing converged voice and data on a 4G (LTE) network, and in particular unifies voice and data on an interne protocol (IP) service architecture with voice being treated as another IP application. In the example shown the various ground base stations 1505, 1510, 1515 (also referred to as ground terminals) of the radio access network are coupled to the evolved packet core 1555 via the Internet 1525. Only three ground base stations are shown for ease of illustration, but it will be appreciated that there will typically be significantly more ground base stations within the network.

Within a moving vehicle that is to make use of the radio access network 1520, a vehicle terminal 1500 is provided which may comprise one or more items of user equipment 1502 with an associated antenna to perform wireless communication with corresponding base station nodes 1507, 1512, 1517 (also referred to herein as eNodeBs or eNBs) within the ground terminals 1505, 1510, 1515. Control circuitry (also referred to herein as ATG (Air to Ground) agents 1504, 1509, 1514, 1519) can also be provided within the vehicle terminal 1500 and ground terminals 1505, 1510, 1515 to control the operation of the connected radio access network components. Hence, by way of example, IP packets may be exchanged between the high velocity mobility manager (HVMM) 1530 and the ATG agents 1509, 1514, 1519 within the ground terminals 1505, 1510, 1515 via the Internet 1525, in order to control and/or influence handover procedures performed within the radio access network, and such information can also be propagated on via the radio access network to the ATG agent 1504 within the vehicle terminal 1500. In addition the vehicle terminal ATG agent 1504 can report handover metrics to the HVMM 1530 if they are available, with these metrics for example being obtained from information systems on board the vehicle.

The high velocity mobility manager 1530 provides a centralised resource for computing handover metrics that may be used to determine an appropriate target base station when performing a handover procedure to transition communication with the moving vehicle from a current connected base station (for example, the base station 1505 in the example of FIG. 20) to that target base station (which may for example be one of the other base stations 1510, 1515 shown in FIG. 20). Whilst only a single vehicle terminal 1500 is shown in FIG. 20 for simplicity, it will appreciated that in a normal ATG network, there may be multiple aircraft connected to the wireless network, and the HVMM 1530 can generate handover metrics for each of those connected aircraft.

It should also be noted that whilst an aircraft is given as an example of a moving vehicle to which the techniques described herein may be applied, the techniques can be applied to other types of moving vehicles, for example a train, where the ground terminals may typically be spread out along the track.

As shown in FIG. 20, the HVMM 1530 includes base station location identification circuitry 1535 used to obtain base station location information for a variety of base stations that provide the wireless network 1520. Typically the base stations will be fixed, and accordingly their location information will be fixed. Hence, in one example implementation the base station location identification circuitry may take the form of a database storing the location coordinates of each of the base stations forming the radio access network.

In addition, the HVMM 1530 includes moving vehicle tracking circuitry 1540 for obtaining position and velocity information for the moving vehicle. In some implementations, the moving vehicle tracking circuitry 1540 may also obtain bearing information indicative of the direction in which the aircraft is pointing. It will be appreciated that due to prevailing winds the direction of travel of the aircraft may differ to the bearing, and in some instances it can be useful to have knowledge of the bearing of the aircraft, as for example will be discussed later with reference to the calculation of antenna gain metrics.

There are a number of ways in which the moving vehicle tracking circuitry 1540 may obtain the relevant information about the moving vehicle. For example, that information may be reported directly via the vehicle terminal through the radio access network 1520 to the connected base station 1505, from where it can be reported back to the moving vehicle tracking circuitry. However, alternatively the moving vehicle tracking circuitry may be able to obtain this information from flight tracking facilities such as a flight tracking website. In particular, flight tracking systems already exist that can be accessed to provide information such as the position and velocity of the aircraft.

As shown in FIG. 20, the handover metrics computation circuitry has access to both the base station location identification circuitry 1535 and the moving vehicle tracking circuitry 1540, and is arranged to generate at least one handover metric computed from the position and velocity information for the moving vehicle and the base station location information. Each generated handover metric can then be referenced when determining a target base station to be used when performing a handover procedure to transition communication with the moving vehicle from a current base station to the target base station.

The handover metrics generated by the handover metrics computation circuitry can be used in a variety of ways. For example, those handover metrics could be reported in suitable IP packets transferred via the Internet to the currently connected ground terminal for use in evaluating a suitable target base station to which communication should be transferred during a handover procedure. However, in one example implementation the HVMM 1530 also includes handover decision circuitry 1550 for making handover decisions based on the handover metrics generated by the handover metrics computation circuitry 1545. In such an implementation, the handover decision circuitry can then be arranged to issue a signal via the Internet 1525 to the connected ground terminal 1505 to initiate a forced handover from the current ground terminal to a target ground terminal identified by the handover request issued by the handover decision circuitry 1550. Existing mechanisms can then be used to perform the handover procedure, for example a "blind handover" mechanism.

Figure 21:
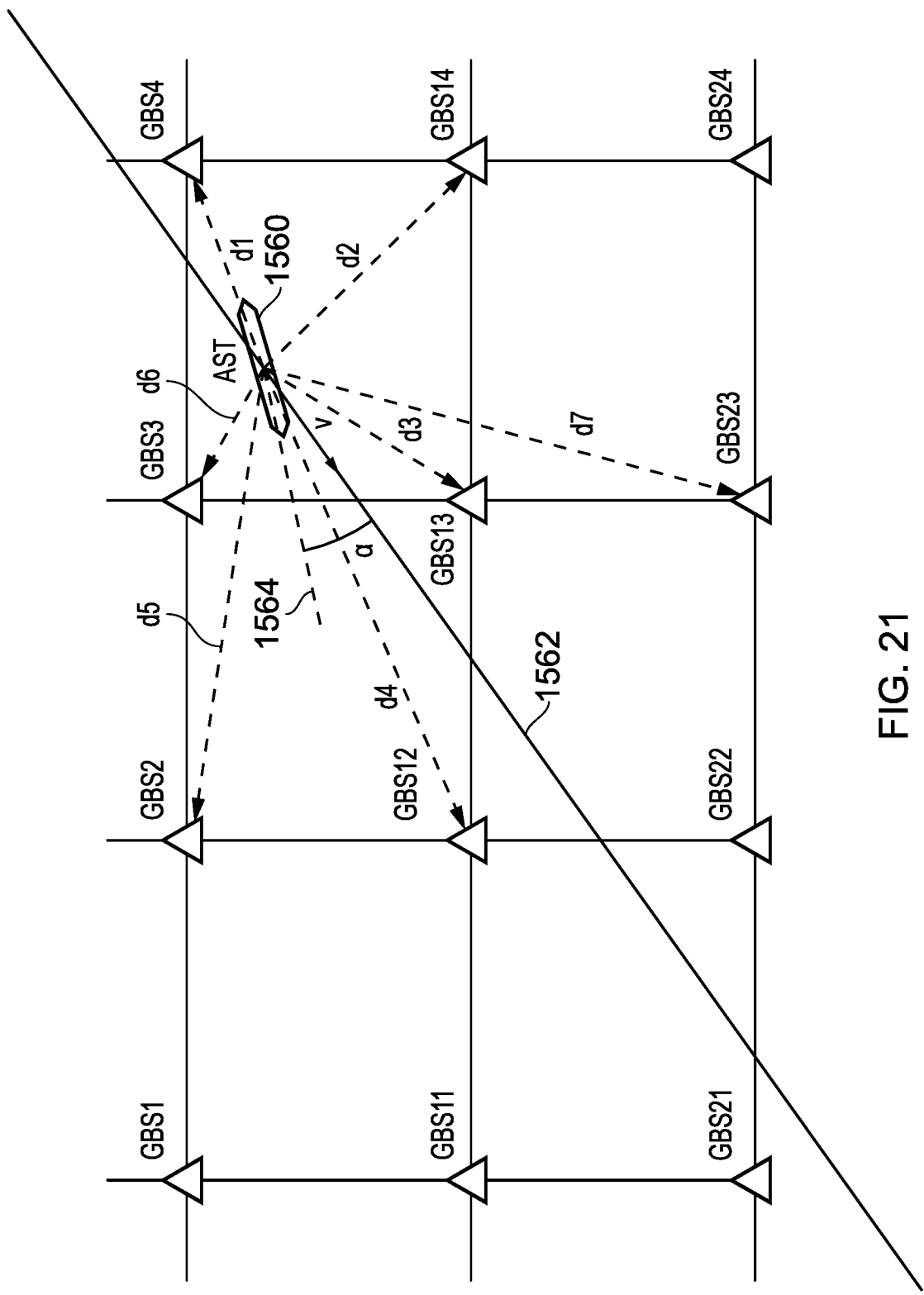
FIG. 21 schematically illustrates an aircraft in flight over a grid of ground stations.

FIG. 21 is an aerial view schematically illustrating an aircraft 1560 travelling across a network of ground base stations arranged in a generally grid-like manner. Given that the handover metrics computation circuitry has access to base station location information, and to the current position and velocity information for the aircraft 1560, it can determine separation vectors between the aircraft 1560 and each of a plurality of ground base stations within the wireless network, the separation vectors being denoted in FIG. 21 by the references d1 to d7.

In the illustrated example the aircraft 1560 is travelling in the direction 1562 with velocity v. It will be appreciated that, once the separation vectors have been determined, and given that the velocity is known, the handover metrics computation circuitry can determine the component of the velocity along each separation vector. As will be discussed in more detail later, this information can be used in the determination of one or more of the handover metrics computed by the handover metrics computation circuitry.

As shown in FIG. 21, the bearing of the aircraft 1560 is denoted by the dotted line 1564 and an angular separation between the bearing 1564 and the direction of travel 1562 is shown as the angle α in FIG. 21. The bearing information can be useful when determining one or more of the handover metrics, as will be discussed in more detail later for example with reference to FIG. 25.

Figure 22:
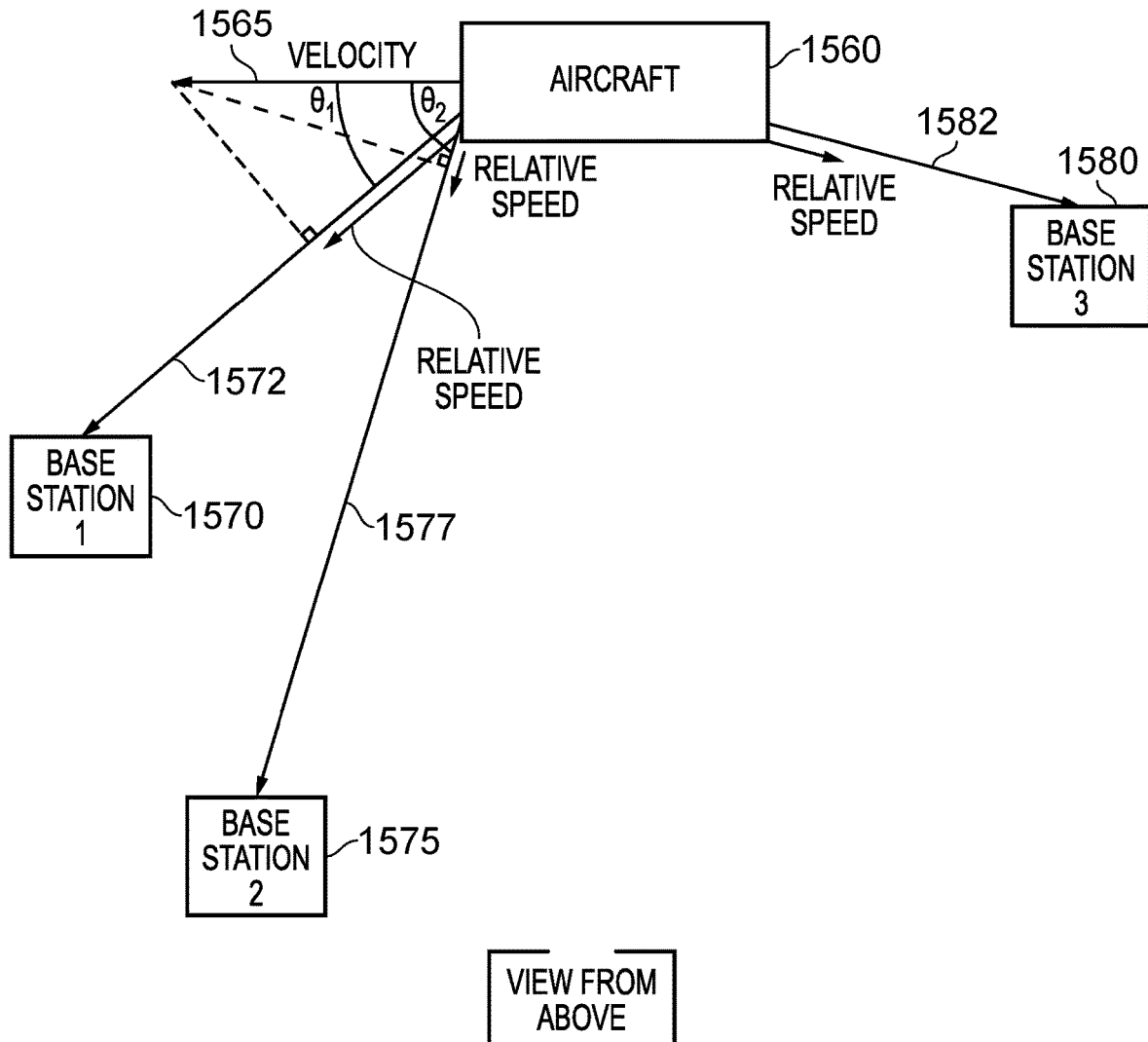
FIGS. 22 to 25 schematically illustrate four criteria that can be taken into account, either alone or in combination, when making handover decisions in accordance with the technique described herein.

A number of criteria can be assessed by the handover decision circuitry 1550 when making handover decisions, and corresponding handover metrics for use when applying those criteria can be produced by the handover metrics computation circuitry 1545. One example criteria that may be used is illustrated schematically in FIG. 22. In particular, in this example, it may desired to minimise the Doppler effect by seeking to classify the various candidate target base stations by the relative speed between those base stations and the vehicle. As shown in FIG. 22, the aircraft 1560 is moving in the direction 1565. FIG. 22 schematically illustrates an aerial view looking down on the aircraft and the underlying base stations, and in particular shows three base stations 1570, 1575, 1580. One of these base stations may be the base station that the aircraft is already connected to, whilst the others are candidate target base stations to which communication might be transferred during a handover operation. Alternatively all of the base stations shown may be candidate target base stations.

As shown schematically in FIG. 22, separation vectors 1572, 1577, 1582 can be computed for each of the base stations, providing an indication of the direction of separation between the aircraft and the various base stations. A component of the velocity can then be computed along with various separation vectors, in order to identify the relative speed between the aircraft 1560 and each of the base stations 1570, 1575, 1580. As the relative speed between the aircraft and a base station increases, then so the Doppler effect will increase. Accordingly, purely by way of example, it will be appreciated that the base station 1575, although further away than the base station 1570, has a lower relative speed between it and the aircraft than does the base station 1570. By taking relative speed into account when assessing an appropriate candidate target base station to transfer communication to during a handover process, this may increase the likelihood of selecting base station 2 1575 rather than base station 1 1570 in this instance.

Whilst the relative speed can be a signed value, hence identifying whether the aircraft is moving towards the base station or away from the base station, in one example implementation it is only the magnitude of the relative speed that is of interest to the first criteria shown in FIG. 22, and hence the sign information may be ignored.

Figure 23:
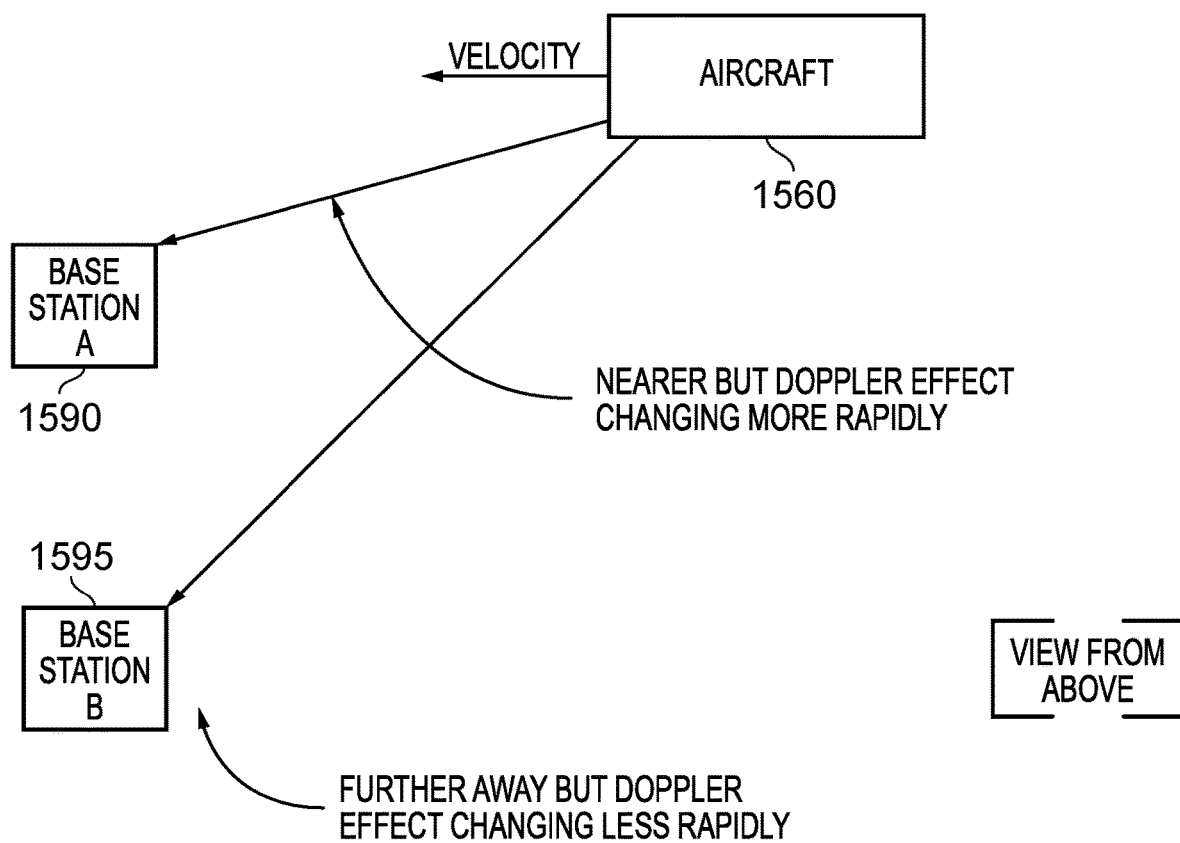

A second criterion that may be considered when making the handover decision is illustrated schematically in FIG. 23. In particular, it may be desirable to seek to minimise the effect of fast changes of Doppler from positive to negative by classifying the base stations in terms of the speed of change of the Doppler effect. FIG. 23 schematically illustrates two base stations 1590, 1595 that the aircraft 1560 is moving towards. In order to enable criterion 2 to be assessed, the handover metrics computation circuitry 1545 may generate a Doppler effect metric indicating a speed of change of the Doppler effect on transmitted signals between the moving vehicle and a candidate target base station. This metric can be produced by computing a change in relative speed between the moving vehicle and the candidate target base station. From FIG. 23, it will be appreciated that the change in relative speed is more marked in relation to base station 1590 than it is in relation to base station 1595. Hence, whilst base station 1590 is nearer to the aircraft 1560, the Doppler effect may be changing more rapidly, whereas for the base station 1595 the Doppler effect may be changing less rapidly. Hence, even though the base station 1595 is further away, assessment of criterion 2 may increase the likelihood of base station 1595 being selected as the target base station for the handover process.

FIGS. 22 and 23 illustrate two criteria that seek to compensate for the Doppler effect caused by the relatively high velocity of the aircraft. However, another issue that can arise within air to ground systems results from the relatively large distances that may exist between the base stations, and hence the relatively large separation distance that may exist between the aircraft and any particular candidate target base station. As will be apparent from the earlier discussions, the aircraft terminal may need to perform timing advance operations with regards to the signals that it transmits in order to ensure that those signals are received at the connected ground terminal at an appropriate timing. With regards to the uplink communications from the aircraft to the connected ground base station, it will be appreciated for example from the earlier discussion of FIG. 18 that the number of sub-frames available for uplink communication may be reduced as the separation distance increases, and hence this can lead to a loss of uplink capacity as the separation distance increases.

Figure 24:
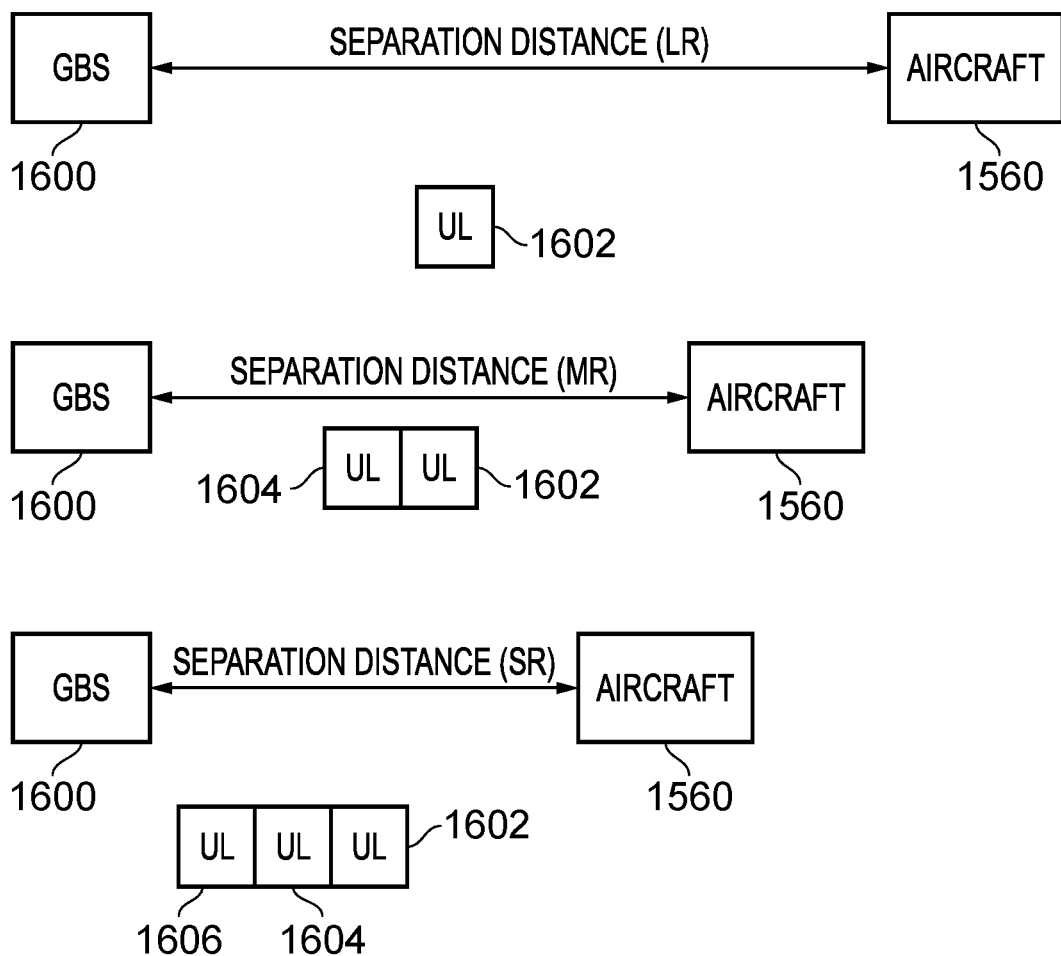

Accordingly, another criterion that can be used when making handover decisions is the criterion 3 schematically illustrated in FIG. 24, where the aim is to seek to minimise the loss of uplink capacity as a result of the uplink timing advance algorithms that may need to be employed within the system. As shown in FIG. 24, when the separation distance between the aircraft 1560 and a ground base station 1600 is relatively large, referred to herein as long range (LR), then there may be only a single uplink sub-frame 1602 available. However, when the separation distance reduces to medium range (MR), there may be two uplink sub-frames 1602, 1604 available. Further, if the separation distance reduces to short range (SR) then there may three uplink sub-frames 1602, 1604, 1606 available.

The handover metrics computation circuitry 1545 may be arranged to generate an uplink capacity metric indicative of the available uplink capacity, and in particular taking into account knowledge of the number of uplink sub-frames available for uplink communication. As will be discussed in more detail later, other information can also be factored in to the generation of such uplink capacity metrics. For example, the handover metrics computation circuitry may receive capacity reports from the candidate target base stations indicative of existing uplink capacity utilisation, and then factor that information into the production of the uplink capacity metric. For instance, if one candidate target base station already has a significant number of aircrafts connected to it, then even though it may be relatively close to the aircraft for which the handover metrics are being produced, and hence there may be for example three uplink sub-frames available, it may be that those three uplink sub-frames are relatively highly utilised. Conversely, a candidate target base station that is at a large separation distance may only have one uplink sub-frame available, but may be lightly utilised, due for example to a low number of aircraft being connected to that base station. Hence, whilst the uplink capacity metric could be computed based purely on the separation distance, and hence an understanding of the number of uplink sub-frames available, it can in some implementations also take into account an indication of the actual capacity utilisation when determining a suitable uplink capacity metric for a particular candidate target base station. Hence, this allows the indication of the number of available uplink sub-frames determined based on the separation distance to be normalised taking into account the available capacity.

Another criterion that can be considered when seeking to make handover decisions is a prediction of expected received signal power for each candidate target base station. It has been found that the handover metrics computation circuitry can be arranged to generate a handover metric that provides a prediction of expected signal strength, but without needing to receive any signal strength metric reports from the aircraft. In particular, based on bearing information for the aircraft, and knowledge of the antenna deployment within the aircraft, it has been found that the handover metrics computation circuitry can generate a suitable metric indicative of expected signal strength. This is illustrated schematically in FIG. 25.

Figure 25:
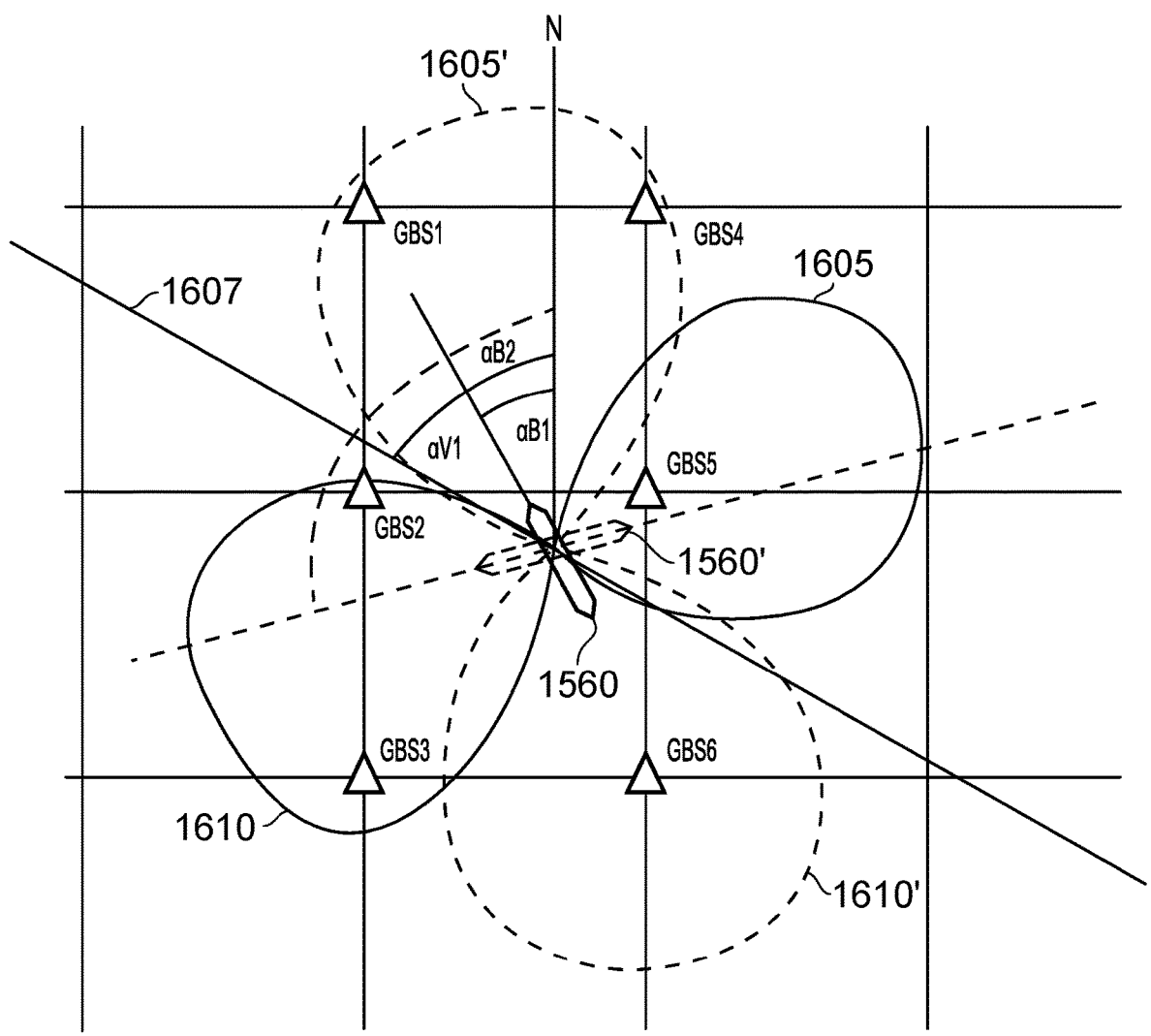

In FIG. 25, the aircraft is travelling at a velocity V1 along the direction 1607. However, two different bearings of the aircraft are considered. In a first example, the aircraft is orientated as shown by the reference numeral 1560, and has hence adopted a bearing $\alpha B1$ relative to north. In a second example, the aircraft is orientated as shown by the reference numeral 1560' and has hence adopted the bearing $\alpha B2$ relative to north. The actual direction of travel relative to north is given by the angle $\alpha V1$, and this is the direction of travel for both example orientations shown in FIG. 25 (it being assumed that prevailing wind conditions are different between the two orientations shown, hence resulting in the different bearings adopted for those two example orientations).

Also shown in FIG. 25 are six example ground base stations. In this example implementation, it is assumed that the handover metrics computation circuitry is provided with antenna configuration information for the aircraft, and hence has sufficient knowledge to know the form of the beam patterns that will be produced by the antennas on the aircraft. It will be appreciated that the antennas will typically be at a fixed location on the aircraft, but may be provided with various beam steering capabilities, whether those be mechanical and/or electronic beam steering capabilities. A number of different modes may be provided for the beam patterns, but with knowledge of the mode being deployed by the aircraft, the handover metrics computation circuitry will have knowledge of the beam patterns produced by the antennas on the aircraft.

In the example shown in FIG. 25, a simple shape of beam typical for a single antenna is shown, and in particular for the aircraft position 1560 two beam lobes 1605, 1610 are shown. In particular, it will be appreciated that in this example beams are formed on each side of the aircraft. If instead the aircraft adopts the orientation 1560' then the corresponding beams become 1605' and 1610'.

Accordingly, it can be seen that if the separation vector for each of the candidate target base stations is computed in the manner discussed earlier, and the bearing and antenna configuration for the aircraft are provided, the handover metrics computation circuitry can predict an antenna gain for each of the ground base stations. Indeed, with this information it can be determined whether there are any ground base stations that are likely to be out-of-range or have a very poor antenna gain. In particular, in the example of FIG. 25 it will be appreciated that when the aircraft adopts the orientation 1560, the ground bases stations GBS2, GBS3 and GBS5 will be within the coverage area and a prediction of the antenna gain can be made for each of those ground base stations. However, the same analysis will identify that ground base stations GBS1, GBS4 and GBS6 will not be suitable candidate target base stations. Conversely, if the orientation 1560' is adopted, the ground base stations GBS1, GBS4 and GBS6 become suitable candidate target base stations, but the candidate target base stations GBS2, GBS3 and GBS5 are not suitable.

Hence, the prediction of the antenna gain using this approach can be particularly useful. Not only can it provide antenna gain information for a number of candidate target base stations, it can also effectively be used to discount certain candidate target base stations for which there is unlikely to be an accepted minimum level of signal strength.

Figure 26:
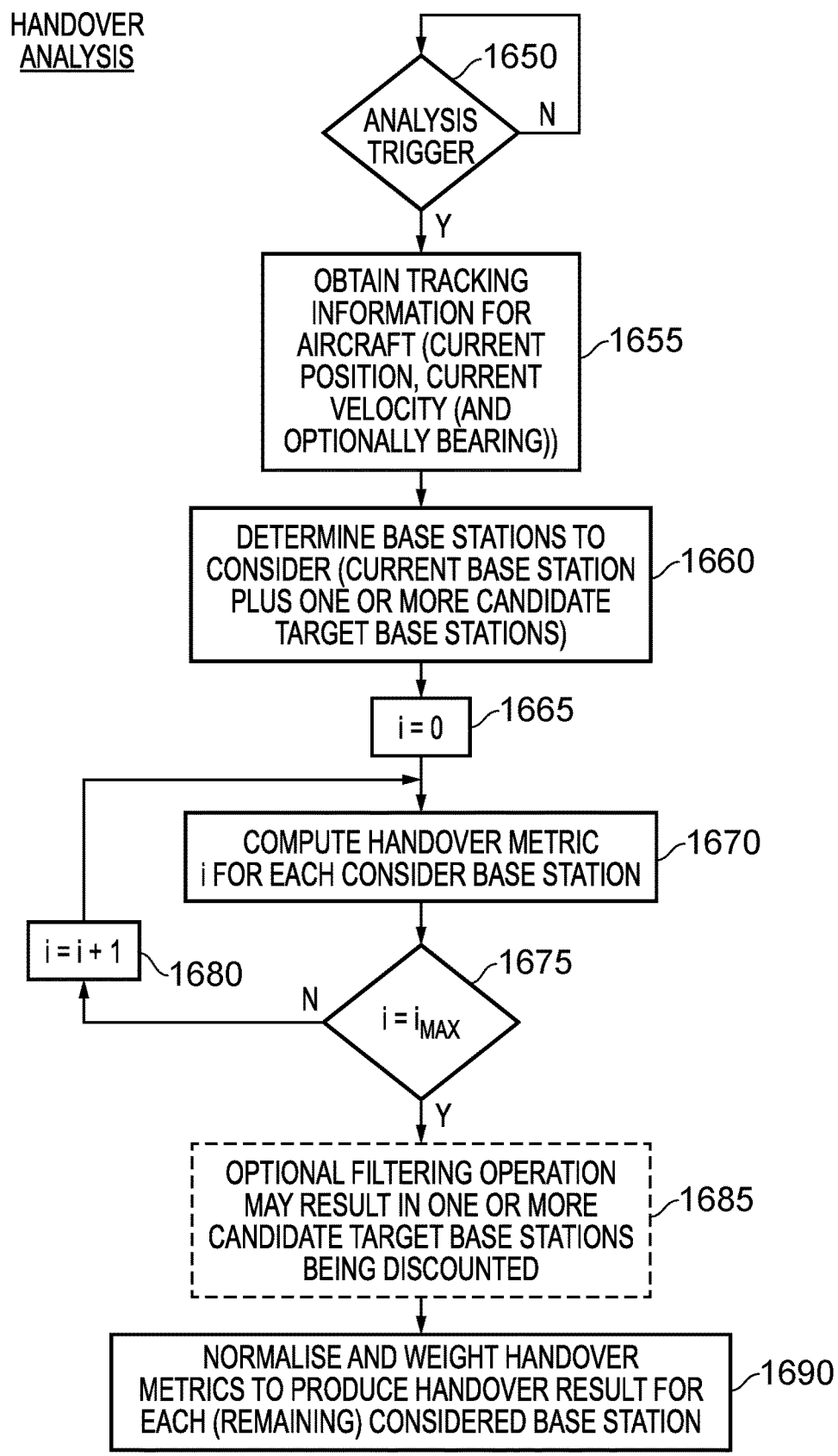
FIG. 26 is a flow diagram illustrating a handover analysis operation performed in accordance with one example implementation.

FIG. 26 is a flow diagram illustrating the handover analysis process performed by the handover metrics computation circuitry 1545 of FIG. 20 in one example implementation. At step 1650, an analysis trigger is awaited. The analysis trigger can take a variety of forms, but in one example implementation the performance of the analysis may be triggered periodically. In the ATG system envisaged, handover operations in respect of any particular aircraft are likely to happen relatively infrequently due to the large distances between the ground base stations, and hence the performance of the analysis periodically for each aircraft will typically be sufficient to produce suitable handover information to be used at the time a handover is required.

At step 1655, tracking information for the aircraft is obtained, via the moving vehicle tracking circuitry 1540 shown in FIG. 20. This information will provide the current position and the current velocity of the aircraft, and optionally may also provide the bearing information discussed earlier.

At step 1660, a determination is made of the base stations to consider for the analysis process. This will typically include the current base station to which the aircraft is connected, plus a number of candidate target base stations. The candidate target base stations can be determined from network neighbourhood information maintained within the wireless network. This may for example include a plurality of candidate target base stations located within a geographical region around the current connected base station. That default network neighbourhood information could potentially be altered at step 1660 to discount one or more candidate target base stations, for example by taking into account the direction of travel and/or bearing of the aircraft.

The process then proceeds to step 1665 where a parameter i is set equal to 0, and then the process proceeds to step 1670 where a handover metric i is computed for each considered base station. As will be apparent from the earlier discussions, the handover metrics computation circuitry can actually generate a variety of different handover metrics, for example four different types of handover metrics to cover the four different criterion discussed earlier with reference to FIGS. 22 to 25. Hence, during each pass through step 1670, the handover metrics computation circuitry will compute a particular one of those handover metrics for each of the considered base stations. This process will be discussed in more detail later for the four example metrics discussed earlier, with reference to the flow diagrams of FIGS. 27 to 30.

At step 1675, it is determined whether the parameter i is equal to a maximum value, i.e. whether all of the different handover metrics have yet been generated, and if not the parameter i is incremented at step 1680 and the process then returns to step 1670.

Once all of the handover metrics have been computed, the process proceeds from step 1675 to the optional step 1685. Here, a filtering operation may be performed based on the computed handover metrics. For example, configurable valid ranges of values for each of the computed metrics may be specified, and the filtering operation can determine whether the computed handover metrics are within those valid ranges. If for a particular candidate target base station at least one of the computed handover metrics is outside of the acceptable range of values, it can be decided at this step to discard that candidate target base station from further consideration. Hence, purely by way of example with reference to criterion 4 discussed earlier with reference to FIG. 25, it may be determined that the antenna gain metric computed for a particular candidate target base station is so poor that that candidate target base station should be excluded from further consideration.

Following step 1685, or directly following step 1675 if the filtering operation is not performed, the process proceeds to step 1690 where the various computed handover metrics for each considered base station (or each remaining considered base station after the filtering operation if the filtering operation is performed) are combined in order to produce a handover result for that considered base station. It will be appreciated that the various handover metrics will have different ranges of values, and accordingly prior to combining the metrics those metrics can be normalised so as to effectively put them onto the same scale with respect to each other. For example, each of the computed metrics could be converted to a percentage value between 0 and 100, or a fraction value between 0 and 1. In addition, it is possible to weight different handover metrics differently with respect to each other, so as to increase the importance of certain metrics over other metrics. Hence, as shown by step 1690, the handover metrics can be normalised and weighted prior to those handover metrics then being combined to produce the handover result for each considered base station.

Figure 27:
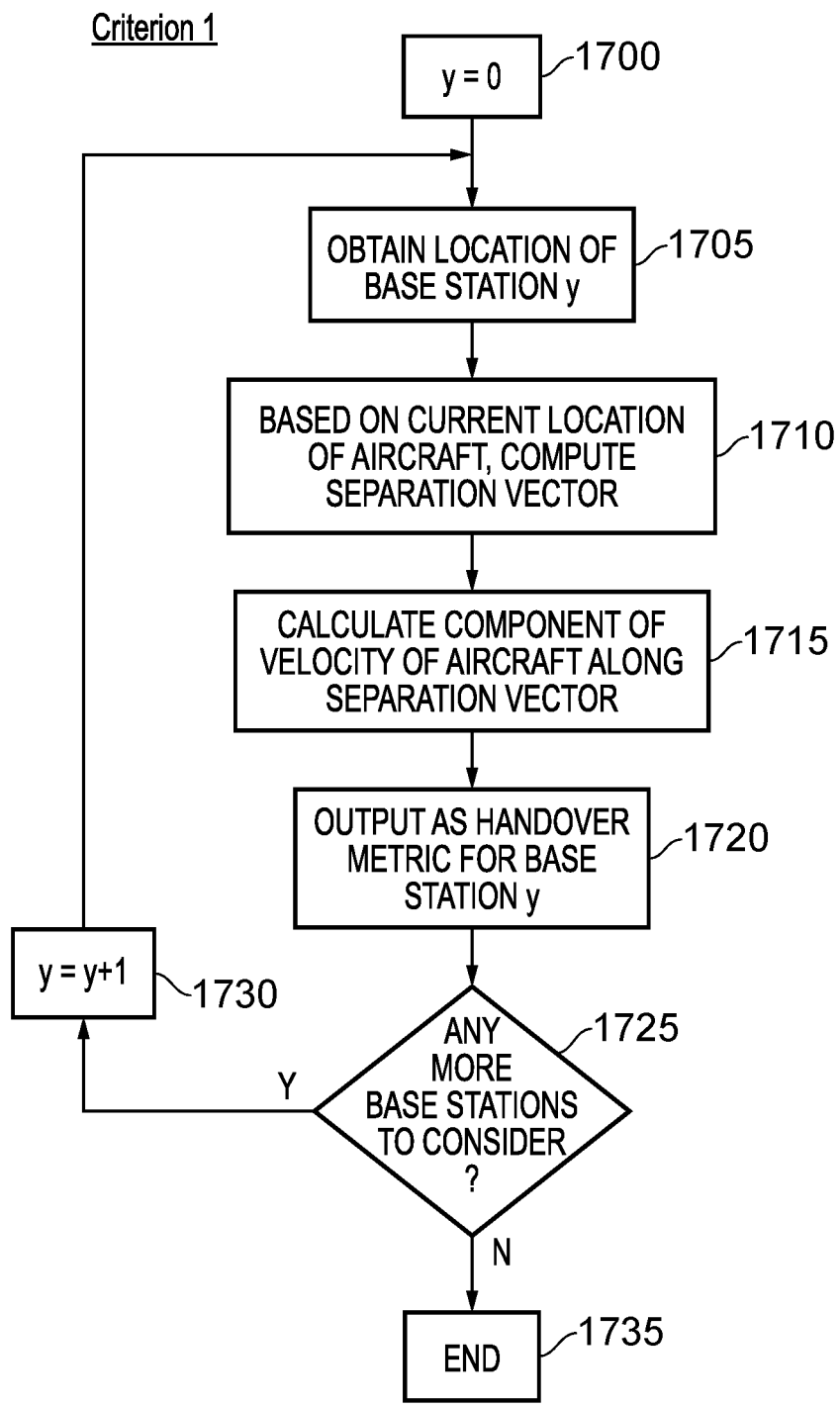
FIGS. 27 to 30 are flow diagrams illustrating the production of handover metrics for each of the four criteria illustrated schematically in FIGS. 22 to 25, in accordance with one example implementation.

FIG. 27 is a flow diagram illustrating a process performed by the handover metrics computation circuitry 1545 to produce a Doppler effect metric useful in assessing criterion 1 discussed earlier. At step 1700, a parameter y is set equal to 0. Then, at step 1705 the location of base station y is obtained, whereafter at step 1710 a separation vector for base station y is computed based on the current location of the aircraft.

Thereafter, at step 1715, a component of the velocity of the aircraft along the separation vector is calculated, this also being referred to herein as the relative speed between the aircraft and the base station. That relative speed is then output as a handover metric for base station y at step 1720, whereafter at step 1725 it is determined whether there are any more base stations to consider. If so, y is incremented at step 1730, and the process returns to step 1705. Once all of the base stations have been considered, the process ends at step 1735.

It will be appreciated that whilst the process of FIG. 27 is shown as a sequential process, in alternative implementations it may be possible to compute the handover metric for each of the base stations in parallel.

Figure 28:
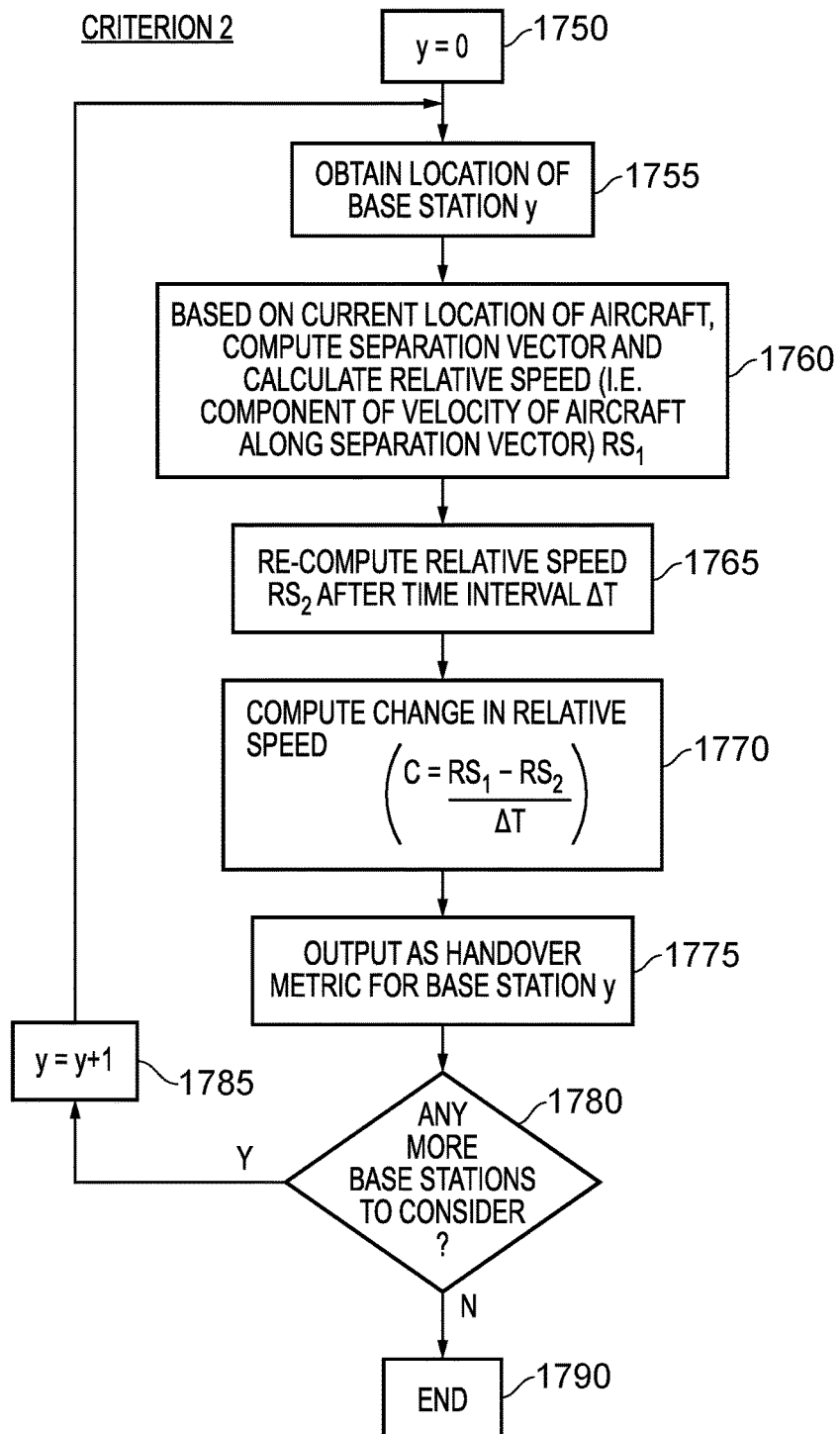

FIG. 28 is a flow diagram illustrating steps that may be performed by the handover metrics computation circuitry in order to generate a Doppler effect metric useful in assessing criterion 2 discussed earlier. At step 1750, a parameter y is set equal to 0, and then at step 1755 the location of base station y is obtained. At step 1760, the separation vector between the aircraft and the base station is computed using the location determined at step 1755 and the current location information for the aircraft, and then the relative speed is calculated, for example by implementing the process discussed earlier with reference to step 1715 of FIG. 27. This relative speed will be referred to herein as $RS_1$.

At step 1765, the relative speed is recomputed after a time interval $\Delta T$. This second relative speed will be referred to herein as $RS_2$.

At step 1770, a change in the relative speed is computed by subtracting the second relative speed $RS_2$ from the first relative speed $RS_1$, and dividing that result by the time difference between the two relative speed computations. The resultant computed change in relative speed is then output as a handover metric for base station y at step 1775, whereafter at step 1780 it is determined whether there are any more base stations to consider. If so, the value of y is incremented at step 1785 and the process returns to step 1755. Once all base stations have been considered, the process ends at step 1790.

Again, whilst the process shown in FIG. 28 is illustrated as a sequential process performed for each base station, it will be appreciated that in some implementations it may be possible to compute the handover metric for each base station in parallel.

Figure 29:
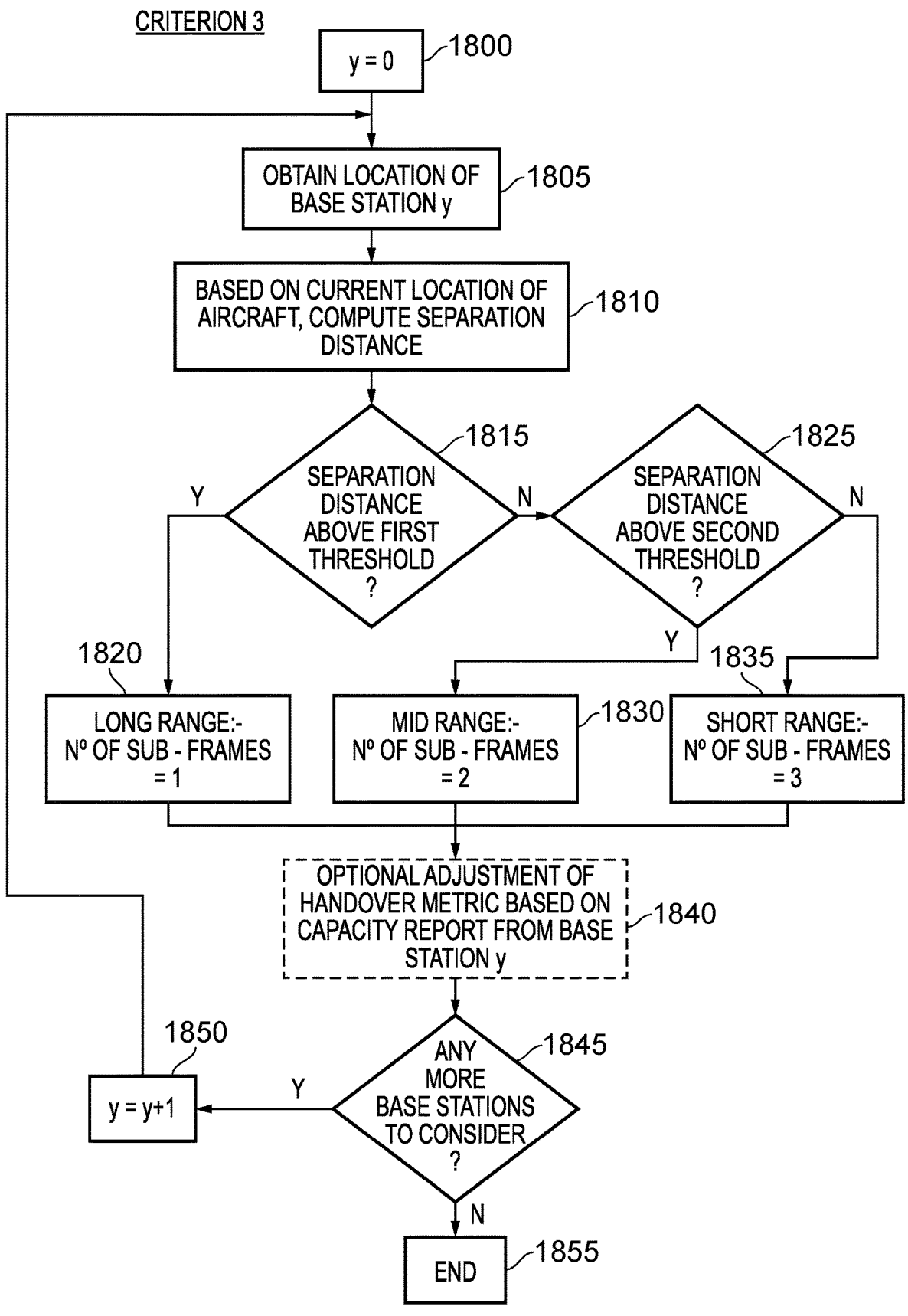

FIG. 29 is flow diagram illustrating steps performed by the handover metrics computation circuitry to compute an uplink capacity metric useful in assessing criterion 3 discussed earlier. At step 1800, a parameter y is set equal to 0, and then at step 1805 the location of base station y is obtained. At step 1810, the separation distance for base station y is computed based on the current location of the aircraft. It should be noted that in this example a separation vector is not needed, and it is merely the distance itself, rather than any direction information, that is required.

At step 1815, it is determined whether the separation distance is above a first threshold. A first threshold can be used to distinguish between long range and medium range or less, the terms long range, medium range and short range having been discussed earlier, see for example the discussion of FIGS. 17 and 18.

If the separation distance is above the first threshold, then it is determined at step 1820 that the aircraft is at a long range from the base station y, and that hence the number of uplink sub-frames available to use will be one. This is due to the timing advance mechanism employed to allow communication at such long ranges, as discussed earlier with reference to FIGS. 17 and 18.

If the separation distance is not above the first threshold, then the process proceeds to step 1825 where it is determined whether the separation distance is above a second threshold, this being a threshold between the medium range and short range. If the separation distance is above the second threshold, then at step 1830 it is decided that the location of the aircraft is in the mid range relative to the base station, and that hence the number of uplink sub-frames will be 2. However, if the separation distance is below the second threshold, then it is determined at step 1835 that the aircraft is at a short range distance from the base station, and that hence the number of sub-frames will be 3.

Following steps 1820, 1830 or 1835, then optionally at step 1840 the uplink capacity metric (in this case indicating whether the number of uplink sub-frames is 1, 2 or 3) can be adjusted based on capacity report information from base station y. In particular, the base station y may provide a capacity report, for example identifying available uplink capacity. This allows for a more informed uplink capacity metric to be generated, by normalising the uplink capacity report indicative of available uplink capacity taking into account the number of available uplink sub-frames. Purely by way of example, if one base station is determined to be at short range, and hence provides 3 uplink sub-frames for the aircraft, whilst another base station is at long range, and hence only provides 1 uplink sub-frame, that long range base station may still ultimately provide just as good or better uplink capacity if it is relatively lightly loaded relative to the short range base station.

Following step 1840, or directly following steps 1820, 1830, 1835 if step 1840 is omitted, it is determined at step 1845 whether there are any more base stations to consider, and if so the parameter y is incremented at step 1850 and the process returns to step 1805. Once all base stations are considered, the process ends at step 1855.

As with the earlier discussed FIGS. 27 and 28, whilst the process of FIG. 29 has been shown as a process performed sequentially for each base station, it will be appreciated that the computations may be performed in parallel for each base station in certain implementations.

Figure 30:
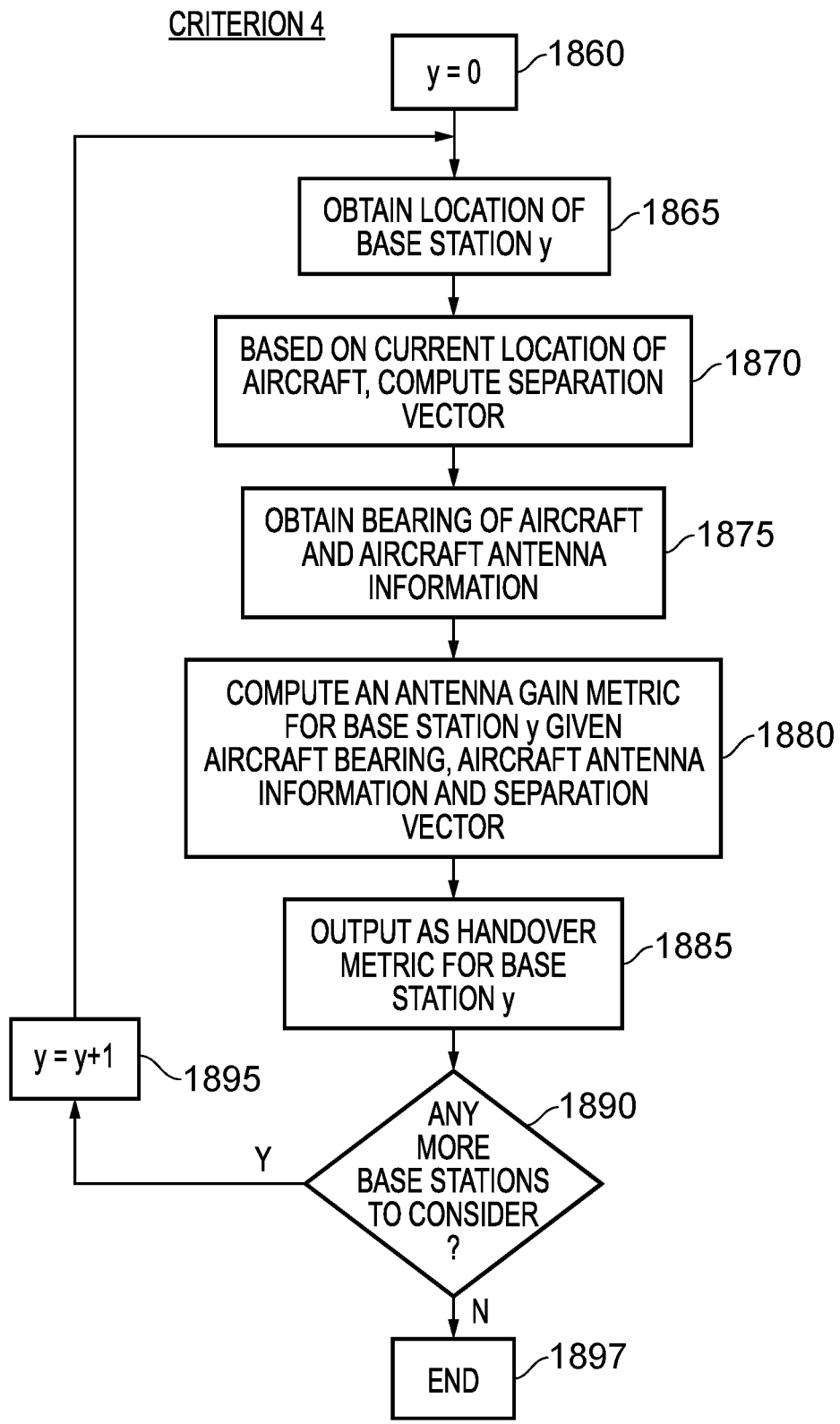

FIG. 30 illustrates a process that may be performed by the handover metrics computation circuitry to generate an antenna gain handover metric useful in assessing criterion 4 discussed earlier. At step 1860, a parameter y is set equal to 0, and then at step 1865 the location of base station y is obtained. At step 1870, the separation vector is computed based on a current location of the aircraft and the location of the base station obtained at step 1865. In addition, at step 1875 the bearing of the aircraft is obtained, along with the aircraft antenna configuration information. As discussed earlier, the aircraft antenna configuration information is sufficient to identify the pattern of beam produced by the aircraft, and the orientation of that beam pattern relative to the longitudinal axis of the aircraft. Hence, armed with that information and bearing information, it can be determined how the beam pattern will project over the underlying surface of the earth.

At step 1880, an antenna gain metric is computed for base station y given the aircraft bearing, the aircraft antenna information (which may include antenna beam configuration information) and the separation vector. The antenna beam configuration matters for electronically and mechanically steerable antennas where antenna gain pattern is modified by beam steering configuration. The antenna gain metric may be calculated based on the best possible gain in a given direction obtained by applying the beam optimised for that direction i.e. offering maximum gain in that direction.

At step 1885, the computed antenna gain metric is output as a handover metric for base station y, and then at step 1890 it is determined whether any more base stations need to be considered. If so, the parameter y is incremented at step 1895 and the process returns to step 1865. Once all base stations have been considered, the process ends at step 1897. Again, whilst the process of FIG. 30 is shown as being performed sequentially for each base station, in an alternative implementation the computation of the antenna gain metric may be performed in parallel for each base station.

FIG. 31 illustrates how the handover result mentioned at step 1690 of FIG. 26 can be computed for a particular base station $BS_x$. In this example, the term $Rx_n$ represents the normalised handover metric n for the base station $BS_x$. Hence, by way of example, if handover metrics are produced for each of the 4 criteria discussed earlier, then there will be 4 normalised handover metrics $Rx_0$, $Rx_1$, $Rx_2$ and $Rx_3$ for base station x. The terms $\alpha_1$, $\alpha_2$, $\alpha_3$ and $\alpha_4$ then indicate the weights applied to each of those four handover metric. As discussed earlier, different weights can be given to each of the handover metrics in order to prioritise some metrics over others if desired.

Figure 32:
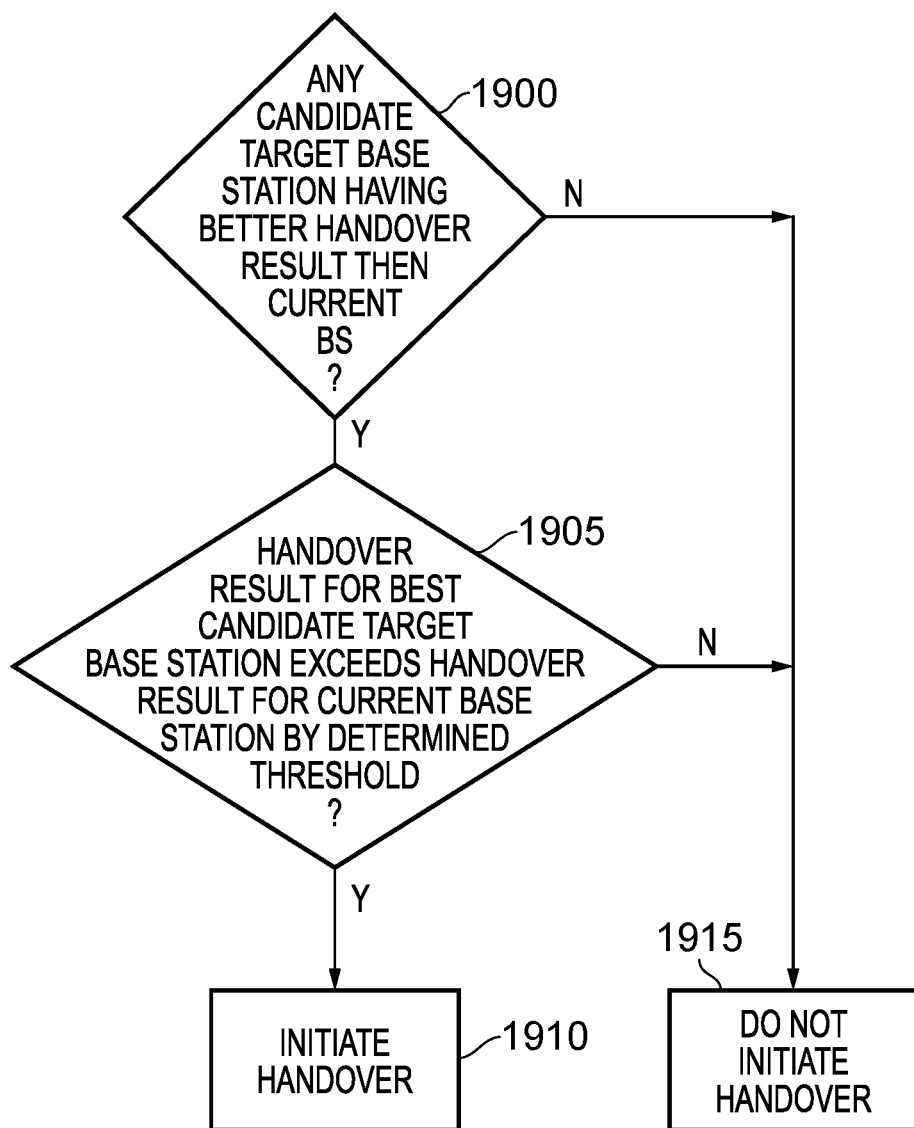
FIG. 32 is a flow diagram illustrating an operation performed by handover decision circuitry in accordance with one example implementation.

FIG. 32 is a flow diagram illustrating a process that may be performed by the handover decision circuitry 1550 of FIG. 20 in one example implementation. Whilst in principle the generated handover metrics could be provided via suitable IP packet communication to the current connected ground terminal for use when making handover decisions, in the example illustrated in FIG. 32 a forced handover process is instead performed, where the handover decision circuitry 1550 makes the handover decision, and then issues a request to the currently connected ground terminal to initiate a handover to a different ground terminal specified in that request.

At step 1900, it is determined whether there are any candidate target base stations having a better handover result than the currently connected base station. If not, the process proceeds to step 1915, and no handover is initiated. Instead, the aircraft remains connected to the currently connected ground terminal.

However, assuming there is a least one candidate target base station having a better handover result than the current base station, then the process proceeds to step 1905 where it is determined whether the handover result for the best candidate target base station exceeds the handover result for the current connected base station by a determined threshold. The determined threshold may be configurable, and can be chosen so as to avoid "thrashing" where handover occurs multiple times between closely matched base stations. If this test is not passed, then again the process proceeds to step 1915 and handover is not initiated. However, if it is passed, the process proceeds to step 1910 where a handover is initiated. At this point, the HVMM 1530 will issue a request via the Internet connection 1525 to the currently connected ground terminal (in the example of FIG. 20 this being the ground terminal 1505) informing the ground terminal to perform a handover procedure, with that request specifying the ground terminal to which handover should be performed.

Once the currently connected ground station has received the request to perform a forced handover, and the target base station to which the handover should be performed has been identified by that request, then a standard handover procedure (called "blind handover") can be employed in order to perform the handover of the aircraft to the identified ground terminal.

Alternatively the metrics discussed here can be used to dynamically reconfigure the network neighbourhood on the serving base station. In this case the metrics are used to identify the best 2 or more target base stations and configure them as the neighbours. With the neighbours configured the system could use standard measurements and measurement based handover.

The techniques described herein allow a number of different handover metrics to be generated that can be used to enhance the algorithms evaluating the decision to trigger the handover from one ground base station to another ground base station for an air station terminal (AST) located within an aircraft. The generated metrics assist in making suitable handover decisions taking into account the high speed of the aircraft and the relatively long distances between the base stations. Further, the handover analysis circuitry and handover decision circuitry can be centralised within the system, and can perform the generation of the handover metrics and the determination as to which ground base station to handover communication to without needing to receive any reports from the AST. In particular, all of the described metrics can be generated based on information about the location of the base stations, and vehicle tracking information identifying the current location, velocity and optionally bearing of the aircraft. It has been found that the adoption of this technique provides a particularly efficient and effective mechanism for controlling handover within ATG systems.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. An apparatus comprising:
base station location identifying circuitry configured to obtain base station location information for a plurality of base stations that provide a wireless network for communication with a moving vehicle;
moving vehicle tracking circuitry configured to obtain position and velocity information for the moving vehicle; and
handover metrics computation circuitry configured to generate at least one handover metric computed from the position and velocity information for the moving vehicle and the base station location information, for use in determining a target base station in the plurality of base stations to be used when performing a handover procedure to transition communication with the moving vehicle from a current base station in the plurality of base stations to the target base station;
wherein:
the handover metrics computation circuitry is arranged to generate the at least one handover metric for each candidate target base station of a plurality of candidate target base stations;
the at least one handover metric comprises at least one Doppler effect metric indicative of an impact the Doppler effect will have on transmitted signals between the moving vehicle and a candidate target base station;
the handover metrics computation circuitry is arranged to compute, for each candidate target base station of the plurality of candidate target base stations, the at least one Doppler effect metric for that candidate target base station; and
the at least one Doppler effect metric is an indication of a speed of change of the Doppler effect on transmitted signals between the moving vehicle and the candidate target base station.

2. An apparatus as claimed in claim 1, wherein the plurality of candidate target base stations are determined with reference to the current base station.

3. An apparatus as claimed claim 1, wherein the at least one Doppler effect metric is an indication of relative speed between the moving vehicle and the candidate target base station.

4. An apparatus as claimed in claim 3, wherein the handover metrics computation circuitry is arranged to compute the indication of relative speed between the moving vehicle and the candidate target base station by:
computing, based on current position information for the moving vehicle and location information for the candidate target base station, a separation vector extending between the moving vehicle and the candidate target base station; and
computing a component of the velocity of the moving vehicle along that separation vector.

5. An apparatus as claimed in claim 1, wherein:
the handover metrics computation circuitry is arranged to compute the indication of the speed of change of the Doppler effect on transmitted signals between the moving vehicle and the candidate target base station by computing a change in relative speed between the moving vehicle and the candidate target base station.

6. An apparatus as claimed in claim 1, wherein the at least one Doppler effect metric is used to increase a probability of selecting, as the target base station, the candidate target base station least affected by the Doppler effect.

7. An apparatus as claimed in claim 1, wherein:
the handover metrics computation circuitry is further arranged to generate the at least one handover metric for the current base station.

8. An apparatus as claimed in claim 1, further comprising:
handover decision circuitry configured to select, based on the handover metrics generated by the handover metrics computation circuitry, which one of the plurality of candidate target base stations is to be used as the target base station to which communication with the moving vehicle is to be transitioned from the current base station.

9. An apparatus as claimed in claim 1, further comprising:
handover decision circuitry arranged to determine, based on the handover metrics generated by the handover metrics computation circuitry, whether to transition communication with the moving vehicle from the current base station to one of the plurality of candidate target base stations.

10. An apparatus as claimed in claim 8, wherein the handover metrics generated by the handover metrics computation circuitry are subjected to a normalisation and weighting operation prior to being used by the handover decision circuitry.

11. An apparatus as claimed in claim 8, wherein the handover metrics computation circuitry is arranged to perform a filtering operation using the generated handover metrics in order to determine whether to eliminate any of the plurality of candidate target base stations from consideration by the handover decision circuitry.

12. An apparatus as claimed in claim 8, wherein the handover decision circuitry is arranged to issue a forced handover signal to the current base station, identifying the target base station, in order to initiate performance of a handover procedure to transition communication with the moving vehicle from the current base station to the target base station.

13. An apparatus as claimed in claim 1, wherein the apparatus is provided within a management server for the wireless network, to compute the at least one handover metric for multiple moving vehicles connected to the wireless network.

14. An apparatus as claimed in claim 1, wherein the apparatus is provided within the moving vehicle.

15. An apparatus comprising:
base station location identifying circuitry configured to obtain base station location information for a plurality of base stations that provide a wireless network for communication with a moving vehicle;
moving vehicle tracking circuitry configured to obtain position and velocity information for the moving vehicle; and
handover metrics computation circuitry configured to generate at least one handover metric computed from the position and velocity information for the moving vehicle and the base station location information, for use in determining a target base station in the plurality of base stations to be used when performing a handover procedure to transition communication with the moving vehicle from a current base station in the plurality of base stations to the target base station;
wherein:
the handover metrics computation circuitry is arranged to generate the at least one handover metric for each candidate target base station of a plurality of candidate target base stations;
the at least one handover metric comprises an uplink capacity metric indicative of a number of sub-frames available for allocation for uplink communication from the moving vehicle to the candidate target base station; and
the handover metrics computation circuitry is arranged to compute, for each candidate target base station of the plurality of candidate target base stations, the uplink capacity metric for that candidate target base station.

16. An apparatus as claimed in claim 15, wherein:
the number of sub-frames available for allocation for uplink communication from the moving vehicle to the candidate target base station is dependent on a separation distance between the moving vehicle and the candidate target base station; and
the handover metrics computation circuitry is arranged to compute the uplink capacity metric for each candidate target base station by:
computing, based on current position information for the moving vehicle and location information for the candidate target base station, a separation distance between the moving vehicle and the candidate target base station; and
determining the uplink capacity metric in dependence on the computed separation distance.

17. An apparatus as claimed in claim 16, wherein the handover metrics computation circuitry is arranged to receive capacity reports from the plurality of candidate target base stations about uplink capacity utilisation, and to determine the uplink capacity metric in dependence on both the computed separation distance and the capacity report received from the candidate target base station.

18. An apparatus as claimed in claim 15, wherein the uplink capacity metric is used to increase a probability of selecting, as the target base station, the candidate target base station having the most uplink capacity.

19. An apparatus comprising:
base station location identifying circuitry configured to obtain base station location information for a plurality of base stations that provide a wireless network for communication with a moving vehicle;
moving vehicle tracking circuitry configured to obtain position and velocity information for the moving vehicle; and
handover metrics computation circuitry configured to generate at least one handover metric computed from the position and velocity information for the moving vehicle and the base station location information, for use in determining a target base station in the plurality of base stations to be used when performing a handover procedure to transition communication with the moving vehicle from a current base station in the plurality of base stations to the target base station;
wherein:
the handover metrics computation circuitry is arranged to generate the at least one handover metric for each candidate target base station of a plurality of candidate target base stations;
the moving vehicle tracking circuitry is further arranged to obtain a bearing indication for the moving vehicle;
the handover metrics computation circuitry is provided with antenna information for the moving vehicle;
the at least one handover metric comprises an antenna gain metric; and
the handover metrics computation circuitry is arranged to compute, for each candidate target base station of the plurality of candidate target base stations, the antenna gain metric based on the antenna information, the bearing of the moving vehicle and a separation vector extending between the moving vehicle and the candidate target base station, where the separation vector is computed from current position information for the moving vehicle and location information for the candidate target base station.

20. A method of performing a handover analysis, comprising:
obtaining base station location information for a plurality of base stations that provide a wireless network for communication with a moving vehicle;
obtaining position and velocity information for the moving vehicle; and
employing handover metrics computation circuitry to generate at least one handover metric computed from the position and velocity information for the moving vehicle and the base station location information, for use in determining a target base station in the plurality of base stations to be used when performing a handover procedure to transition communication with the moving vehicle from a current base station in the plurality of base stations to the target base station;
wherein:
the handover metrics computation circuitry generates the at least one handover metric for each candidate target base station of a plurality of candidate target base stations;
the at least one handover metric comprises at least one Doppler effect metric indicative of an impact the Doppler effect will have on transmitted signals between the moving vehicle and a candidate target base station;

the handover metrics computation circuitry computes, for each candidate target base station of the plurality of candidate target base stations, the at least one Doppler effect metric for that candidate target base station; and the at least one Doppler effect metric is an indication of a speed of change of the Doppler effect on transmitted signals between the moving vehicle and the candidate target base station.

\* \* \* \* \*